(12) United States Patent  
Huang et al.

(10) Patent No.: US 11,598,785 B2  
(45) Date of Patent: Mar. 7, 2023

(54) APPARATUS FOR FACILITATING CHEMICAL ANALYSIS BASED ON COLOR PRINCIPLE

(71) Applicant: Royal Biotech Inc, Beverly Hills, CA (US)

(72) Inventors: Philip Huang, Westlake Village, CA (US); E-Ray Huang, Thousand Oaks, CA (US); Guozhi Lin, Changsha (CN)

(73) Assignee: ROYAL BIOTECH INC, Beverly Hills, CA (US)

( * ) Notice: Subject to any disclaimer, the term of this patent is extended or adjusted under 35 U.S.C. 154(b) by 447 days.

(21) Appl. No.: 16/831,531

(22) Filed: Mar. 26, 2020

(65) Prior Publication Data

US 2021/0302454 A1 Sep. 30, 2021

(51) Int. Cl.
*G01N 21/78* (2006.01)
*G01N 35/02* (2006.01)
*G01N 35/00* (2006.01)

(52) U.S. Cl.
CPC .......... *G01N 35/025* (2013.01); *G01N 21/78* (2013.01); *G01N 2035/00306* (2013.01)

(58) Field of Classification Search
CPC .......... G01N 2035/00306; G01N 2035/00356; G01N 2035/00444; G01N 2035/00445; G01N 21/255; G01N 21/253; G01N 35/025; G01N 21/78; G01N 1/31; G01N 33/0009; G01N 2035/1058; G01N 2035/00435; G01N 33/0031; G01N 2035/00039; B01L 3/5085; B01L 2200/025; B01L 3/021; B01L 2300/00; B01L 2300/046; B01L 2300/041; B01L 2300/04; B01L 2300/0803; B01L 2300/0851

USPC ...... 206/366, 370; 220/203.09, 211; 422/50, 422/62–67, 68.1, 82.05, 105–107, 401, 422/509, 561; 435/283.1, 287.3;

(Continued)

(56) References Cited

U.S. PATENT DOCUMENTS

2003/0044999 A1\* 3/2003 Singh ...................... G01N 21/78
436/166
2012/0253693 A1\* 10/2012 Inomata .......... G01N 35/00663
702/31

(Continued)

FOREIGN PATENT DOCUMENTS

CN 109444440 A \* 3/2019 .......... B01L 3/50825

Primary Examiner — Jeffrey P Aiello

(57) ABSTRACT

Disclosed herein is an apparatus for facilitating chemical analysis based on color principle. Accordingly, the apparatus may include a base located at the bottom of the apparatus. Further, the base may be composed of a rectilinear receptacle. Further, the apparatus may include an intermediate plate located above the base. Further, the apparatus may include a hood located atop the intermediate plate. Further, the hood may include a hood rectilinear receptacle. Further, the hood rectilinear receptacle may be secured to the intermediate plate using a fastening mechanism. Further, the apparatus may include a roundtable housed within the hood. Further, the apparatus may include a motion system passing through and engaging with the roundtable and the hood. Further, the apparatus may include an analysis system embedded into at least one board suspended within the base. Further, the analysis system facilitates automated chemical analysis of a plurality of extraneous vials.

20 Claims, 39 Drawing Sheets

(58) Field of Classification Search
USPC ......... 436/147; 700/83, 266; 702/19, 22, 24, 702/28, 108, 130, 188–189
See application file for complete search history.

(56) References Cited

U.S. PATENT DOCUMENTS

2013/0011298 A1* 1/2013 Itou .................. G01N 35/00623
422/73
2013/0330245 A1* 12/2013 Duncan .................. B01L 3/508
422/502
2018/0306709 A1* 10/2018 Zaccari .............. G01N 21/8483

\* cited by examiner

APPARATUS FOR FACILITATING CHEMICAL ANALYSIS BASED ON COLOR PRINCIPLE

TECHNICAL FIELD

Generally, the present disclosure relates to the field of chemical apparatus. More specifically, the present disclosure relates to an apparatus for facilitating chemical analysis based on color principle.

BACKGROUND

Generally, the common procedure of chemical analysis includes sample pretreatment, screening, agitation, incubation, and analysis covering a wide spectrum of chemically focused fields that had to occur across several apparatuses that may pile time and cost onto an assessment of the chemical analysis. Further, current technologies do not allow remote operation, management, and dictation of the chemical analysis from afar.

Therefore, there is a need for improved apparatuses for facilitating chemical analysis based on color principle that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating chemical analysis based on color principle, in accordance with some embodiments. Accordingly, the apparatus may include a base located at the bottom of the apparatus. Further, the base may be composed of a rectilinear receptacle. Further, the apparatus may include an intermediate plate located above the base. Further, the intermediate plate may be characterized by an intermediate plate perimeter. Further, the intermediate plate perimeter may be congruent and complementing to a perimeter of the base. Further, the apparatus may include a hood located atop the intermediate plate. Further, the hood may include a hood rectilinear receptacle. Further, the hood rectilinear receptacle may be secured to the intermediate plate using a fastening mechanism. Further, the apparatus may include a roundtable housed within the hood. Further, the roundtable may include a curvilinear structure optimized and weighted to reduce a strain of a high rotational velocity. Further, the apparatus may include a motion system passing through and engaging with the roundtable and the hood. Further, the motion system may be driven by a motor arranged in a bearing assembly conducive to minimal frictional resistance to optimize power consumption of the apparatus. Further, the apparatus may include an analysis system embedded into at least one board suspended within the base. Further, the analysis system facilitates automated chemical analysis of a plurality of extraneous vials. Further, the at least one board may include a processing device and a plurality of sensor units. Further, each sensor unit of the plurality of sensor units may include a plurality of LEDs and a sensor. Further, the sensor may be communicatively coupled with the processing device. Further, each sensor unit may be configured for generating a sensor data. Further, the processing device may be configured for analyzing the sensor data to generate a result notification associated with the chemical analysis of the plurality of extraneous vials.

Further disclosed herein is an apparatus for facilitating chemical analysis based on color principle, in accordance with some embodiments. Accordingly, the apparatus may include a base located at the bottom of the apparatus. Further, the base may be composed of a rectilinear receptacle. Further, the base may include an interior cavity housing functional system of the analysis system and holstering the motor. Further, the base may include a plurality of port apertures located along lateral edges and on the rear of the base. Further, the plurality of port apertures suits a plurality of ports comprised in an analysis system. Further, the plurality of port apertures may be rectilinear in geometry. Further, a port aperture of the plurality of port apertures may be configured for fastening the plurality of ports using a port fastening mechanism. Further, the base may include a plurality of base fastening apertures bored in a vertical orientation and located in interior of the base along the perimeter of the base. Further, the plurality of base fastening apertures engages with a plurality of intermediate apertures comprised in an intermediate plate for securing the intermediate plate to the base through a plate fastening mechanism. Further, the base may include a plurality of base spring protrusions located on a bottom interior surface of the base and protruding upwards. Further, the plurality of base spring protrusions engages with bottom of a plurality of springs comprised in a motion system. Further, the plurality of base spring protrusions may be composed of at least four base spring protrusions arranged cardinally at a center relative to a rectilinear planar surface comprised in the intermediate plate. Further, the apparatus may include the intermediate plate located above the base. Further, the intermediate plate may be characterized by an intermediate plate perimeter. Further, the intermediate plate perimeter may be congruent and complementing to a perimeter of the base. Further, the apparatus may include a hood located atop the intermediate plate. Further, the hood may include a hood rectilinear receptacle. Further, the hood rectilinear receptacle may be secured to the intermediate plate using a fastening mechanism. Further, the apparatus may include a roundtable housed within the hood. Further, the roundtable may include a curvilinear structure optimized and weighted to reduce a strain of a high rotational velocity. Further, the apparatus may include the motion system passing through and engaging with the roundtable and the hood. Further, the motion system may be driven by a motor arranged in a bearing assembly conducive to minimal frictional resistance to optimize power consumption of the apparatus. Further, the apparatus may include the analysis system embedded into at least one board suspended within the base. Further, the analysis system facilitates automated chemical analysis of a plurality of extraneous vials. Further, the at least one board may include a processing device and a plurality of sensor units. Further, each sensor unit of the plurality of sensor units may include a plurality of LEDs and a sensor. Further, the sensor may be communicatively coupled with the processing device. Further, each sensor unit may be configured for generating a sensor data. Further, the processing device may be configured for analyzing the sensor data to generate a result notification associated with the chemical analysis of the plurality of extraneous vials.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
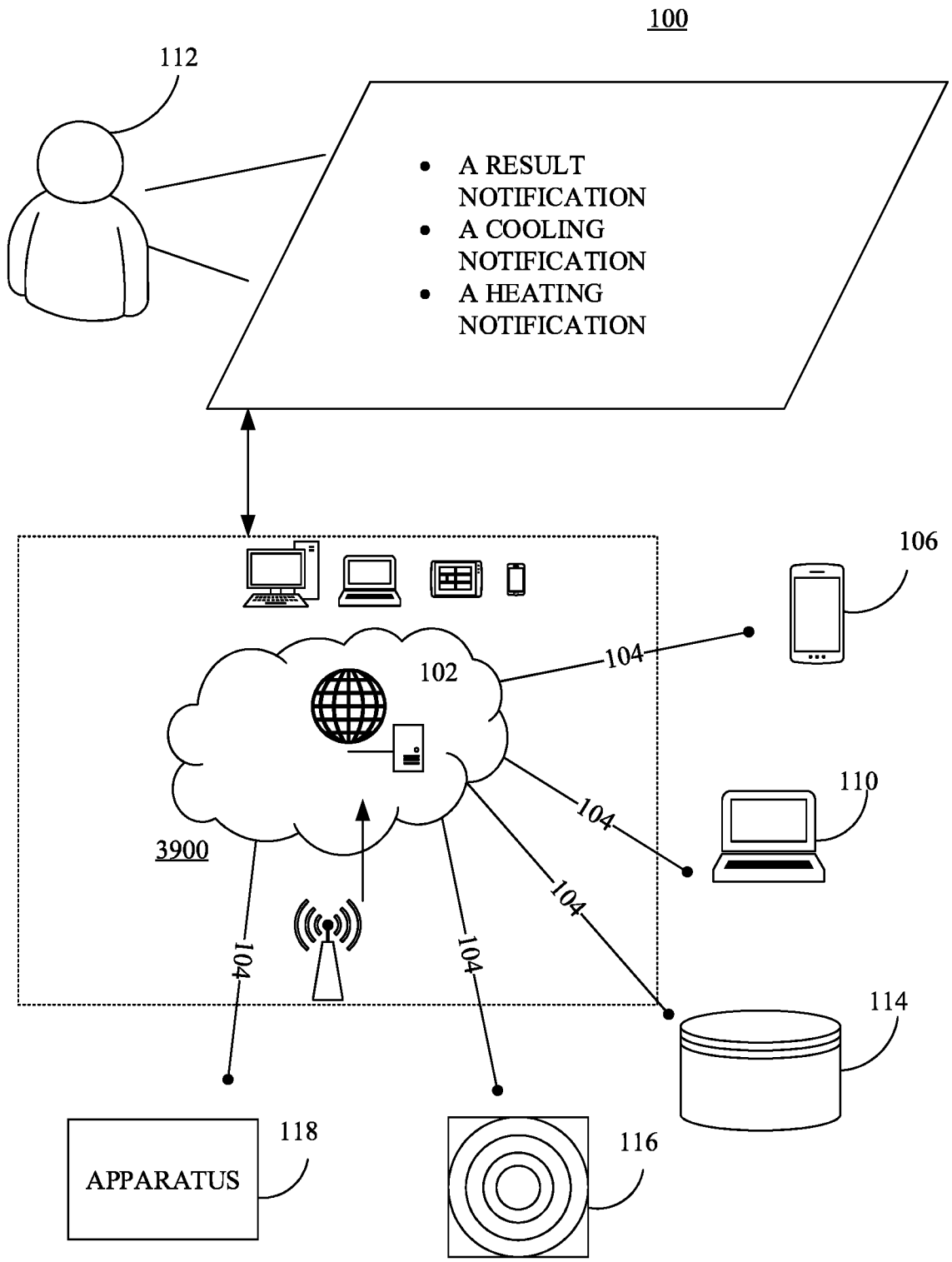
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of apparatus for facilitating chemical analysis based on color principle, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes an apparatus for facilitating chemical analysis based on color principle. Further, the apparatus may include Royal Vial Lab System (RVLS). Further, the apparatus may automatically begin a series of accurate tasks including sampling pretreatment and the printing out of the result at a push of the start button. Further, the apparatus may be configured for multi-functioning. Further, the apparatus may be configured for innovative integration of microorganisms, residues, heavy metal, and additives inspection and analysis. Further, the apparatus may only take 10 minutes from sampling pretreatment to result reporting for specific reagents with accuracy up to 99.99%. Further, the apparatus may have various applications such as food, environmental safety/water quality inspection, forensic examination, research, etc. Further, the apparatus may include a fully automated survey multi-reader. Further, the apparatus may be time-saving. Further, the RVLS installs a network monitoring system that can connect to your pc, laptop or smartphone. This reduced the amount of manpower required for the lab. Further, the RVLS ensures experiments apply Good Laboratory Practice (GLP) to ensure uniformity, consistency, reliability, quality, reproducibility and data integrity. Further, the apparatus may save your money and space. Further, the apparatus may be configured for innovatively integrating functions of shaker, vortex, mixer, incubator, reader of microorganism/heavy metal/residues/additives detection and extra test tube rack. Further, the apparatus may be configured for performing up to 16 independent analyses at once. Further, samples may be contained in vials for analysis. Further, the apparatus may include a color sensor corresponding to the vial for chemical analysis. Further, the sensor may record a color change associated with the samples. Further, the apparatus may distinguish between the different types of microorganisms and allow a quantification of the microorganisms (such as bacteria, etc.). Further, the apparatus may enter readings associated with the color change into a cloud database for analysis. Further, the apparatus may provide results in 5-10 min if CFU (unit of Microbiology) or Parts per billion (PPB) is very high, wherein PPB is the number of units of mass of a contaminant per 1000 million units of total mass. PPB may be used to measure the concentration of a contaminant in soils and sediments. Further, the apparatus may be remotely controlled by smart devices with secure ID/Password. Further, the apparatus may include a lighter and smaller system with a USB port and a universal AC adapter for outdoor and indoor. Further, the apparatus may provide accuracy up to the experimental limit of 99.999% with respect to other bacterial species or heavy metal. Further, the capacity of vials may be 0.2 ml, 0.5 ml, 1.5 ml, 1.7 ml, 2.0 ml, 10 ml, 11 ml, 15 ml, 25 ml, and 50 ml. Further, the apparatus may be configured for controlling incubating temperature, shaking speed, and time though manual or automatic setting. Further, a temperature range associated with the apparatus may be +5 to 60 degree C., labeled 30, 37, 44 degrees C. Further, a speed range associated with the apparatus may be 300-3000 rpm, labeled 1000, 2500 rpm. Further, the apparatus may include a touch Screen LCD (5 inch) display. Further, the apparatus may be charged easily. Further, a voltage rating associated with the apparatus may be 100-240V. Further, a frequency associated with the apparatus may be 50/60 Hz. Further, the apparatus may be operated by a 12V battery or car socket that can be used as a power supply. Further, operational temperature associated with the apparatus may be 8-40 degrees C. Further, the size of the apparatus may be 32.5 cm×25 cm×23 cm. Further, the apparatus may be made by UL and CE Standard. Further, a category associated with the sample may include microorganisms, heavy metals, drug residues, and additives. Further, microbiological reagents associated with the apparatus may include colonies, total coliforms, *Escherichia coli Escherichia coli* O157/O111/O014/EHEC, *Staphylococcus aureus*, *Salmonella*, *Listeria monocytogenes*, *Pseudomonas aeruginosa*, *Pseudomonas aeruginosa* Yeas, *Aspergillus* fungi, and so on. Further, the apparatus may operate as a heavy metal detection kit configured for analyzing the heavy metals. Further, the heavy metals may include aluminum, arsenic, cadmium, chromium, cobalt copper, iron, mercury, manganese, molybdenum, silver, thallium, tin, zinc, lead, nickel custom types.

Further, the apparatus may include a fully automated intelligent multi-functional integrated on-site real-time and fast analysis tool that may provide timely improvement of screening indicators, improve production operation standards, and streamline industrial requirements for manpower. Further, the apparatus may increase the recovery rate/revenues, decreasing loss of valued elements and saving manpower for detection & avoiding errors by technicians.

Further, the apparatus may use a reagents formulated for the properties of a specific target sample, and if the target sample contains the properties of the specific element, combines the two to present a color transition. The pitch of the degree of color change is used to present a semi-quantitative analysis.

Further, the apparatus may immediately analyze the relevant information of the metal particles on the spot, return the cloud database to verify the identity of the "unknown particle", and then enter the cloud computing & analysis area to conduct automatic conversion and presentation of related report.

Further, the apparatus may be coupled to an external X-ray fluorescence analyzer to perform composition & ratio analysis of the sample and the relevant information obtained will be integrated into the system software through the automatic editing function. Further, the apparatus may be coupled to sample collection devices such as robotic hands.

For solitary or multiple mineral samples (usually grit and heavy metal particles are mixed, and heavy metal particles have different colors and luster), the sample is fixed with glue, and then measured and recorded the shape & size of heavy metal sample with an optical microscope coupled to the apparatus. Further, the optical microscope may include a built-in measuring scale, combined with gel imaging technology, the gel fixes the sample to facilitate measurement, and avoids particles floating or unevenly distributed, which leads to measurement difficulties.

Further, data collected by the sensor therein would be relayed back to a processor that would then interpret the results preferably based upon the principles of color changes theory to assess the samples. The processor may further offload the data of the analysis to an adjacent body through the plurality of electric ports wherein the network port may allow remote operation, management, and dictation from afar through an internet connection. By consolidating all of the systems to several distinct planes of operation that interweave with one another, the apparatus achieves a state of being able to apply the protocols of pretreatment, agitation, incubation, and analysis near simultaneously and thus circumvents the conventions of the procedures being enacted separately through distinct apparatus as opposed to a universal approach.

Referring now to figures, FIG. 1 is an illustration of an online platform 100 consistent with various embodiments of the present disclosure. By way of non-limiting example, the online platform 100 to facilitate chemical analysis based on color principle may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116, apparatus 118 (such as apparatus 200) over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 3900.

Figure 2:
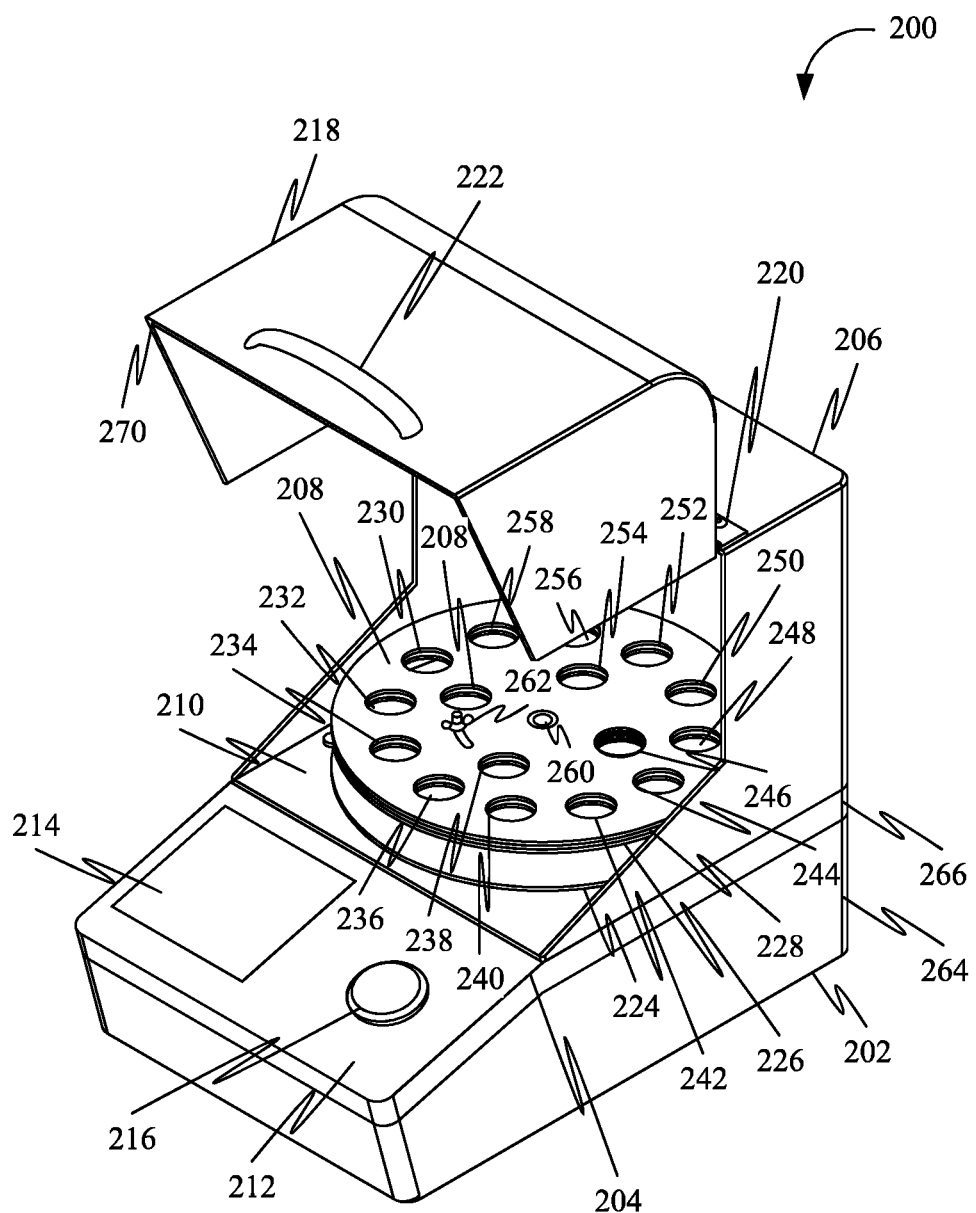
FIG. 2 is a top front perspective view of an apparatus for facilitating chemical analysis based on color principle, in accordance with some embodiments.

FIG. 2 is a top front perspective view of an apparatus 200 for facilitating chemical analysis based on color principle, in accordance with some embodiments. Accordingly, the apparatus 200 may include a base 202, an intermediate plate 204, a hood 206, a roundtable 208, a motion system 1002 (as shown in FIG. 10), and an analysis system 1004 (as shown in FIG. 10).

Further, the base 202 located at the bottom of the apparatus 200. Further, the base 202 may be composed of a rectilinear receptacle.

Figure 9:
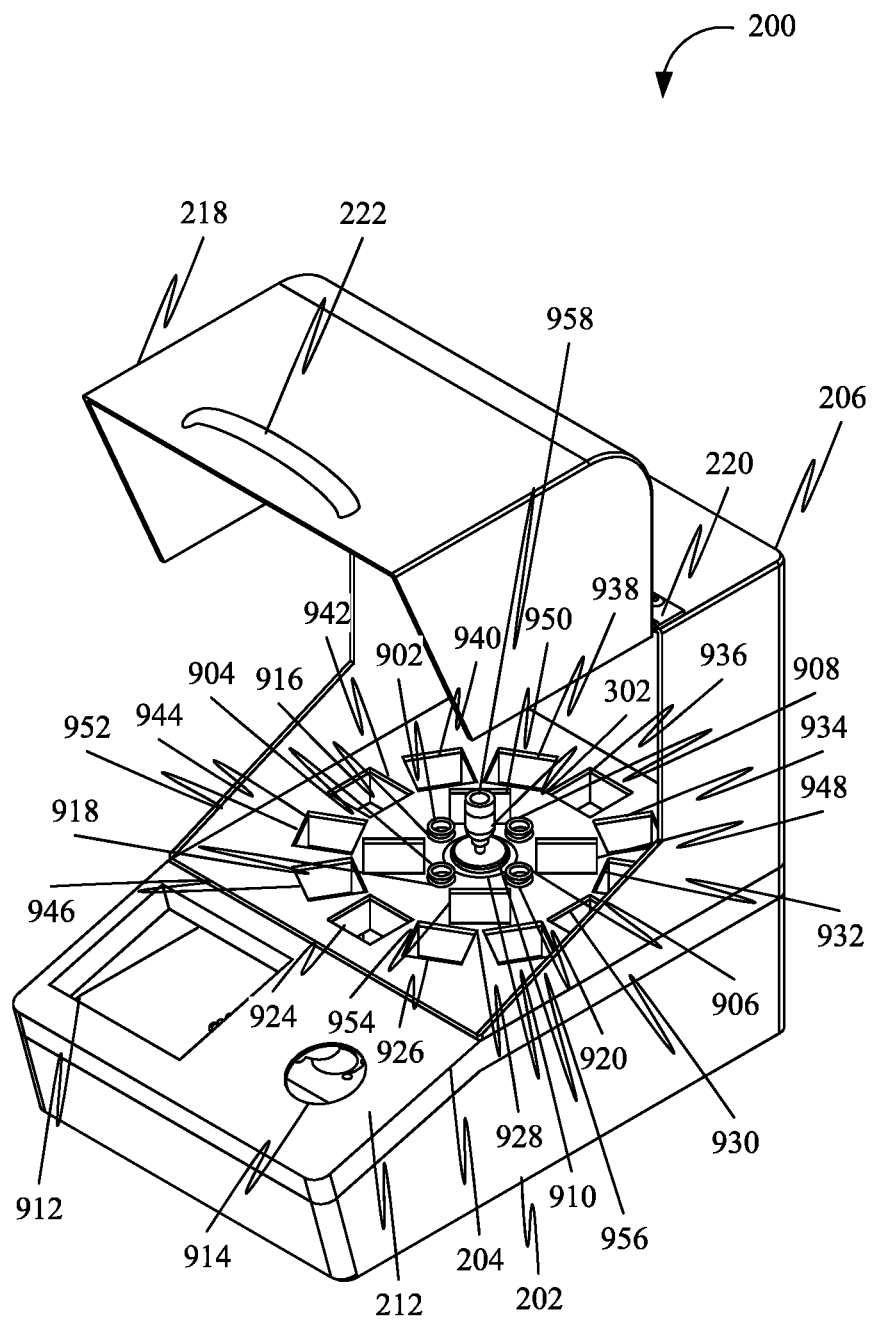
FIG. 9 is a top perspective view of the apparatus with the roundtable, the LCD screen, and the button removed, in accordance with some embodiments.
Figure 10:
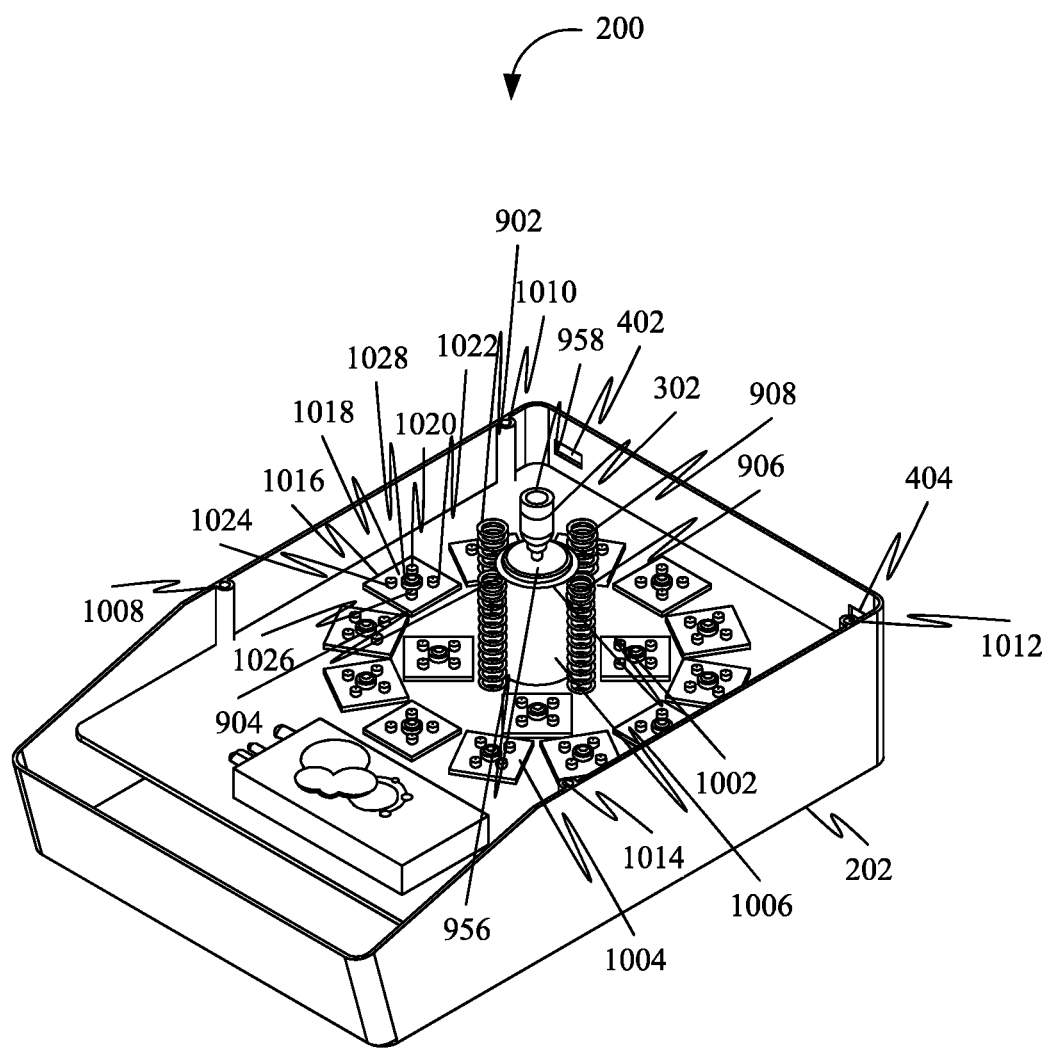
FIG. 10 is a top perspective view of the apparatus with the hood and the intermediate plate removed, in accordance with some embodiments.
Figure 12:
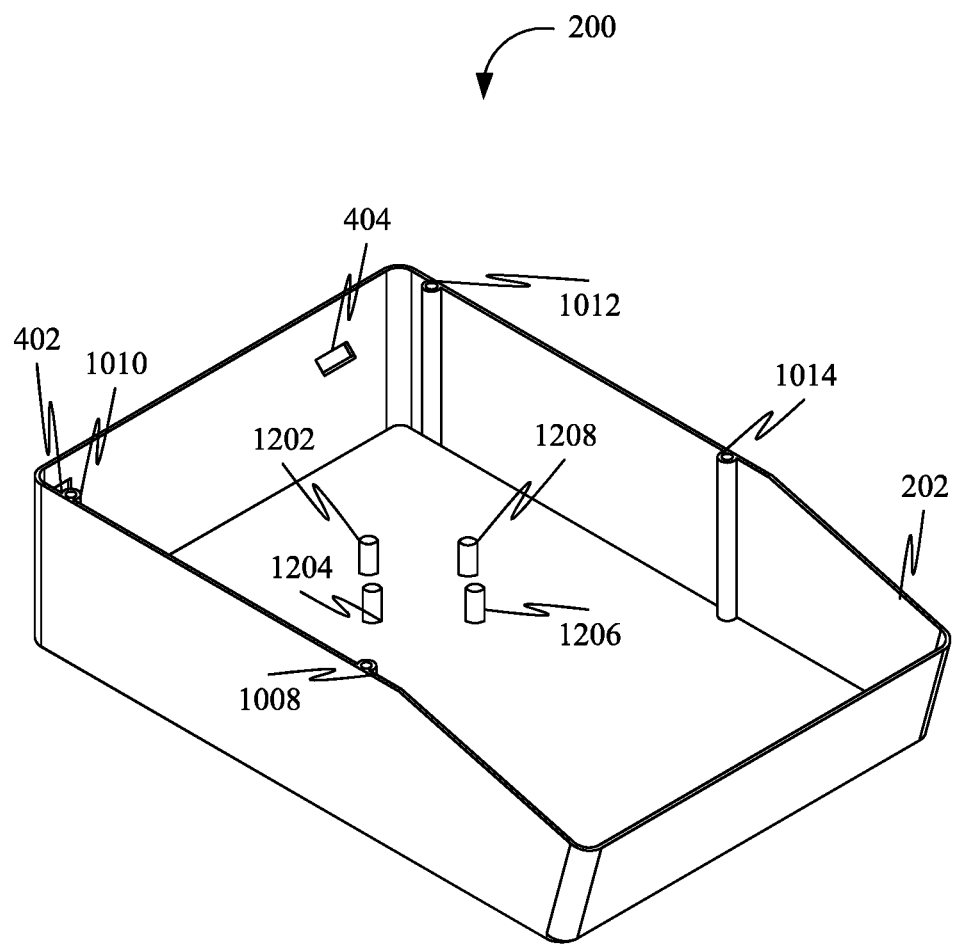
FIG. 12 is a top perspective view of the apparatus with the intermediate plate, the hood, the motion system, and the analysis system removed, in accordance with some embodiments.

Further, in some embodiments, the base 202 may include an interior cavity housing functional system of the analysis system 1004 and holstering a motor 1006 (as shown in FIG. 10). Further, the base 202 may include a plurality of port apertures 402-404 located along lateral edges and on the rear of the base 202. Further, the plurality of port apertures 402-404 suits a plurality of ports (not shown) comprised in the analysis system 1004. Further, the plurality of port apertures 402-404 may be rectilinear in geometry. Further, a port aperture of the plurality of port apertures 402-404 may be configured for fastening the plurality of ports using a port fastening mechanism (not shown). Further, the port fastening mechanism may include snap fits, self-locating geometry, adhesives, and so on. Further, the base 202 may include a plurality of base fastening apertures 1008-1014 bored in a vertical orientation and located in interior of the base 202 along the perimeter of the base 202. Further, the plurality of base fastening apertures 1008-1014 engages with a plurality of intermediate apertures (not shown) comprised in the intermediate plate 204 for securing the intermediate plate 204 to the base 202 through a plate fastening mechanism (not shown). Further, the plate fastening mechanism may include a bolt or screw, however other means of fastening may be employed including but not limited to: adhesives, snap fits, and so on. Further, the base 202 may include a plurality of base spring protrusions 1202-1208 (as shown in FIG. 12) located on a bottom interior surface of the base 202 and protruding upwards. Further, the plurality of base spring protrusions 1202-1208 engages with bottom of a plurality of springs 902-908 (as shown in FIG. 9) comprised in the motion system 1002. Further, the plurality of base spring protrusions 1202-1208 may be composed of at least four base spring protrusions arranged cardinally at a center relative to a rectilinear planar surface 210 comprised in the intermediate plate 204. Further, the base 202 may include a top side edge congruent to bottom side perimeter edges comprised in the intermediate plate 204. In an exemplary embodiment, an area 264 associated with the base 202 may be 115050.5 millimeters square. Further, in an exemplary embodiment, a thickness associated with the base 202 may be 3 millimeters. However, these dimensions may be adjusted after industrial production. Further, in an exemplary embodiment, the base 202 may be made up of plexiglass. Further, plexiglass may be replaced with another suitable material after industrial production.

Further, in some embodiments, the base 202 may be produced of a rigid material from a group may include at least one of plastic, metals, and composites.

Further, the intermediate plate 204 located above the base 202. Further, the intermediate plate 204 may be characterized by an intermediate plate perimeter. Further, the intermediate plate perimeter may be congruent and complementing to a perimeter of the base 202.

Further, in some embodiments, the intermediate plate 204 provides an angled plane ahead of the hood 206. Further, the angled plane may be configured for providing a cover of the analysis system 1004. Further, the intermediate plate 204 may include a motor aperture 910 (as shown in FIG. 9) located along a center of a rear rectilinear planar surface (not shown) of the intermediate plate 204. Further, the motor aperture 910 may be configured for permitting passage of the motor 1006. Further, the motor aperture 910 may include a motor fastening mechanism (not shown). further, the motor fastening mechanism may include conventional fasteners, adhesives, and so on. Further, the motor aperture 910 may be concentrically aligned with a vial biaxial aperture 260 and an adjustment biaxial aperture (not shown) comprised in the roundtable 208. Further, the intermediate plate 204 may include an LCD aperture 912 (as shown in FIG. 9) located along a slanted surface 212 of the intermediate plate 204 proximal to left side of the intermediate plate 204. Further, the LCD aperture 912 may be configured for housing and suit an LCD screen 214. Further, the LCD aperture 912 may include an LCD aperture fastening mechanism (not shown) configured for securing the LCD screen 214 into the intermediate plate 204. Further, the LCD aperture fastening mechanism may include self-locating geometry, adhesives, snap fits, and so on. Further, the intermediate plate 204 may include a plurality of button apertures located horizontally adjacent to the LCD aperture 912. Further, a button aperture 914 (as shown in FIG. 9) of the plurality of button apertures may be configured for housing a button 216 associated with the apparatus 200. Further, the button aperture 914 may include a button aperture fastening mechanism (not shown) configured for securing the button 216 into the intermediate plate 204 and permitting the button 216 to be depressed. Further, the intermediate plate 204 may include a plurality of sensor apertures 924-954 (as shown in FIG. 9) arranged along a topmost planar surface of the intermediate plate 204 and disparate the slanted surface 212. Further, the plurality of sensor apertures 924-954 may be arranged to coincide a planar location of the sensor unit of the plurality of sensor units on at least one board 1016 (as shown in FIG. 10). Further, the plurality of sensor apertures 924-954 may include a rectilinear geometry arranged radially between a first radial arrangement and a second radial arrangement circumscribed by the first radial arrangement where both are concentrically arranged around the motor aperture 910. Further, the intermediate plate 204 may include a plurality of intermediate spring apertures 916-922 (as shown in FIG. 9) radially arranged around the motor aperture 910. Further, the plurality of intermediate spring apertures 916-922 may be circumscribed by the first radial arrangement and second radial arrangement. Further, the plurality of intermediate spring apertures 916-922 may be configured for coinciding with a planar orientation of the plurality of base spring protrusions 1202-1208 comprised in the base 202. Further, the plurality of intermediate spring apertures 916-922 may be configured for permitting passage of the plurality of springs 902-908 comprised in the motion system 1002. Further, a quantity of the plurality of intermediate spring apertures 916-922 may be equal to a quantity of the plurality of springs 902-908. Further, the intermediate plate 204 may include the plurality of intermediate apertures located at points coincident with the plurality of base fastening apertures 1008-1014 comprised in the base 202 and engage therewith using an intermediate aperture fastening mechanism (not shown). Further, the intermediate aperture fastening mechanism may include screws, bolts, adhesives, and snap fits, etc. Further, in an exemplary embodiment, an area 266 associated with the intermediate plate 204 may be 149412.5 millimeters square. Further, in an exemplary embodiment, a thickness associated with the intermediate plate 204 may be 3 millimeters. Further, in an exemplary embodiment, the intermediate plate 204 may be made up of plexiglass. However, these dimensions may be adjusted after industrial production.

Further, in some embodiments, the intermediate plate 204 may be produced of a rigid material may include at least one of plastics, metals, and composites.

Further, the hood 206 may be located atop the intermediate plate 204. Further, the hood 206 may include a hood rectilinear receptacle. Further, the hood rectilinear receptacle may be secured to the intermediate plate 204 using a fastening mechanism (not shown).

Further, in some embodiments, the hood 206 may be configured for housing the roundtable 208, samples and the plurality of extraneous vials during the chemical analysis. Further, the hood 206 may include a plurality of complimenting intermediate apertures (not shown). Further, a complimenting intermediate apertures of the plurality of complimenting intermediate apertures is congruent in geometry, location, and orientation to one of the motor aperture 910, the plurality of sensor apertures 924-954 and the plurality of intermediate spring apertures 916-922. Further, the hood 206 may include a hood closure 218 pivotally affixed to the hood 206. Further, the hood closure 218 may include a transparent material to allow immediate observation of interior of the hood 206. Further, the hood closure 218 may be secured to the hood 206 through a hood hinge 220. Further, the hood hinge 220 may be configured for bridging between the hood closure 218 and the hood 206. Further, the bridging produces a state of isolation for the plurality of extraneous vials contained therein, conducive to incubation of samples in the plurality of extraneous vials. Further, the hood closure 218 may include a locking mechanism (not shown) to restrict access to contents within the hood 206. Further, the locking mechanism may include at least one of a manual locking mechanism and electronically actuated and verified. Further, the hood closure 218 may include the hood hinge 220 located atop the hood 206 and the hood closure 218 along topmost front edge. Further, the hood hinge 220 permits the hood closure 218 to pivot up and down. Further, the hood hinge 220 may include a means of retention (such as ratcheting) to affix opened state of the hood closure 218 prior to engaging to a closed state. Further, the hood closure 218 may include a handle 222 secured to a front surface of the hood closure 218 near a bottom edge of the hood closure 218. Further, the handle 222 may be affixed at two points to facilitate lifting the hood closure 218 upward. Further, the hood closure 218 may include a hood fastening mechanism (not shown) is configured for mitigating disturbance to the samples. Further, the hood fastening mechanism may include adhesives, fasteners, and snap fits, etc. Further, the hood fastening mechanism may be configured for securing a bottom planar surface of the hood 206 to a top rectilinear planar surface (not shown) of the intermediate plate 204. Further, in an exemplary embodiment, an area 268 associated with the hood 206 may be 129842 millimeters square. Further, in an exemplary embodiment, a thickness associated with the hood 206 may be 3 millimeters. Further, in an exemplary embodiment, the hood 206 may be made up of plexiglass. Further, in an exemplary embodiment, an area 270 associated with the hood closure 218 may be 87846.5 millimeters square. Further, in an exemplary embodiment, a thickness associated with the hood closure 218 may be 3 millimeters. Further, in an exemplary embodiment, the hood closure 218 may be made up of plexiglass. Further, the handle 222 may be made up of brass. However, these dimensions may be adjusted after industrial production.

Further, the roundtable 208 housed within the hood 206. Further, the roundtable 208 may include a curvilinear structure optimized and weighted to reduce a strain of a high rotational velocity.

Further, the motion system 1002 passing through and engaging with the roundtable 208 and the hood 206. Further, the motion system 1002 may be driven by the motor 1006 arranged in a bearing assembly (not shown) conducive to minimal frictional resistance to optimize power consumption of the apparatus 200.

Further, the analysis system 1004 embedded into the at least one board 1016 suspended within the base 202. Further, the analysis system 1004 facilitates automated chemical analysis of a plurality of extraneous vials. Further, the at least one board 1016 may include a processing device (not shown) and a plurality of sensor units. Further, each sensor unit 1018 of the plurality of sensor units may include a plurality of LEDs 1020-1026 and a sensor 1028. Further, the sensor 1028 may be communicatively coupled with the processing device. Further, the each sensor unit 1018 may be configured for generating a sensor data. Further, the processing device may be configured for analyzing the sensor data to generate a result notification associated with the chemical analysis of the plurality of extraneous vials.

Further, in some embodiments, the roundtable 208 may be coupled to the motion system 1002. Further, the roundtable 208 may be accessible through a hood closure 218 comprised in the hood 206. Further, the roundtable 208 may include a resting plate 224. Further, the resting plate 224 may include a curvilinear planar disk allowing examination of the plurality of extraneous vials by the analysis system 1004. Further, the curvilinear planar disk may be transparent. Further, the resting plate 224 may include a frictionless top side surface to permit a bottom of the plurality of extraneous vials to slide effortlessly and offering least resistance to the motor 1006, a first bearing (not shown), and a second bearing (not shown) comprised in the motion system 1002. Further, the resting plate 224 provides a barrier between the plurality of extraneous vials and the analysis system 1004. Further, the resting plate 224 may include a plurality of spring plate protrusions (not shown) projecting from underside of the resting plate 224 in planar orientation congruent to the plurality of base spring protrusions 1202-1208 comprised in the base 202. Further, the plurality of spring plate protrusions may be composed of a count equal to the plurality of springs 902-908 comprised in the motion system 1002. Further, the plurality of spring plate protrusions may be configured for engaging with the plurality of springs 902-908 to restrict a radial motion of the resting plate 224. Further, in an exemplary embodiment, the resting plate 224 may be 210 millimeters in diameter. Further, the resting plate 224 may be 70 millimeters in height. However, these dimensions may be adjusted after industrial production.

Figure 3:
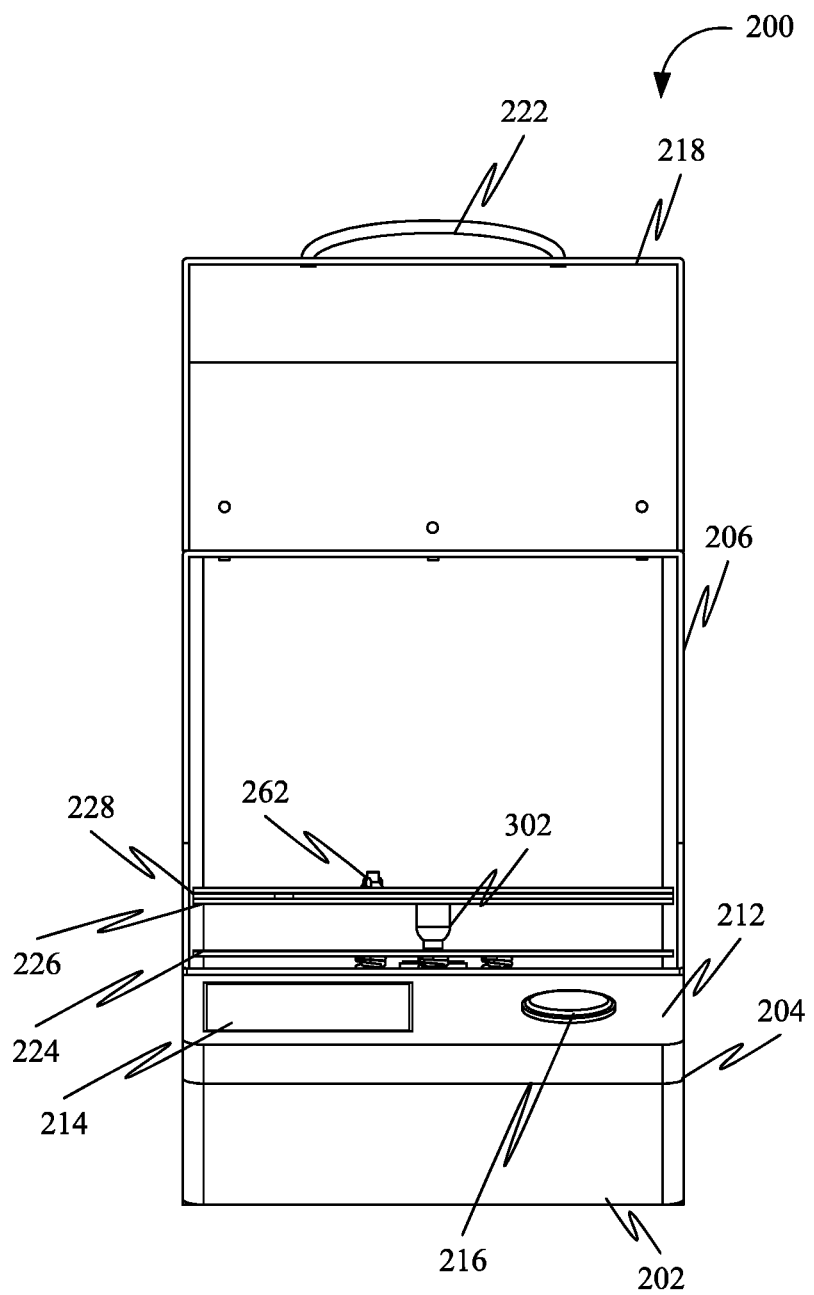
FIG. 3 is a front view of the apparatus for facilitating chemical analysis based on color principle, in accordance with some embodiments.

Further, the roundtable 208 may include a plurality of vial plates 226-228 secured to a biaxial element 302 (as shown in FIG. 3) comprised in the motion system 1002 through the first bearing and the second bearing concentrically arranged. Further, the plurality of vial plates 226-228 may include a first vial plate 926 and a second vial plate 928. Further, the first vial plate 926 and the second vial plate 928 are connected through a concentric and vertical cylindrical bridge. Further, the plurality of vial plates 226-228 may include a plurality of vial apertures 230-258 bored through the plurality of vial plates 226-228 with center points individually coincident to centers of the plurality of sensor apertures 924-954 comprised in the intermediate plate 204. Further, the plurality of vial apertures 230-258 may be curvilinear in geometry to permit a passage and securing of the plurality of extraneous vials. Further, the plurality of extraneous vials may be of non-descript sizes. Further, the plurality of vial plates 226-228 may include the vial biaxial aperture 260 located at a center of the plurality of vial plates 226-228 and secured by a cylindrical bridge therebetween. Further, the vial biaxial aperture 260 permits passage and securement to the biaxial element 302. Further, the vial biaxial aperture 260 may be configured for permitting rotation of the plurality of vial plates 226-228. Further, the plurality of vial plates 226-228 may include an adjustment slot 262 located on a top individual vial plate of the plurality of the vial plates. Further, the roundtable 208 may include a vial aperture adjustment plate (not shown) located interstitially between the plurality of vial plates 226-228. Further, the vial aperture adjustment plate may include an adjustment biaxial aperture located at the center of the vial aperture adjustment plate. Further, the adjustment biaxial aperture may be concentric to the biaxial element 302 and the vial biaxial aperture 260. Further, a diameter of the adjustment biaxial aperture may be equal to a diameter of the vial biaxial aperture 260. Further, the adjustment biaxial aperture may be preferably encased around a cylindrical bridge formed between the vial biaxial aperture 260 associated with each vial plate of the plurality of vial plates 226-228 and free to rotate therearound. Further, the vial aperture adjustment plate may include an adjustment protrusion (not shown) protruding from the vial aperture adjustment plate at a point radially coincident to the adjustment slot 262. Further, the adjustment protrusion may be configured for engaging with an adjustment fastener to secure an orientation associated with the vial aperture adjustment plate. Further, the adjustment fastener may be configured for securing and releasing the vial aperture adjustment plate to rotate and adjust relative size of the plurality of vial apertures 230-258. Further, the adjustment slot 262 may be curvilinearly inclined to allow modular alteration of the vial aperture adjustment plate in relation to the plurality of vial plates 226-228. Further, the adjustment slot 262 may be configured for permitting passage of the adjustment protrusion. Further, the vial aperture adjustment plate may include a plurality of adjustment apertures coincident and congruent to the plurality of vial apertures 230-258 permitted to alter location by rotation and securement through the adjustment slot 262 and the adjustment protrusion. Further, the vial aperture adjustment plate may include an alteration protrusion (such as ridged edges) produced radially outward from a tangent cylindrical surface of the vial aperture adjustment plate. Further, the alteration protrusion may be configured for homogenizing a distributed weight of the roundtable 208. Further, the plurality of vial plates 226-228 may include a voided plane (not shown) that is occupied by the vial aperture adjustment plate. Further, the plurality of vial plates 226-228 and the vial aperture adjustment plate may work in concert to secure a wide array of vial sizes. Further, the adjustment slot 262 may be circumvented or accentuated by an autonomous means of altering the orientation of the vial aperture adjustment plate relative to the plurality of vial plates 226-228 such as but not limited to actuators, ratcheting means, and magnetic induction. Further, the adjustment protrusion may be circumvented through an autonomous operation dictated by the processor through any number of articulating means such as but not limited to actuators, ratcheting means, magnetic induction, and so on. Further, in an exemplary embodiment, the plurality of vial plates 226-228 may be 210 millimeters in diameter. Further, the plurality of vials may be 42 millimeters in height. However, these dimensions may be adjusted after industrial production.

Further, in some embodiments, the motion system 1002 may be centered in relation to the top rectilinear planar surface of the intermediate plate 204. Further, the motion system 1002 may be attachable to the base 202. Further, the motion system 1002 may be passing through and engaging with at least one of the roundtable 208, the at least one board 1016, and the hood 206. Further, the motion system 1002 may include the plurality of springs 902-908 engaged between the plurality of base spring protrusions 1202-1208 comprised in the base 202 and the plurality of spring plate protrusions comprised in the roundtable 208. Further, the plurality of springs 902-908 may be configured for engaging and passing through at least one of the at least one board 1016, the intermediate plate 204, and the hood 206. Further, the plurality of springs 902-908 may be configured for permitting the resting plate 224 to stabilize and yield to unexpected perturbations of the plurality of extraneous vials associated with the high rotational velocity to prevent the degradation of the plurality of extraneous vials. Further, the preventing of the degradation of the plurality of extraneous vials facilitates mitigating jostling of samples in the plurality of extraneous vials. Further, the resting plate 224 may be comprised in the roundtable 208. Further, the motion system 1002 may include the motor 1006 secured to the intermediate plate 204. Further, the motion system 1002 may include gear boxes, banded constellations, and so on. Further, the motor 1006 may be oriented with a motor shaft 956 facing upward and coincident to the round table. Further, the motor 1006 may include a DC brushless motor that facilitates high speed radial velocities up to and in excess of 3000 RPM. Further, the motor 1006 may be secured to at least one of the base 202, plurality of springs 902-908, and the at least one board 1016 through conventional fasteners, adhesives, snap fits, and self-locating geometry. Further, the motor 1006 may be located at a center of the plurality of springs 902-908. Further, the motor shaft 956 may be configured for protruding from a center of the motor 1006. Further, the motor 1006 may include a key (not shown) configured for engage the biaxial element 302 to mechanically transfer all rotational motion thereto. Further, the key may be replaced by a notch. Further, the motion system 1002 may include the biaxial element 302 connected to at least one of the motor shaft 956 and the first bearing. Further, the biaxial element 302 may be configured for producing an oscillatory motion. Further, the oscillatory motion agitates the plurality of extraneous vials. Further, the oscillatory motion may be compensated by yielding the plurality of springs 902-908 and the resting plate 224. Further, the biaxial element 302 may include a biaxial aperture 958 and a biaxial fastener (not shown). Further, the biaxial aperture 958 may be located at top of the biaxial element 302. Further, the biaxial aperture 958 engages the biaxial fastener and secures the biaxial element 302 to the plurality of vial plates 226-228 comprised in the roundtable 208. Further, the biaxial fastener engages with the biaxial aperture 958 and the first bearing and the second bearing in connection to the plurality of vial plates 226-228 using a biaxial element fastening mechanism (not shown). Further, the biaxial element fastening mechanism may include a bolt that may be tightened down. Further, the biaxial element fastening mechanism facilitates arresting a vertical motion of the plurality of vial plates 226-228 to mitigate a nutation associated with the plurality of vial plates 226-228. Further, the motion system 1002 may include the first bearing connected to at least one of the second bearing and the biaxial element 302. Further, the first bearing may be concentrically arranged. Further, the first bearing may be configured for producing a first near-frictionless state for the plurality of vial plates 226-228. Further, the first bearing may be fitted to the motor 1006 using a tolerance fitting. Further, the first bearing may be fitted to the motor 1006 using other means of fastening such as adhesives, snaps, etc. Further, the motion system 1002 may include the second bearing concentrically arranged with the roundtable 208 and the biaxial element 302. Further, the second bearing may be secured interstitially between exterior surfaces of the first bearing and the vial biaxial aperture 260 of the plurality of vial plates 226-228. Further, the second bearing may be configured for introducing a second measure of near frictionless to reduce sustained power use requisite of the motor 1006 during the high rotational velocity conducted during the chemical analysis.

Further, at least one of the processing device and the plurality of sensor units may be communicatively coupled to at least one of an ancillary systems and a display device associated with the apparatus 200. Further, the at least one board 1016 may be secured in concert with a plurality of base apertures (not shown) comprised in the base 202 to expose the motor 1006 associated with a vertical inclination exposed to a fan unit. Further, the at least one board 1016 may be coupled to the button 216 secured within the button aperture 914 comprised in the intermediate plate 204. Further, the button 216 may be coupled with the apparatus 200. Further, the button 216 may be configured for operating as a hard-stop measure to shut down the apparatus 200 in an event of malfunction. Further, the button 216 may be configured for turning the apparatus 200 on from a shut-off state. Further, the button 216 may include a two-state switch from a group may include a depressible switch, toggles, and sliders. Further, the at least one board 1016 may be coupled to the LCD screen 214 rectilinear in geometry. Further, the LCD screen 214 may include a non-descript resolution capacity. Further, the LCD screen 214 may be secured within the LCD aperture 912 comprised in the intermediate plate 204. Further, the LCD screen 214 may be configured for permitting on site manipulation of parameters associated with the apparatus 200. Further, the LCD screen 214 may be configured for operating as a troubleshooting measure. Further, the at least one board 1016 may include the plurality of sensor units arranged congruent and coincident to planar centers of the plurality of sensor apertures 924-954 comprised in the intermediate plate 204. Further, the plurality of LEDs 1020-1026 may be arranged around the sensor near four corners of the each sensor unit 1018. Further, the plurality of LEDs 1020-1026 may be configured for emitting a light associated with a range of colors. Further, the sensor 1028 of the each sensor unit 1018 may be located centrally between the plurality of LEDs 1020-1026. Further, the sensor 1028 may be configured for capturing data associated with the sample in each extraneous vial of the plurality of extraneous vials at the high rotational velocity. Further, the roundtable 208 may be slowed to increase precision of the chemical analysis. Further, the sensor 1028 may be configured for receiving the light that rebounds off of the plurality of extraneous vials and samples. Further, the at least one board 1016 may include a plurality of electric ports (not shown) coupled with the plurality of port apertures 402-404 comprised in the base 202. Further, the plurality of electric ports may be coupled to the processing device. Further, the plurality of electric ports may include at least four USB ports and at least one network port (such as Ethernet, etc.). Further, the plurality of electric ports facilitates connecting the apparatus 200 to at least one external device. Further, the at least one external device may include an adjacent printer or other apparatus for further post-processing or data-offloading. Further, the at least one board 1016 may include the processing device communicatively coupled with at least one of the motor 1006, the button 216, the LCD screen 214, and the plurality of electric ports within the at least one board 1016. Further, the processing device facilitates the apparatus 200 to autonomously engage in the processes of the chemical analysis. Further, the processing device may be configured for producing the rotational motion in the motor 1006 conferring agitation.

In further embodiments, the apparatus 200 may include a fan (not shown) disposed between an interior bottom surface of the base 202 and underside of the at least one board 1016. Further, the fan may be configured for venting and providing a convective flow of air for the motor 1006. Further, the fan may be configured for reducing a heat buildup within the base 202 and the intermediate plate 204.

In further embodiments, the, the apparatus 200 may include a battery (not shown) enabling the apparatus 200 to operate disconnected from a conventional power grid. Further, the battery may be housed beneath the at least one board 1016 and secured through conventional fastening means with conventional leads that are in connection to the processing device through a plurality of cables.

In further embodiments, the apparatus 200 may include a heating array (not shown) attachable to the interior of the hood 206. Further, the heating array may be configured for modifying a temperature associated with the hood 206. Further, the heating array may include a heating sensor communicatively coupled to the processing device. Further, the heating sensor is configured for detecting the temperature. Further, the heating sensor may be configured for generating a heating sensor data. Further, the processing device may be configured for analyzing the heating sensor data to generate a heating notification.

In further embodiments, the apparatus 200 may include a cooling plate (not shown) disposed in the interior of the hood 206. Further, the cooling plate may be configured for producing a cooling effect within the hood 206 and the base 202. Further, the cooling plate may include a cooling sensor communicatively coupled to the processing device. Further, the cooling sensor is configured for detecting a temperature associated with the hood 206 and a cooling temperature associated with the cooling plate. Further, the cooling sensor may be configured for generating a cooling sensor data. Further, the processing device may be configured for analyzing the cooling sensor data to generate a cooling notification. Further, the processing device is configured for mitigating the cooling plate from reaching a critical temperature point. Further, the processing device is configured for moderating the temperature of the hood 206 to conserve power.

In further embodiments, the apparatus 200 may include at least one aperture adjustment actuator (not shown) configured for circumventing an adjustment protrusion comprised in the roundtable 208. Further, the aperture adjustment actuator may be configured for altering aperture size of the plurality of vial apertures 230-258 comprised in the roundtable 208 by rotating and locking orientation of the vial aperture adjustment plate relative to the plurality of vial plates 226-228. Further, the plurality of vial plates 226-228 and the vial aperture adjustment plate are comprised in the roundtable 208. Further, the at least one aperture adjustment actuator may include conventional actuators such as pressure-driven, magnetic induction, ratcheting means, and so on.

Figure 5:
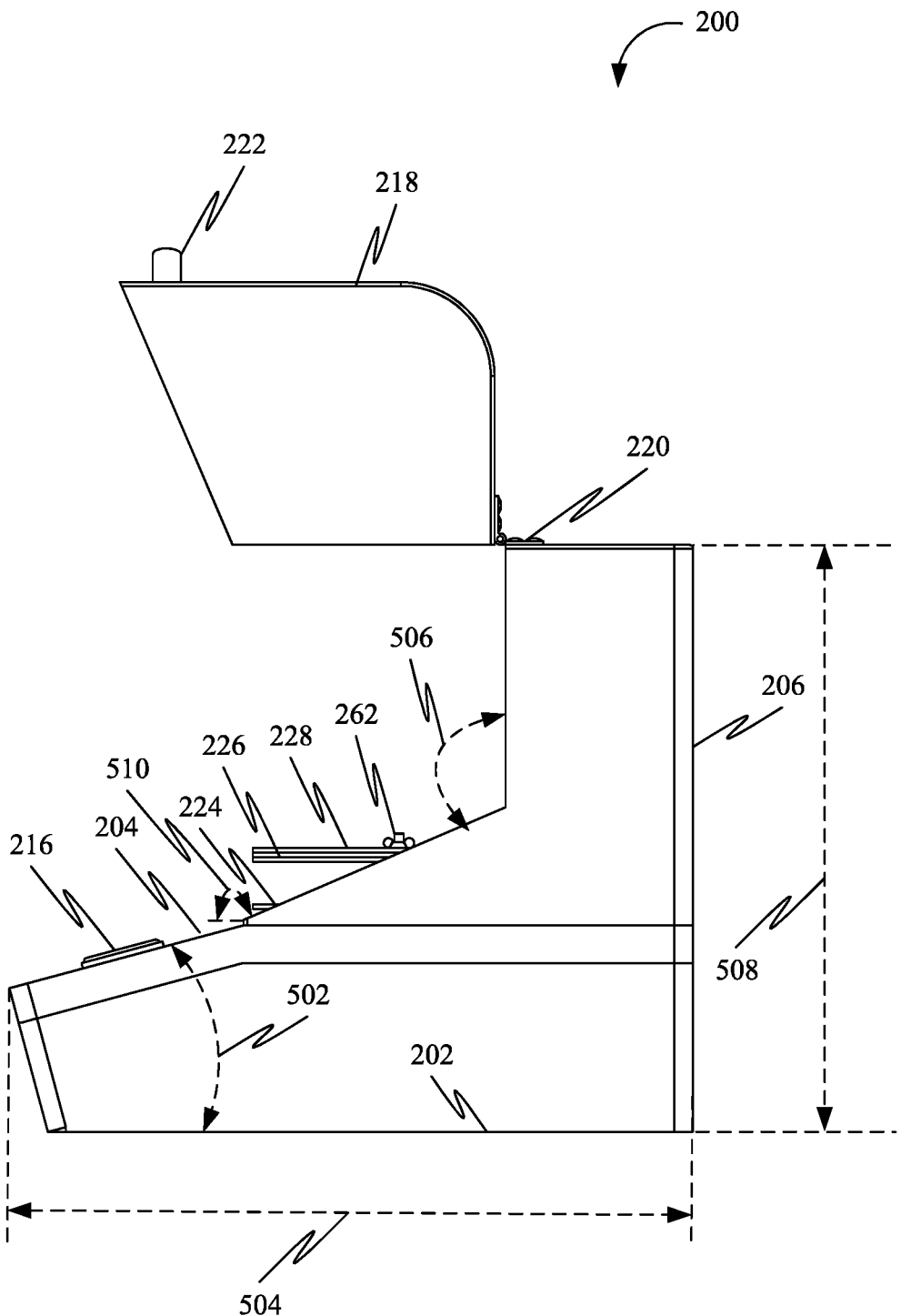
FIG. 5 is a right-side view of the apparatus for facilitating chemical analysis based on color principle, in accordance with some embodiments.
Figure 7:
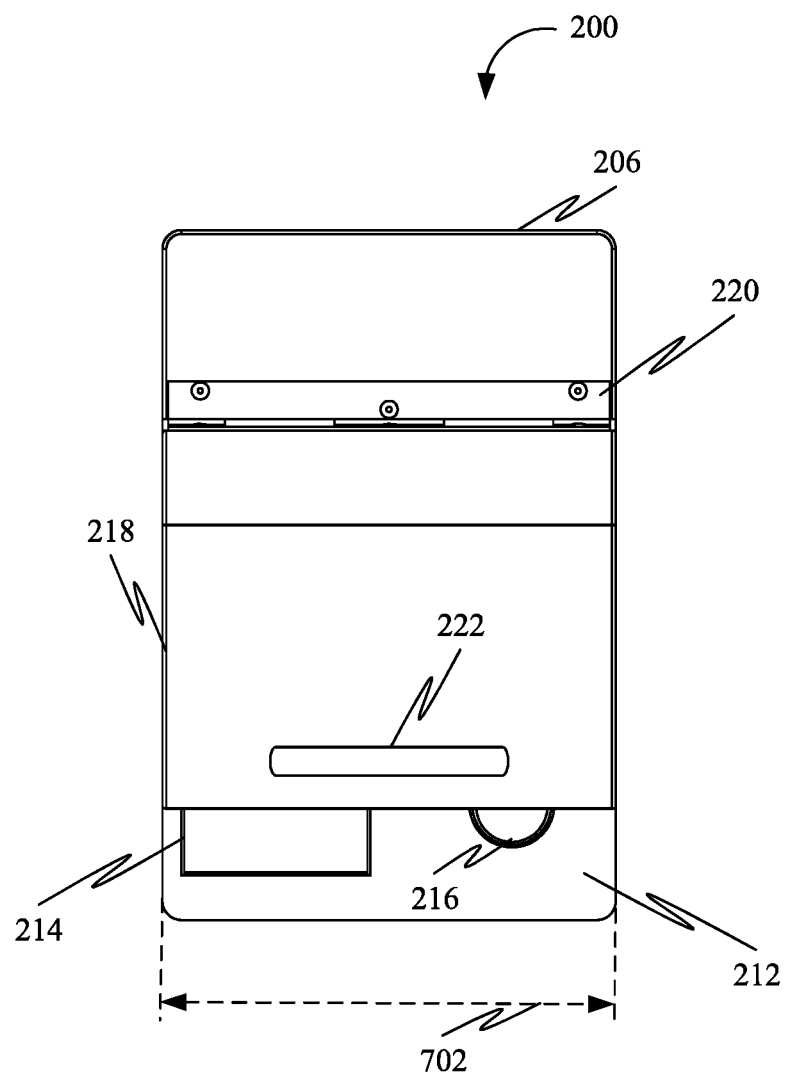
FIG. 7 is a top view of the apparatus for facilitating chemical analysis based on color principle, in accordance with some embodiments.

Further, in an exemplary embodiment, an angle 502 (as shown in FIG. 5) associated with the apparatus 200 may be 22.38°. Further, in an exemplary embodiment, a length 504 (as shown in FIG. 5) associated with the apparatus 200 may be 325 millimeters. Further, in an exemplary embodiment, a breadth 702 (as shown in FIG. 7) associated with the apparatus 200 may be 250 millimeters. Further, in an exemplary embodiment, a height 508 associated with the apparatus 200 may be 230 millimeters. Further, in an exemplary embodiment, an angle 506 associated with the apparatus 200 may be 115°. Further, an angle 510 associated with the apparatus 200 may be 155°. However, these dimensions may be adjusted after industrial production.

FIG. 3 is a front view of the apparatus 200 for facilitating chemical analysis based on color principle, in accordance with some embodiments.

Figure 4:
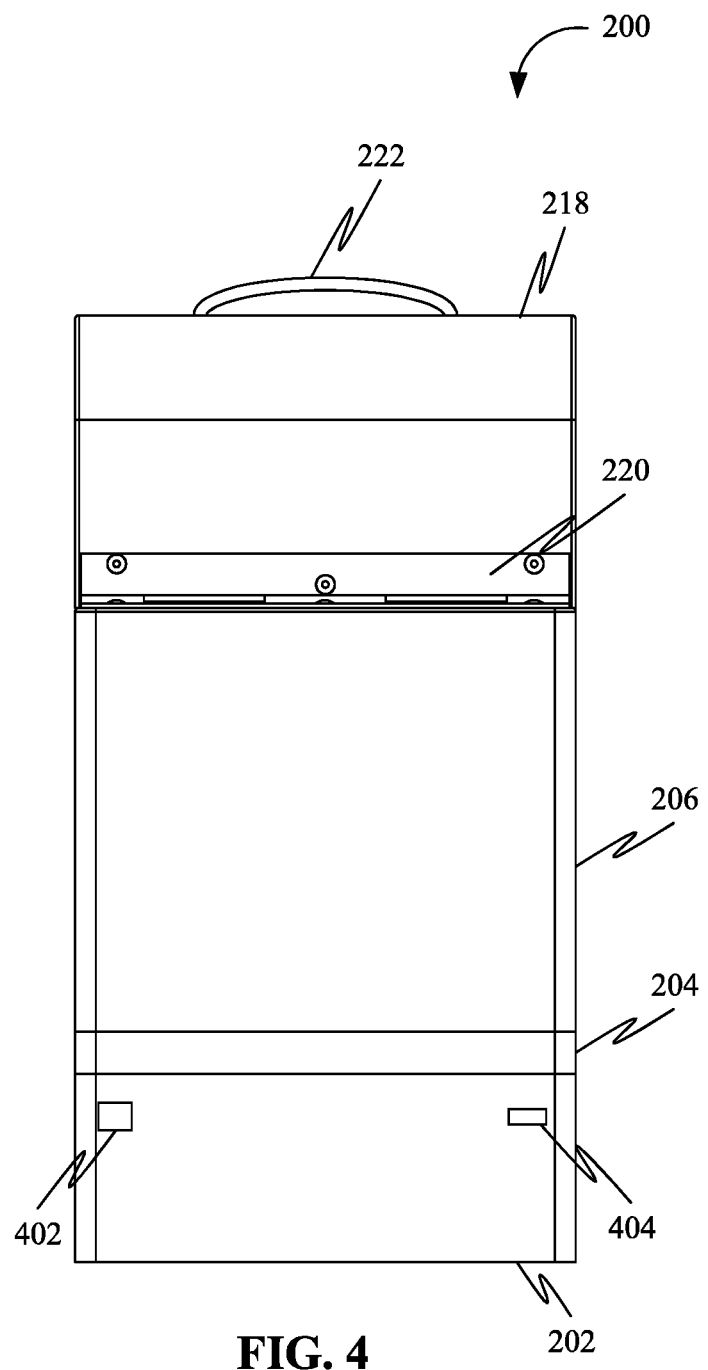
FIG. 4 is a rear view of the apparatus for facilitating chemical analysis based on color principle, in accordance with some embodiments.

FIG. 4 is a rear view of the apparatus 200 for facilitating chemical analysis based on color principle, in accordance with some embodiments.

FIG. 5 is a right-side view of the apparatus 200 for facilitating chemical analysis based on color principle, in accordance with some embodiments.

Figure 6:
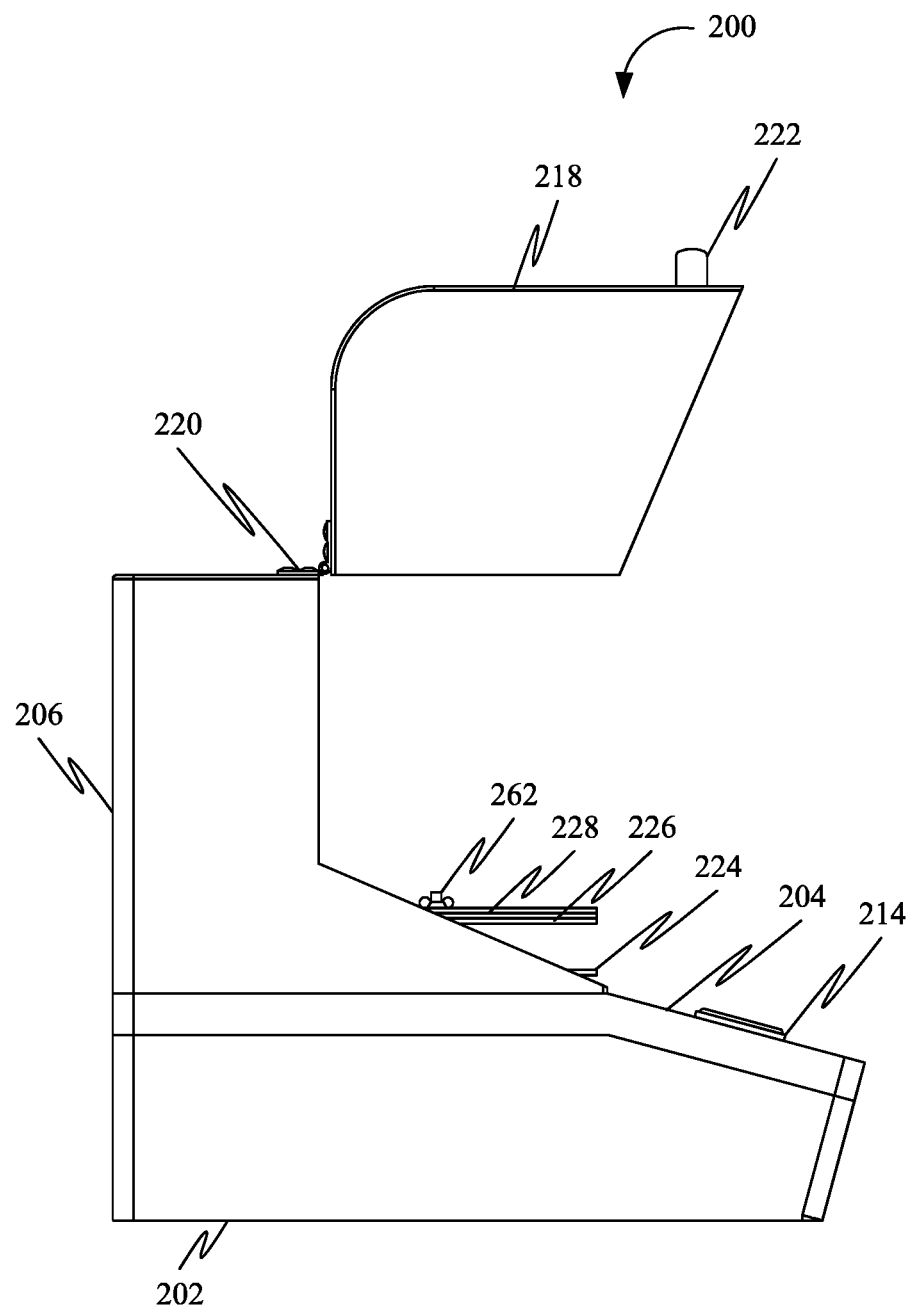
FIG. 6 is a left-side view of the apparatus for facilitating chemical analysis based on color principle, in accordance with some embodiments.

FIG. 6 is a left-side view of the apparatus 200 for facilitating chemical analysis based on color principle, in accordance with some embodiments.

FIG. 7 is a top view of the apparatus 200 for facilitating chemical analysis based on color principle, in accordance with some embodiments.

Figure 8:
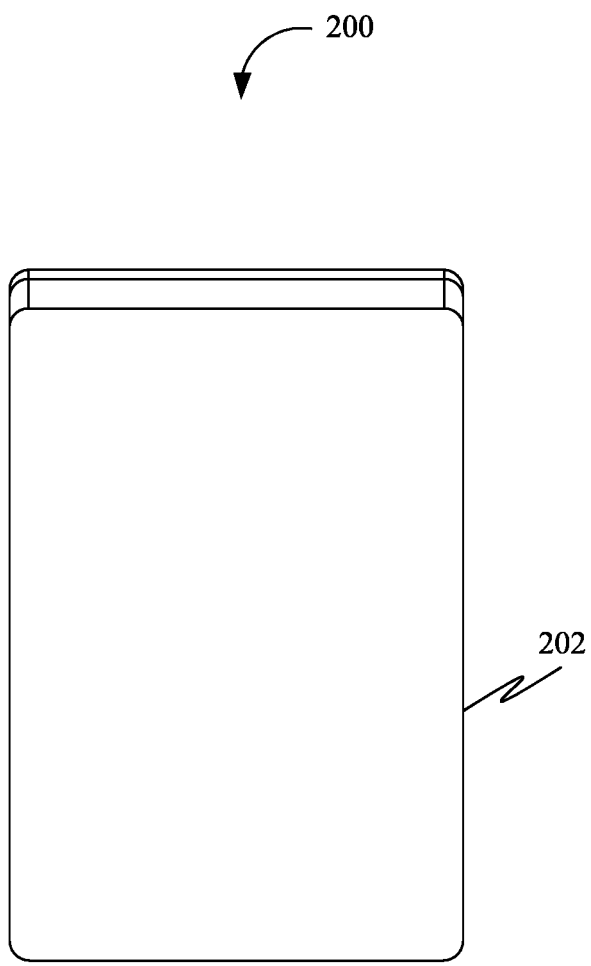
FIG. 8 is a bottom view of the apparatus for facilitating chemical analysis based on color principle, in accordance with some embodiments.

FIG. 8 is a bottom view of the apparatus 200 for facilitating chemical analysis based on color principle, in accordance with some embodiments.

FIG. 9 is a top perspective view of the apparatus 200 with the roundtable 208, the LCD screen 214, and the button 216 removed, in accordance with some embodiments.

FIG. 10 is a top perspective view of the apparatus 200 with the hood 206 and the intermediate plate 204 removed, in accordance with some embodiments.

Figure 11:
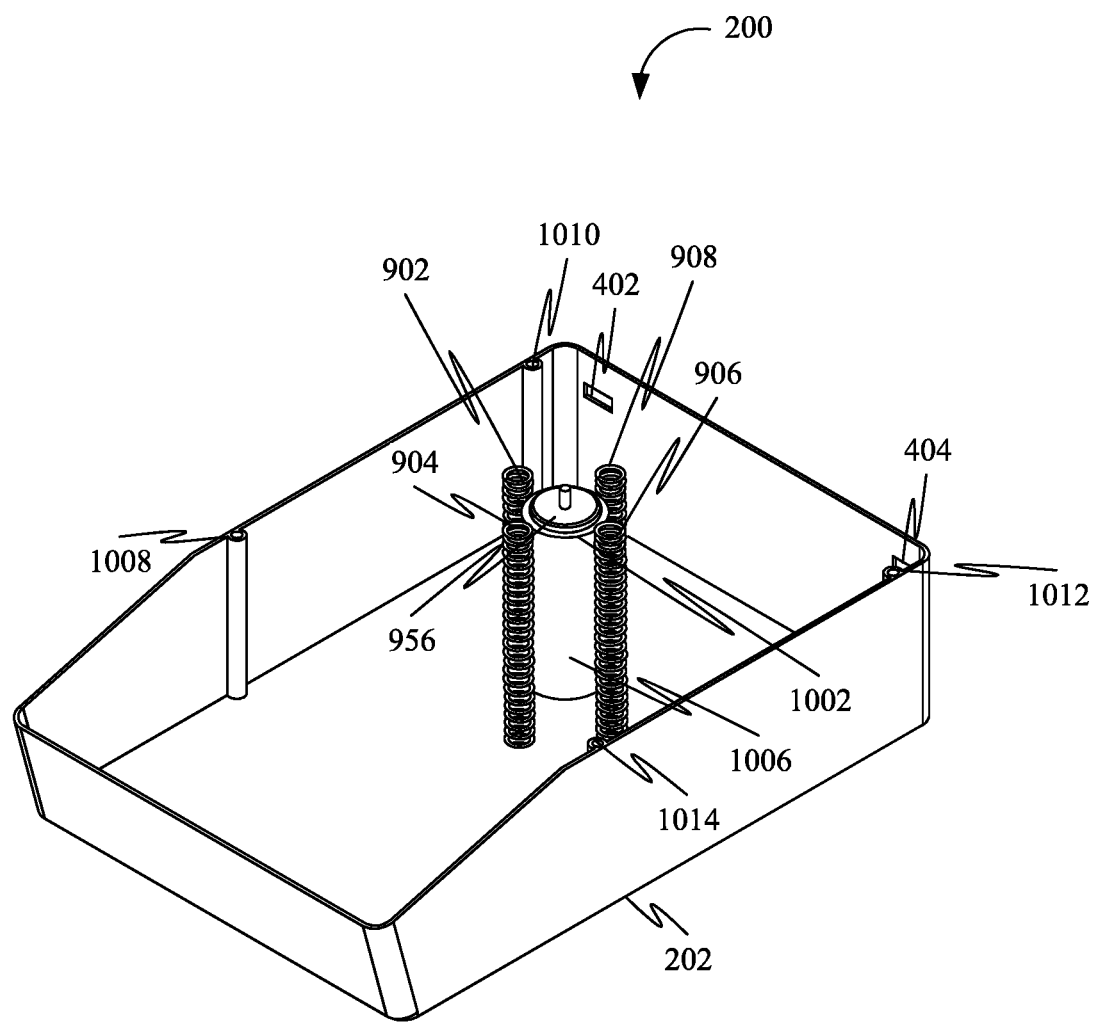
FIG. 11 is a top perspective view of the apparatus with the intermediate plate, the hood, and the analysis system removed, in accordance with some embodiments.

FIG. 11 is a top perspective view of the apparatus 200 with the intermediate plate 204, the hood 206, and the analysis system 1004 removed, in accordance with some embodiments.

FIG. 12 is a top perspective view of the apparatus 200 with the intermediate plate 204, the hood 206, the motion system 1002, and the analysis system 1004 removed, in accordance with some embodiments.

Figure 13:
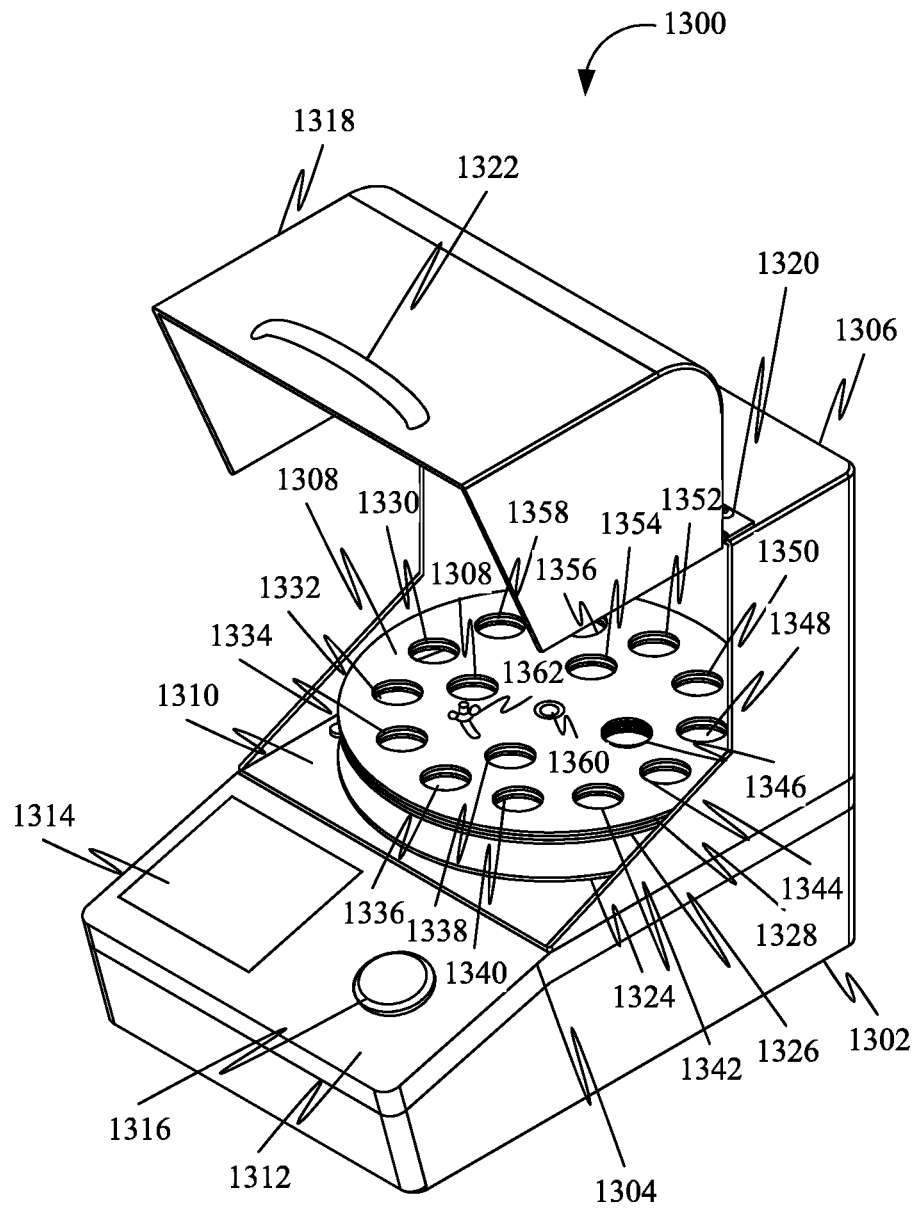
FIG. 13 is a top front perspective view of an apparatus for facilitating chemical analysis based on color principle, in accordance with some embodiments.

FIG. 13 is a top front perspective view of an apparatus 1300 for facilitating chemical analysis based on color principle, in accordance with some embodiments. Accordingly, the apparatus 1300 may include a base 1302, an intermediate plate 1304, a hood 1306, a roundtable 1308, a motion system 2102 (as shown in FIG. 21), and an analysis system 2104 (as shown in FIG. 21).

Further, the base 1302 may be located at the bottom of the apparatus 1300. Further, the base 1302 may be composed of a rectilinear receptacle.

Figure 20:
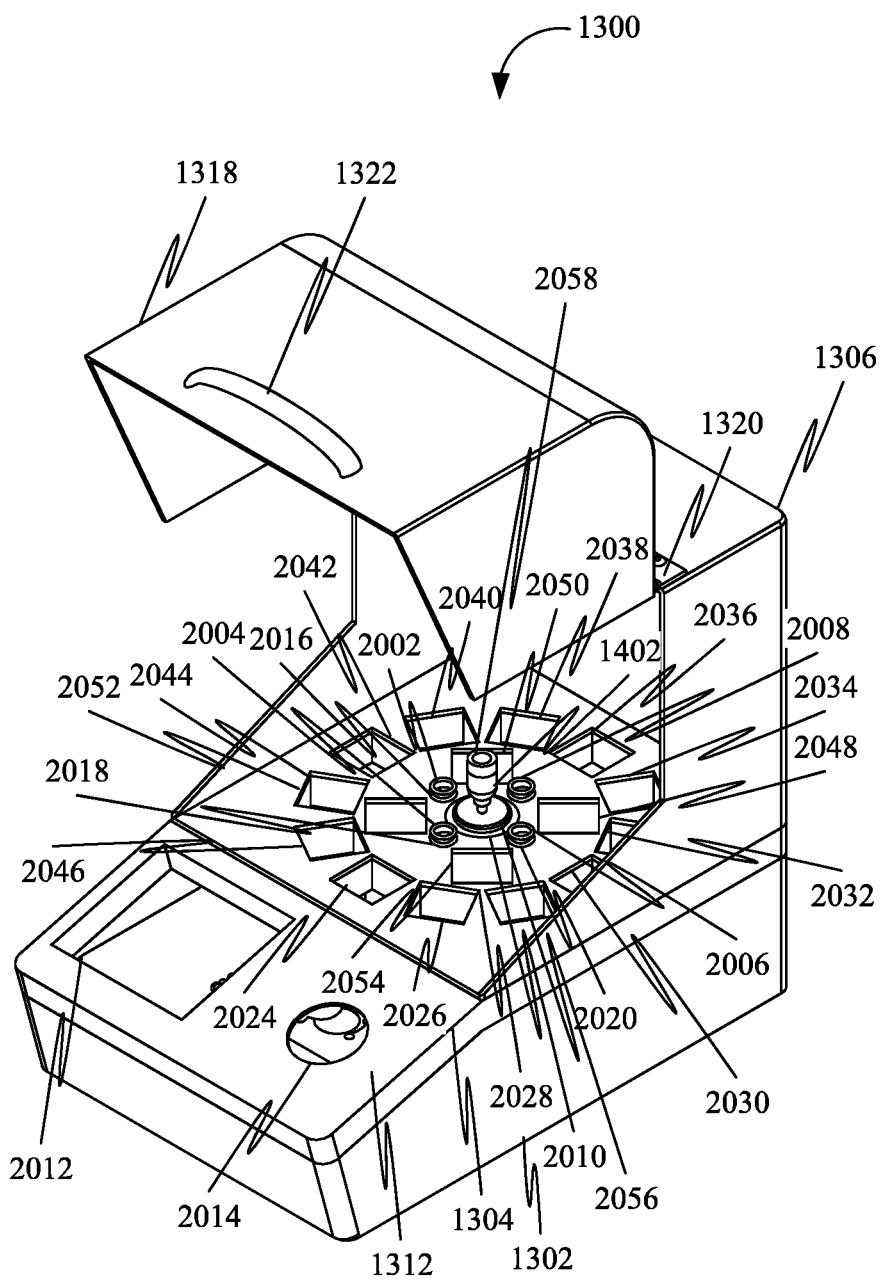
FIG. 20 is a top perspective view of the apparatus with the roundtable, the LCD screen, and the button removed, in accordance with some embodiments.
Figure 21:
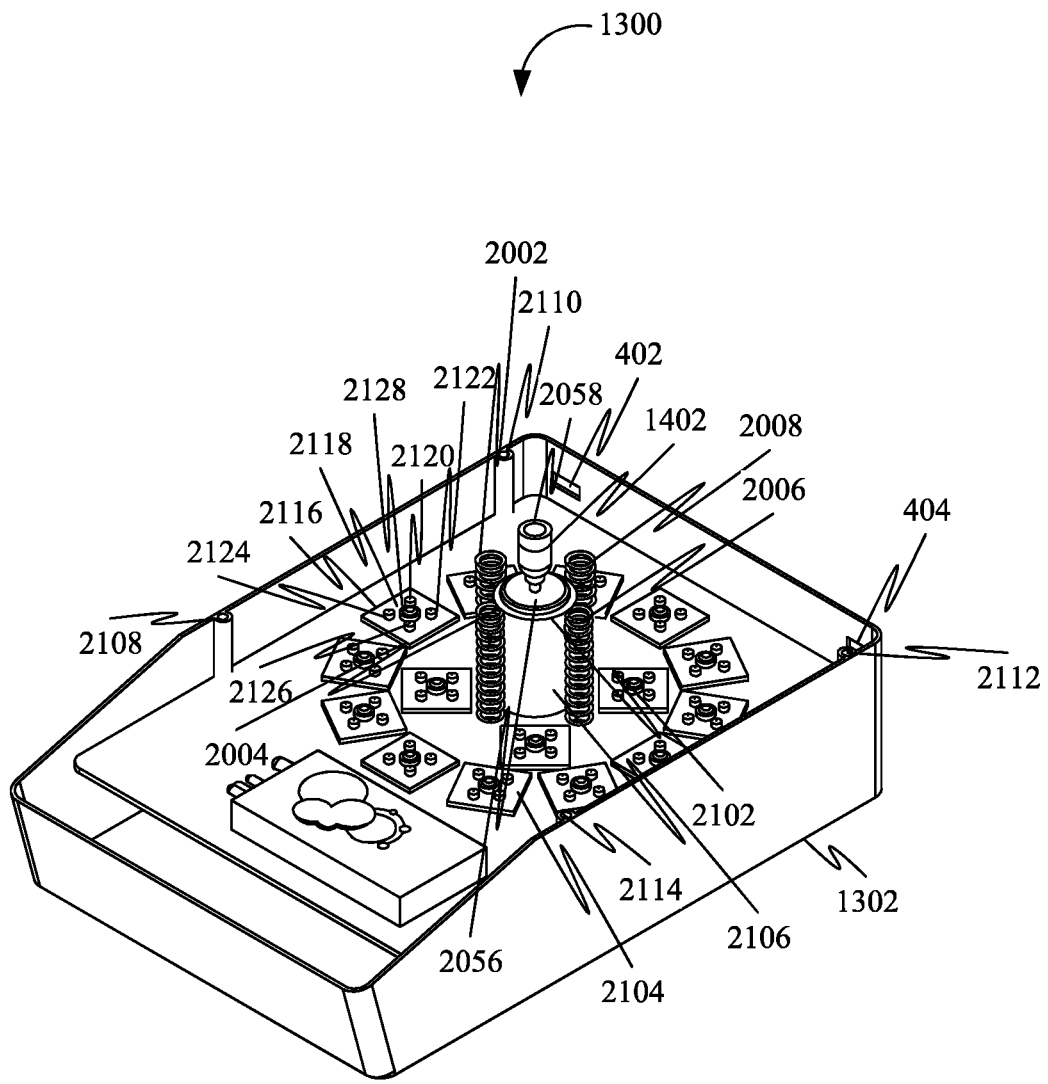
FIG. 21 is a top perspective view of the apparatus with the hood and the intermediate plate removed, in accordance with some embodiments.
Figure 23:
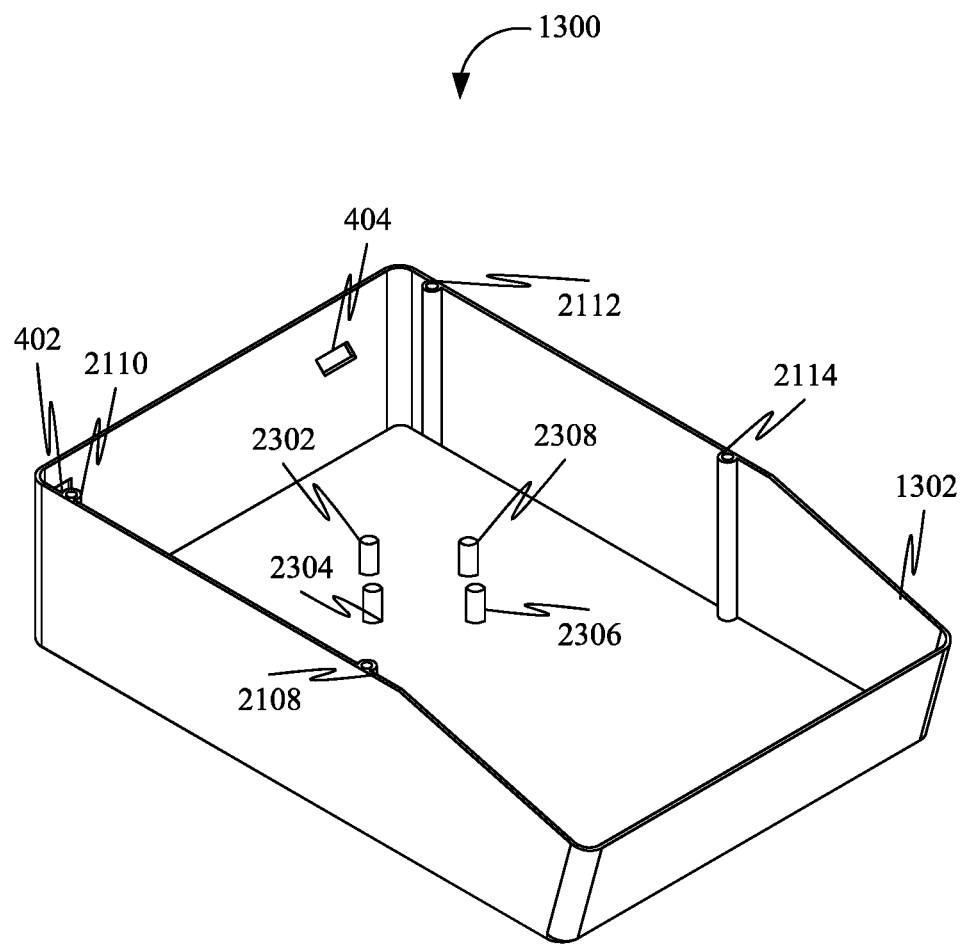
FIG. 23 is a top perspective view of the apparatus with the intermediate plate, the hood, the motion system and the analysis system removed, in accordance with some embodiments.

Further, in some embodiments, the base 1302 may include an interior cavity housing functional system of the analysis system 2104 and holstering a motor 2106 (as shown in FIG. 21). Further, the base 1302 may include a plurality of port apertures 1502-1504 located along lateral edges and on a rear of the base 1302. Further, the plurality of port apertures 1502-1504 suits a plurality of ports (not shown) comprised in the analysis system 2104. Further, the plurality of port apertures 1502-1504 may be rectilinear in geometry. Further, a port aperture of the plurality of port apertures 1502-1504 may be configured for fastening the plurality of ports using a port fastening mechanism (not shown). Further, the base 1302 may include a plurality of base fastening apertures 2108-2114 bored in a vertical orientation and located in interior of the base 1302 along the perimeter of the base 1302. Further, the plurality of base fastening apertures 2108-2114 engages with a plurality of intermediate apertures (not shown) comprised in the intermediate plate 1304 for securing the intermediate plate 1304 to the base 1302 through a plate fastening mechanism (not shown). Further, the base 1302 may include a plurality of base spring protrusions 2302-2308 (as shown in FIG. 23) located on a bottom interior surface of the base 1302 and protruding upwards. Further, the plurality of base spring protrusions 2302-2308 engages with a bottom of a plurality of springs 2002-2008 (as shown in FIG. 20) comprised in the motion system 2102. Further, the plurality of base spring protrusions 2302-2308 may be composed of at least four base spring protrusions arranged cardinally at a center relative to a rectilinear planar surface 1310 comprised in the intermediate plate 1304.

Further, the intermediate plate 1304 may be located above the base 1302. Further, the intermediate plate 1304 may be characterized by an intermediate plate perimeter. Further, the intermediate plate perimeter may be congruent and complementing to a perimeter of the base 1302.

Further, the hood 1306 located atop the intermediate plate 1304. Further, the hood 1306 may include a hood rectilinear receptacle. Further, the hood rectilinear receptacle may be secured to the intermediate plate 1304 using a fastening mechanism (not shown).

Further, the roundtable 1308 housed within the hood 1306. Further, the roundtable 1308 may include a curvilinear structure optimized and weighted to reduce a strain of a high rotational velocity.

Further, the motion system 2102 passing through and engaging with the roundtable 1308 and the hood 1306. Further, the motion system 2102 may be driven by the motor 2106 arranged in a bearing assembly (not shown) conducive to minimal frictional resistance to optimize power consumption of the apparatus 1300.

Further, the analysis system 2104 may be embedded into at least one board 2116 (as shown in FIG. 21) suspended within the base 1302. Further, the analysis system 2104 facilitates automated chemical analysis of a plurality of extraneous vials (not shown). Further, the at least one board 2116 may include a processing device (not shown) and a plurality of sensor units. Further, each sensor unit 2118 of the plurality of sensor units may include a plurality of LEDs 2120-2126 and a sensor 2128. Further, the sensor 2128 may be communicatively coupled with the processing device. Further, the each sensor unit 2118 may be configured for generating a sensor data. Further, the processing device may be configured for analyzing the sensor data to generate a result notification associated with the chemical analysis of the plurality of extraneous vials.

Further, in some embodiments, the intermediate plate 1304 provides an angled plane ahead of the hood 1306. Further, the angled plane may be configured for providing a cover of the analysis system 2104. Further, the intermediate plate 1304 may include a motor aperture 2010 (as shown in FIG. 20) located along a center of a rear rectilinear planar surface (not shown) of the intermediate plate 1304. Further, the motor aperture 2010 may be configured for permitting passage of the motor 2106. Further, the motor aperture 2010 may include a motor fastening mechanism (not shown). Further, the motor aperture 2010 may be concentrically aligned with a vial biaxial aperture 1360 and an adjustment-biaxial aperture (not shown) comprised in the roundtable 1308. Further, the intermediate plate 1304 may include an LCD aperture 2012 (as shown in FIG. 20) located along a slanted surface 1312 of the intermediate plate 1304 proximal to left side of the intermediate plate 1304. Further, the LCD aperture 2012 may be configured for housing and suit an LCD screen 1314. Further, the LCD aperture 2012 may include an LCD aperture fastening mechanism (not shown) configured for securing the LCD screen 1314 into the intermediate plate 1304. Further, the intermediate plate 1304 may include a plurality of button apertures located horizontally adjacent to the LCD aperture 2012. Further, a button aperture 2014 of the plurality of button apertures may be configured for housing a button 1316 associated with the apparatus 1300. Further, the button aperture 2014 may include a button aperture fastening mechanism (not shown) configured for securing the button 1316 into the intermediate plate 1304 and permitting the button 1316 to be depressed. Further, the intermediate plate 1304 may include a plurality of sensor apertures 2024-2054 (as shown in FIG. 20) arranged along a topmost planar surface of the intermediate plate 1304 and disparate the slanted surface 1312. Further, the plurality of sensor apertures 2024-2054 may be arranged to coincide a planar location of the each sensor unit 2118 of the plurality of sensor units on the at least one board 2116. Further, the plurality of sensor apertures 2024-2054 may include a rectilinear geometry arranged radially between a first radial arrangement and a second radial arrangement circumscribed by the first radial arrangement where both are concentrically arranged around the motor aperture 2010. Further, the intermediate plate 1304 may include a plurality of intermediate spring apertures 2016-2022 (as shown in FIG. 20) radially arranged around the motor aperture 2010. Further, the plurality of intermediate spring apertures 2016-2022 may be circumscribed by the first radial arrangement and second radial arrangement. Further, the plurality of intermediate spring apertures 2016-2022 may be configured for coinciding with a planar orientation of the plurality of base spring protrusions 2302-2308 comprised in the base 1302. Further, the plurality of intermediate spring apertures 2016-2022 may be configured for permitting passage of the plurality of springs 2002-2008 comprised in the motion system 2102. Further, a quantity of the plurality of intermediate spring apertures 2016-2022 may be equal to a quantity of the plurality of springs 2002-2008. Further, the intermediate plate 1304 may include the plurality of intermediate apertures located at points coincident with the plurality of base fastening apertures 2108-2114 comprised in the base 1302 and engage therewith using an intermediate aperture fastening mechanism (not shown).

Further, in some embodiments, the hood 1306 may be configured for housing the roundtable 1308, samples and the plurality of extraneous vials during the chemical analysis. Further, the hood 1306 may include a plurality of complimenting intermediate apertures (not shown) bored through a bottom surface. Further, the plurality of complimenting intermediate apertures is congruent in geometry, location, and orientation to one of the motor aperture 2010, the plurality of sensor apertures 2024-2054 and the plurality of intermediate spring apertures 2016-2022. Further, the motor aperture 2010, the plurality of sensor apertures 2024-2054, and the plurality of intermediate spring apertures 2016-2022 may be comprised in the intermediate plate 1304. Further, the hood 1306 may include a hood closure 1318 pivotally affixed to the hood 1306. Further, the hood closure 1318 may include a transparent material to allow immediate observation of interior of the hood 1306. Further, the hood closure 1318 may be secured to the hood 1306 through a hood hinge 1320. Further, the hood hinge 1320 may be configured for bridging between the hood closure 1318 and the hood 1306. Further, the bridging produces a state of isolation for the plurality of extraneous vials contained therein, conducive to incubation of the samples in the plurality of extraneous vials. Further, the hood closure 1318 may include a locking mechanism (not shown) to restrict access to contents within the hood 1306. Further, the locking mechanism may include at least one of a manual locking mechanism and electronically actuated and verified. Further, the hood closure 1318 may include the hood hinge 1320 located atop the hood 1306 and the hood closure 1318 along topmost front edge. Further, the hood hinge 1320 permits the hood closure 1318 to pivot up and down. Further, the hood hinge 1320 may include a means of retention to affix opened state of the hood closure 1318 prior to engaging to a closed state. Further, the hood closure 1318 may include a handle 1322 secured to a front surface of the hood closure 1318 near a bottom edge of the hood closure 1318. Further, the handle 1322 may be affixed at two points to facilitate lifting the hood closure 1318 upward. Further, the hood closure 1318 may include a hood fastening mechanism (not shown) is configured for mitigating disturbance to the samples. Further, the hood fastening mechanism may be configured for securing a bottom planar surface of the hood 1306 to a top rectilinear planar surface (not shown) of the intermediate plate 1304.

Further, in some embodiments, the roundtable 1308 may be coupled to the motion system 2102. Further, the roundtable 1308 may be accessible through the hood closure 1318 comprised in the hood 1306. Further, the roundtable 1308 may include a resting plate 1324 may include a curvilinear planar disk allowing examination of the plurality of extraneous vials by the analysis system 2104. Further, the resting plate 1324 may include a frictionless top side surface to permit a bottom of the plurality of extraneous vials to slide effortlessly and offering least resistance to the motor 2106, a first bearing (not shown), and a second bearing (not shown) comprised in the motion system 2102. Further, the resting plate 1324 provides a barrier between the plurality of extraneous vials and the analysis system 2104. Further, the resting plate 1324 may include a plurality of spring plate protrusions (not shown) projecting from an underside of the resting plate 1324 in planar orientation congruent to the plurality of base spring protrusions 2302-2308 comprised in the base 1302. Further, the plurality of spring plate protrusions may be composed of a count equal to a plurality of springs 2002-2008 comprised in the motion system 2102. Further, the plurality of spring plate protrusions may be configured for engaging with the plurality of springs 2002-2008 to restrict a radial motion of the resting plate 1324.

Figure 14:
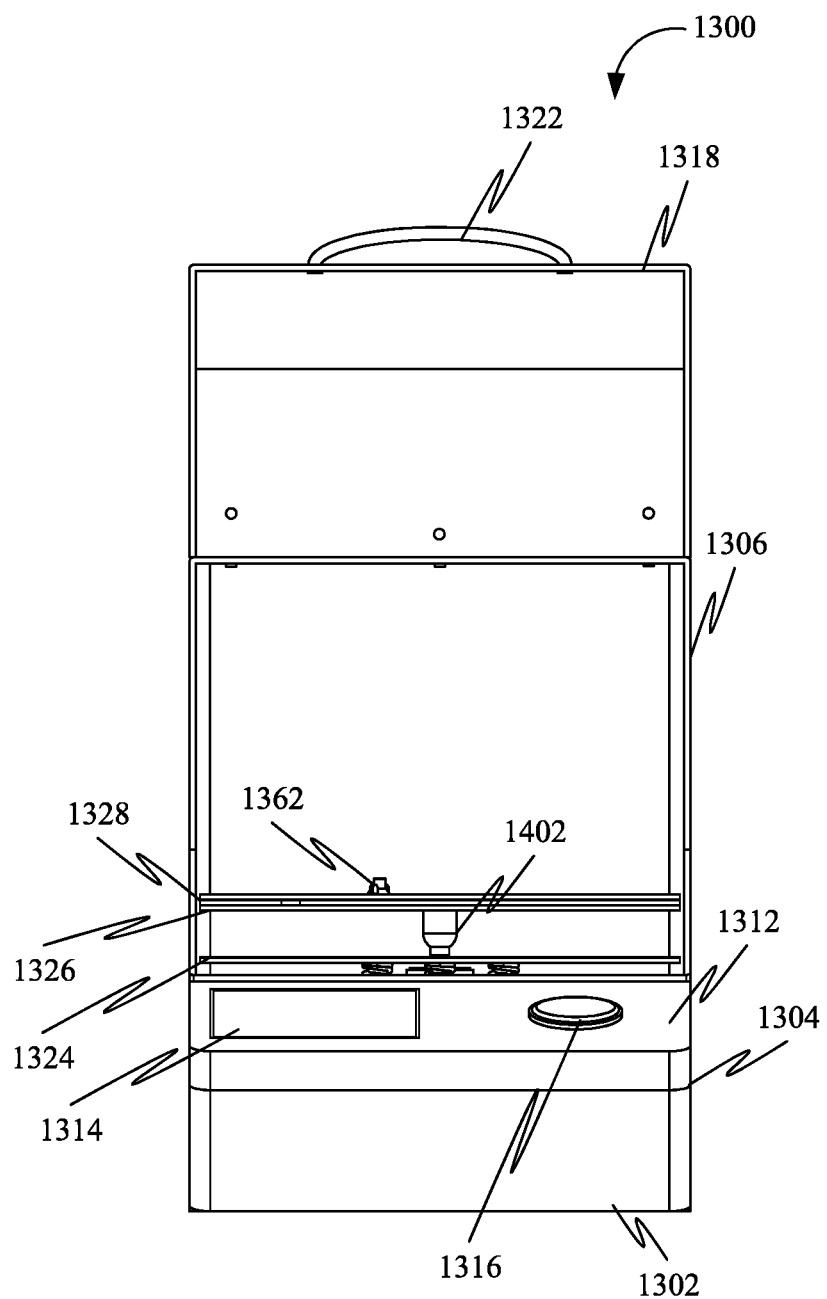
FIG. 14 is a front view of the apparatus for facilitating chemical analysis based on color principle, in accordance with some embodiments.

Further, the roundtable 1308 may include a plurality of vial plates 1326-1328 secured to a biaxial element 1402 (as shown in FIG. 14) comprised in the motion system 2102 through a first bearing and a second bearing concentrically arranged. Further, the first bearing and the second bearing are comprised in the motion system 2102. Further, the plurality of vial plates 1326-1328 may include a first vial plate 1326 and a second vial plate 1328. Further, the first vial plate 1326 and the second vial plate 1328 are connected through a concentric and vertical cylindrical bridge. Further, the plurality of vial plates 1326-1328 may include a plurality of vial apertures 1330-1358 bored through the plurality of vial plates 1326-1328 with center points individually coincident to centers of the plurality of sensor apertures 2024-2054 comprised in the intermediate plate 1304. Further, the plurality of vial apertures 1330-1358 may be curvilinear in geometry to permit a passage and securing of the plurality of extraneous vials. Further, the plurality of vial plates 1326-1328 may include the vial biaxial aperture 1360 located at a center of the plurality of vial plates 1326-1328 and secured by a cylindrical bridge therebetween. Further, the vial biaxial aperture 1360 permits passage and securement to the biaxial element 1402. Further, the vial biaxial aperture 1360 may be configured for permitting rotation of the plurality of vial plates 1326-1328. Further, the plurality of vial plates 1326-1328 may include an adjustment slot 1362 located on a top individual vial plate of the plurality of the vial plates 1326-1328.

Further, the roundtable 1308 may include a vial aperture adjustment plate (not shown) located interstitially between the plurality of vial plates 1326-1328. Further, the vial aperture adjustment plate may include an adjustment biaxial aperture located at the center of the vial aperture adjustment plate. Further, the adjustment biaxial aperture may be concentric to the biaxial element 1402 and the vial biaxial aperture 1360. Further, a diameter of the adjustment biaxial aperture may be equal to a diameter of the vial biaxial aperture 1360. Further, the adjustment biaxial aperture may be preferably encased around a cylindrical bridge formed between the vial biaxial aperture 1360 associated with each vial plate of the plurality of vial plates 1326-1328 and free to rotate therearound. Further, the vial aperture adjustment plate may include an adjustment protrusion protruding from the vial aperture adjustment plate at a point radially coincident to the adjustment slot 1362 of the top individual vial plate. Further, the adjustment protrusion may be configured for engaging with an adjustment fastener to secure an orientation associated with the vial aperture adjustment plate. Further, the adjustment fastener may be configured for securing and releasing the vial aperture adjustment plate to rotate and adjust relative size of the plurality of vial apertures 1330-1358. Further, the adjustment slot 1362 may be curvilinearly inclined to allow modular alteration of the vial aperture adjustment plate in relation to the plurality of vial plates 1326-1328. Further, the adjustment slot 1362 may be configured for permitting passage of the adjustment protrusion. Further, the vial aperture adjustment plate may include a plurality of adjustment apertures coincident and congruent to the plurality of vial apertures 1330-1358 permitted to alter location by rotation and securement through the adjustment slot 1362 and the adjustment protrusion. Further, the vial aperture adjustment plate may include an alteration protrusion produced radially outward from a tangent cylindrical surface of the vial aperture adjustment plate. Further, the alteration protrusion may be configured for homogenizing a distributed weight of the roundtable 1308.

Further, in some embodiments, the motion system 2102 may be centered in relation to the top rectilinear planar surface of the intermediate plate 1304. Further, the motion system 2102 may be attachable to the base 1302. Further, the motion system 2102 may be passing through and engaging with at least one of the roundtable 1308, the at least one board 2116, and the hood 1306. Further, the motion system 2102 may include the plurality of springs 2002-2008 engaged between the plurality of base spring protrusions 2302-2308 comprised in the base 1302 and the plurality of spring plate protrusions comprised in the roundtable 1308. Further, the plurality of springs 2002-2008 may be configured for engaging and passing through at least one of the at least one board 2116, the intermediate plate 1304, and the hood 1306. Further, the plurality of springs 2002-2008 may be configured for permitting the resting plate 1324 to stabilize and yield to unexpected perturbations of the plurality of extraneous vials associated with the high rotational velocity to prevent the degradation of the plurality of extraneous vials. Further, the preventing of the degradation of the plurality of extraneous vials facilitates mitigating jostling of the samples in the plurality of extraneous vials. Further, the resting plate 1324 may be comprised in the roundtable 1308. Further, the motion system 2102 may include the motor 2106 secured to the intermediate plate 1304. Further, the motor 2106 may be oriented with a motor shaft 2056 (as shown in FIG. 20) facing upward and coincident to the round table. Further, the motor 2106 may be located at a center of the plurality of springs 2002-2008. Further, the motor shaft 2056 may be configured for protruding from a center of the motor 2106. Further, the motor 2106 may include a key (not shown) configured for engage the biaxial to mechanically transfer all rotational motion thereto. Further, the motion system 2102 may include the biaxial element 1402 connected to at least one of the motor shaft 2056 and the first bearing. Further, the biaxial element 1402 may be configured for producing an oscillatory motion. Further, the oscillatory motion agitates the plurality of extraneous vials. Further, the oscillatory motion may be compensated by yielding the plurality of springs 2002-2008 and the resting plate 1324. Further, the biaxial element 1402 may include a biaxial aperture 2058 (as shown in FIG. 20) and a biaxial fastener (not shown). Further, the biaxial aperture 2058 may be located at top of the biaxial element 1402. Further, the biaxial aperture 2058 engages the biaxial fastener and secures the biaxial element 1402 to the plurality of vial plates 1326-1328 comprised in the roundtable 1308. Further, the biaxial fastener engages with the biaxial aperture 2058 and the first bearing and the second bearing in connection to the plurality of vial plates 1326-1328 using a biaxial element fastening mechanism (not shown). Further, the biaxial element fastening mechanism facilitates arresting a vertical motion of the plurality of vial plates 1326-1328 to mitigate a nutation associated with the plurality of vial plates

1326-1328. Further, the motion system 2102 may include the first bearing connected to at least one of the second bearing and the biaxial element 1402. Further, the first bearing may be concentrically arranged. Further, the first bearing may be configured for producing a first near-frictionless state for the plurality of vial plates 1326-1328. Further, the first bearing may be fitted to the motor 2106 using a tolerance fitting. Further, the motion system 2102 may include the second bearing concentrically arranged with the roundtable 1308 and the biaxial element 1402. Further, the second bearing may be secured interstitially between exterior surfaces of the first bearing and the vial biaxial aperture 1360 of the plurality of vial plates 1326-1328. Further, the second bearing may be configured for introducing a second measure of near-frictionless to reduce sustained power use requisite of the motor 2106 during the high rotational velocity conducted during the chemical analysis.

Further, in some embodiments, at least one of the processing device and the plurality of sensor units may be communicatively coupled to at least one of an ancillary systems and a display device associated with the apparatus 1300. Further, the at least one board 2116 may be secured in concert with a plurality of base apertures (not shown) comprised in the base 1302 to expose the motor 2106 associated with a vertical inclination exposed to a fan unit. Further, the at least one board 2116 may include the button 1316 secured within the button aperture 2014 comprised in the intermediate plate 1304. Further, the button 1316 may be coupled with the apparatus 1300. Further, the button 1316 may be configured for operating as a hard-stop measure to shut down the apparatus 1300 in an event of malfunction. Further, the button 1316 may be configured for turning the apparatus 1300 on from a shut-off state. Further, the button 1316 may include a two state switch from a group may include a depressible switch, toggles, and sliders. Further, the at least one board 2116 may include the LCD screen 1314 rectilinear in geometry. Further, the LCD screen 1314 may include a non-descript resolution capacity. Further, the LCD screen 1314 may be secured within the LCD aperture 2012 comprised in the intermediate plate 1304. Further, the LCD screen 1314 may be configured for permitting on-site manipulation of parameters associated with the apparatus 1300. Further, the LCD screen 1314 may be configured for operating as a troubleshooting measure. Further, the at least one board 2116 may include the plurality of sensor units arranged congruent and coincident to planar centers of the plurality of sensor apertures 2024-2054 comprised in the intermediate plate 1304. Further, the plurality of LEDs 2120-2126 may be arranged around the sensor 2128 near four corners of the each sensor unit 2118. Further, the plurality of LEDs 2120-2126 may be configured for emitting a light associated with a range of colors. Further, the sensor 2128 of the each sensor unit 2118 may be located centrally between the plurality of LEDs 2120-2126. Further, the sensor 2128 may be configured for receiving the light. Further, the sensor 2128 may be configured for capturing data associated with a sample contained in each extraneous vial of the plurality of extraneous vials at the high rotational velocity. Further, the at least one board 2116 may include a plurality of electric ports (not shown) coupled with the plurality of port apertures 1502-1504. Further, the plurality of electric ports may be coupled to the processing device. Further, the plurality of electric ports may include at least four USB ports and at least one network port. Further, the plurality of electric ports facilitates connecting the apparatus 1300 to at least one external device. Further, the at least one board 2116 may include the processing device communicatively coupled with at least one of the motor 2106, the button 1316, the LCD screen 1314, and the plurality of electric ports within the at least one board 2116. Further, the processing device facilitates the apparatus 1300 to autonomously engage in the processes of the chemical analysis. Further, the processing device may be configured for producing the rotational motion in the motor 2106 conferring agitation.

In further embodiments, the apparatus 1300 may include a fan (not shown) disposed between an interior bottom surface of the base 1302 and underside of the at least one board 2116. Further, the fan may be configured for venting and providing a convective flow of air for the motor 2106. Further, the fan may be configured for reducing a heat buildup within the base 1302 and the intermediate plate 1304.

FIG. 14 is a front view of the apparatus 1300 for facilitating chemical analysis based on color principle, in accordance with some embodiments.

Figure 15:
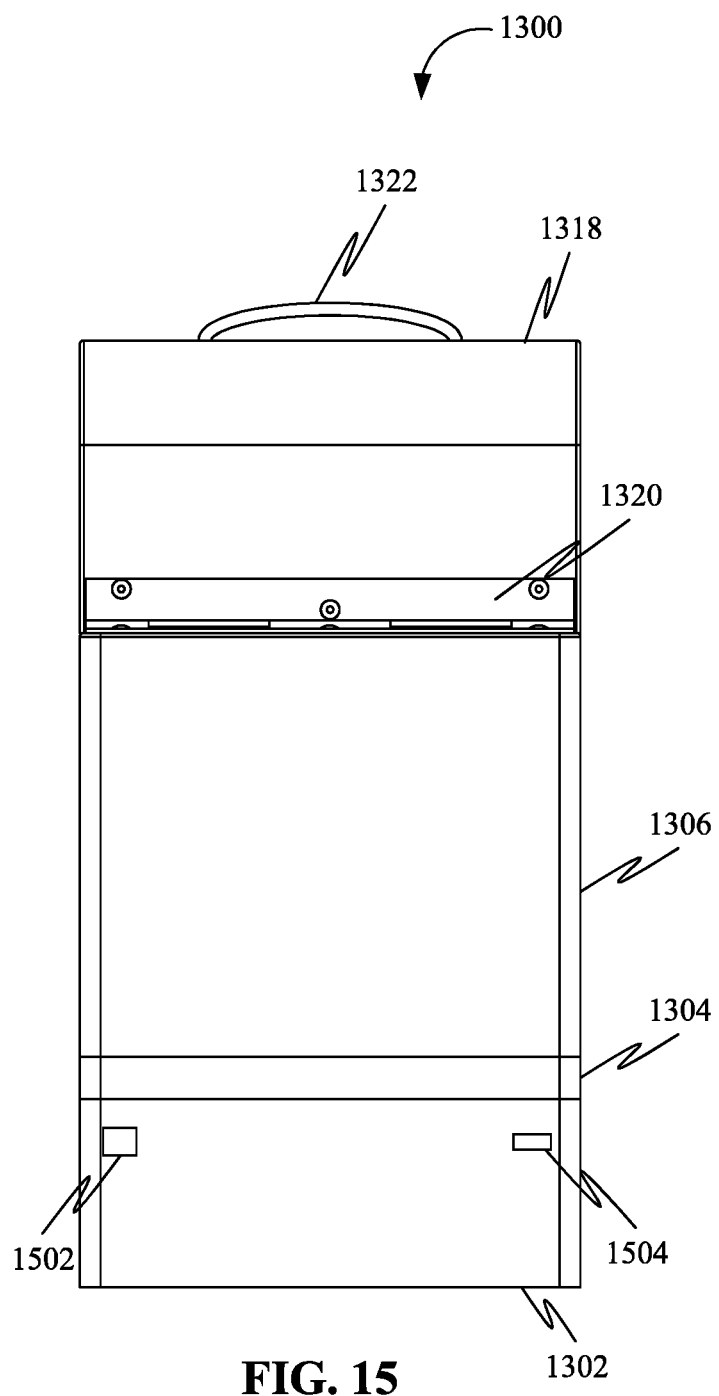
FIG. 15 is a rear view of the apparatus for facilitating chemical analysis based on color principle, in accordance with some embodiments.

FIG. 15 is a rear view of the apparatus 1300 for facilitating chemical analysis based on color principle, in accordance with some embodiments.

Figure 16:
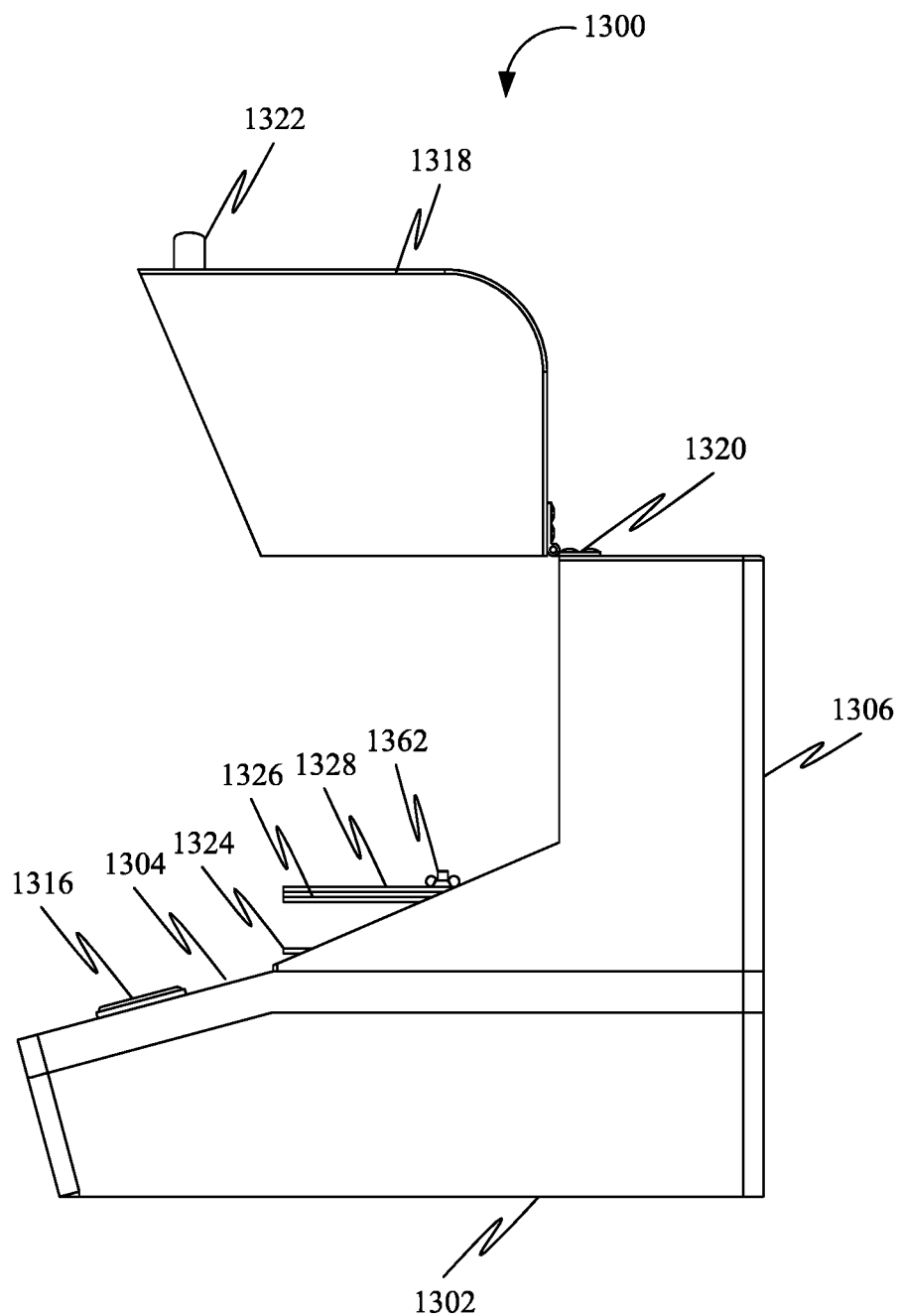
FIG. 16 is a right-side view of the apparatus for facilitating chemical analysis based on color principle, in accordance with some embodiments.

FIG. 16 is a right-side view of the apparatus 1300 for facilitating chemical analysis based on color principle, in accordance with some embodiments.

Figure 17:
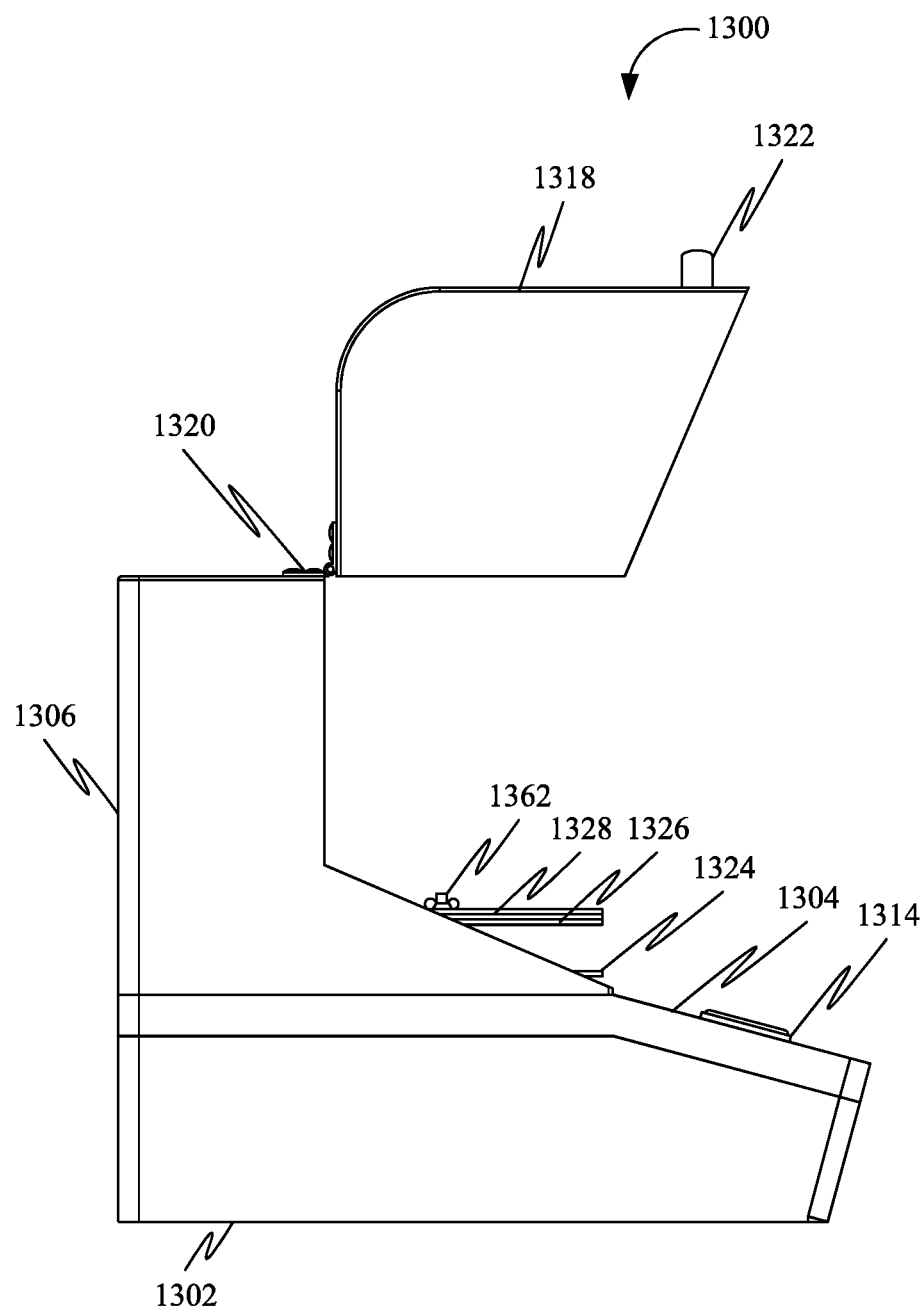
FIG. 17 is a left-side view of the apparatus for facilitating chemical analysis based on color principle, in accordance with some embodiments.

FIG. 17 is a left-side view of the apparatus 1300 for facilitating chemical analysis based on color principle, in accordance with some embodiments.

Figure 18:
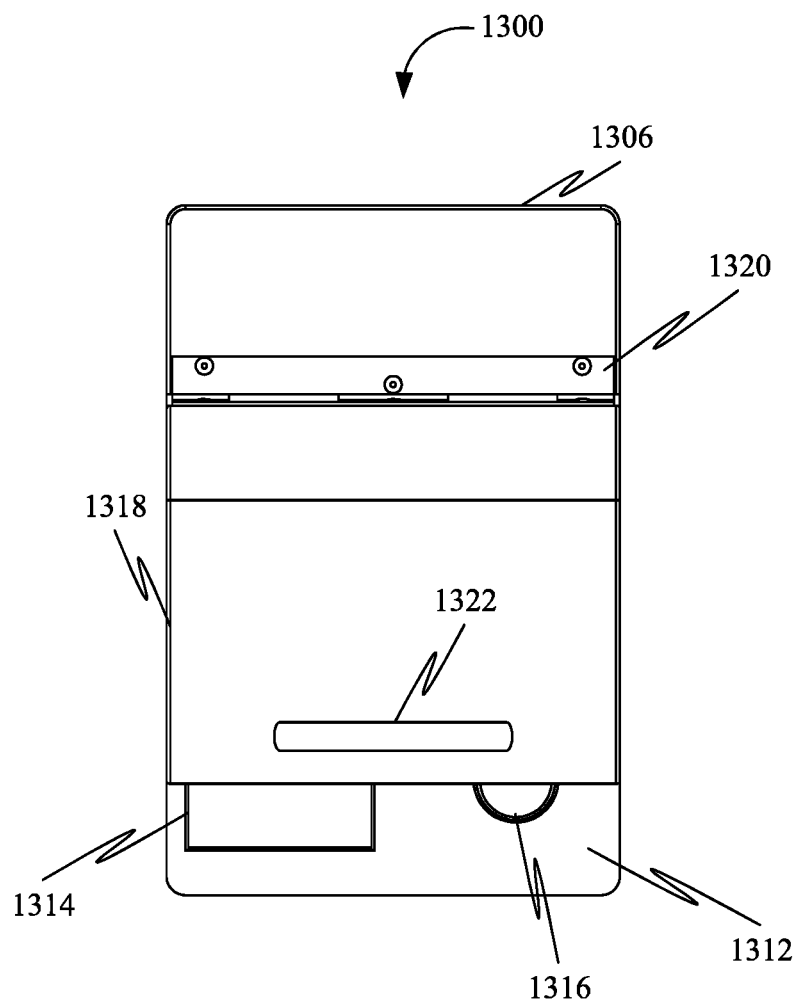
FIG. 18 is a top view of the apparatus for facilitating chemical analysis based on color principle, in accordance with some embodiments.

FIG. 18 is a top view of the apparatus 1300 for facilitating chemical analysis based on color principle, in accordance with some embodiments.

Figure 19:
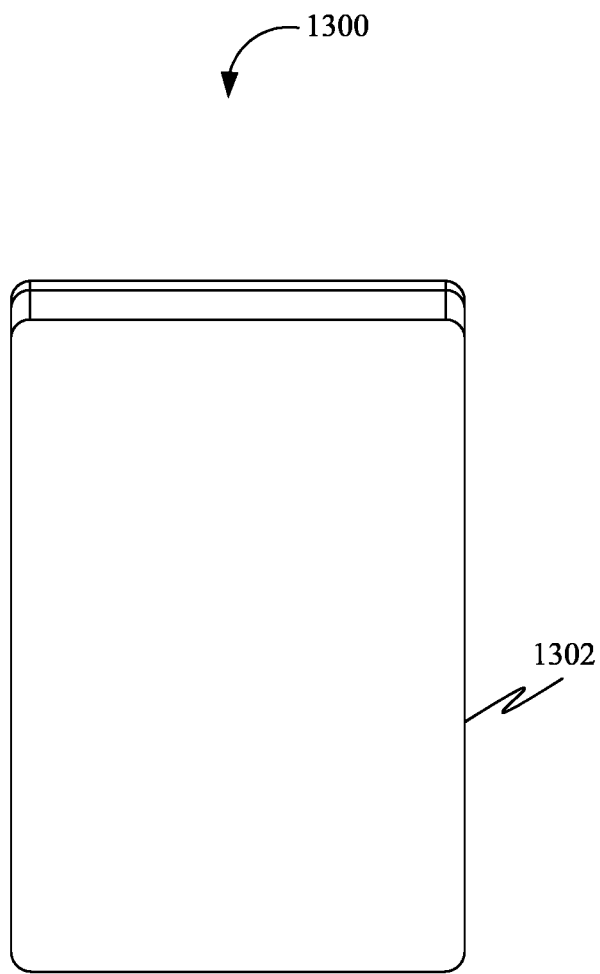
FIG. 19 is a bottom view of the apparatus for facilitating chemical analysis based on color principle, in accordance with some embodiments.

FIG. 19 is a bottom view of the apparatus 1300 for facilitating chemical analysis based on color principle, in accordance with some embodiments.

FIG. 20 is a top perspective view of the apparatus 1300 with the roundtable 1308, the LCD screen 1314, and the button 1316 removed, in accordance with some embodiments.

FIG. 21 is a top perspective view of the apparatus 1300 with the hood 1306 and the intermediate plate 1304 removed, in accordance with some embodiments.

Figure 22:
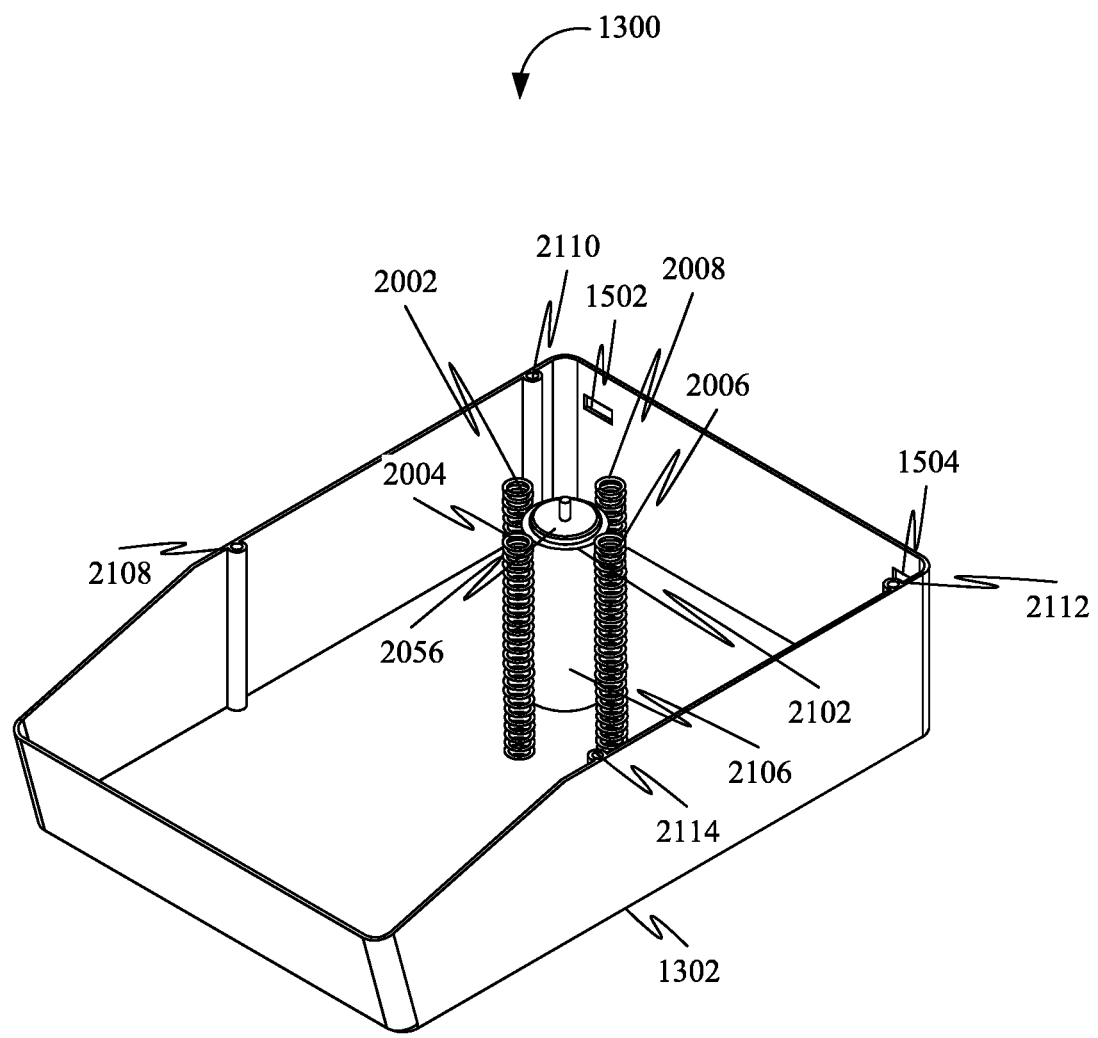
FIG. 22 is a top perspective view of the apparatus with the intermediate plate, the hood, and the analysis system removed, in accordance with some embodiments.

FIG. 22 is a top perspective view of the apparatus 1300 with the intermediate plate 1304, the hood 1306, and the analysis system 2104 removed, in accordance with some embodiments.

FIG. 23 is a top perspective view of the apparatus 1300 with the intermediate plate 1304, the hood 1306, the motion system 2102 and the analysis system 2104 removed, in accordance with some embodiments.

Figure 24:
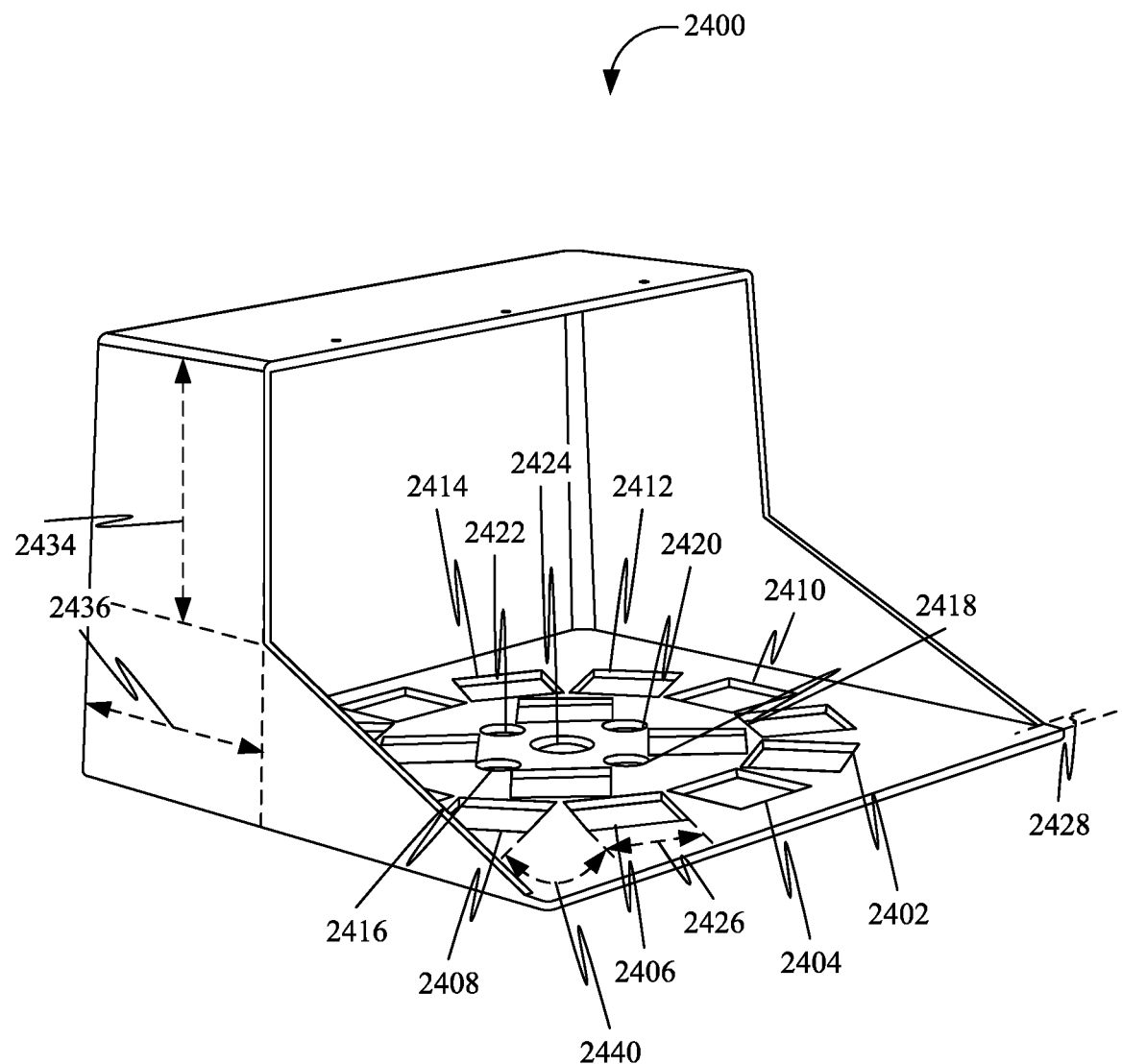
FIG. 24 is a perspective view of a hood, in accordance with some embodiments.

FIG. 24 is a perspective view of a hood 2400, in accordance with some embodiments. Accordingly, the hood 2400 may include a plurality of hood sensor apertures 2402-2414 corresponding to a plurality of sensor units that may be housed within a base. Further, the hood 2400 may include a plurality of hood spring apertures 2416-2422 to allow passage of a plurality of springs associated with a motion system. Further, the hood 2400 may include a hood biaxial aperture 2424 for permitting passage of a biaxial element of the motion system.

Further, in an exemplary embodiment, a width 2426 associated with the plurality of hood sensor apertures 2402-2414 may be 33.20 millimeters. Further, in an exemplary embodiment, a width 2428 associated with the hood 2400 may be 10 millimeters. Further, in an exemplary embodiment, a height 2434 associated with the hood 2400 may be 87.21 millimeters. Further, in an exemplary embodiment, a width 2436 associated with the hood 2400 may be 102.55 millimeters. Further, in an exemplary embodiment, an angle 2440 associated with the hood 2400 may be 30°. However, these dimensions may be adjusted after industrial production.

Figure 25:
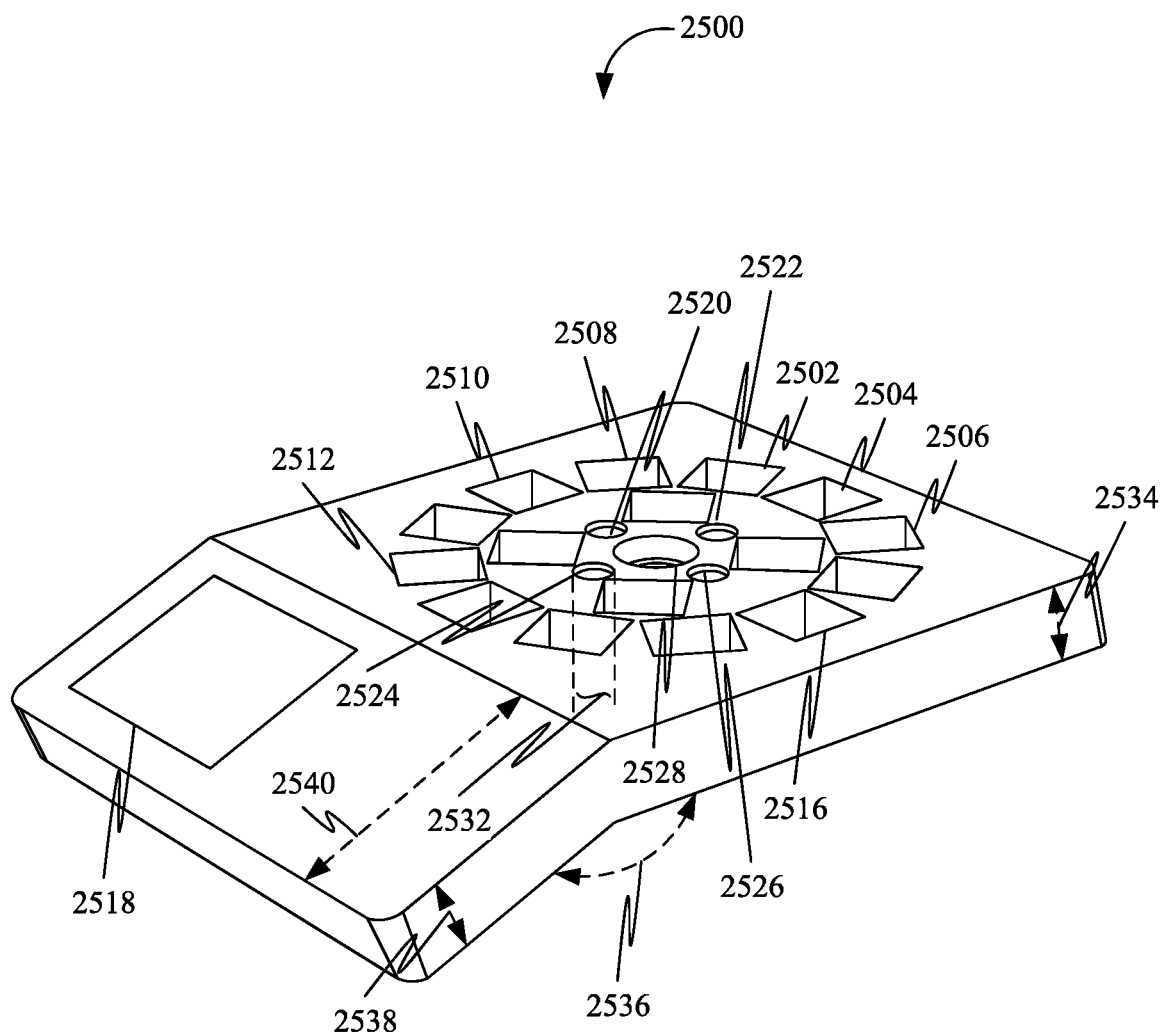
FIG. 25 is a perspective view of an intermediate plate, in accordance with some embodiments.

FIG. 25 is a perspective view of an intermediate plate 2500, in accordance with some embodiments. Accordingly, the intermediate plate 2500 may include a plurality of sensor apertures 2502-2516. Further, the intermediate plate 2500 may include an LCD screen 2518. Further, the intermediate plate 2500 may include a plurality of spring apertures 2520-2526 to allow passage of a plurality of springs associated with a motion system. Further, the intermediate plate 2500 may include a hood biaxial aperture 2528 for permitting passage of a biaxial element of the motion system.

Further, in an exemplary embodiment, a diameter 2532 associated with the plurality of spring apertures 2520-2526 may be 16 millimeters. Further, in an exemplary embodiment, a width 2534 associated with the intermediate plate 2500 may be 30 millimeters. Further, in an exemplary embodiment, an angle 2536 associated with the intermediate plate 2500 may be 157.62°. Further, in an exemplary embodiment, a width 2538 associated with the intermediate plate 2500 may be 27.74 millimeters. Further, in an exemplary embodiment, a width 2540 associated with the intermediate plate 2500 may be 95.56 millimeters. However, these dimensions may be adjusted after industrial production.

Figure 26:
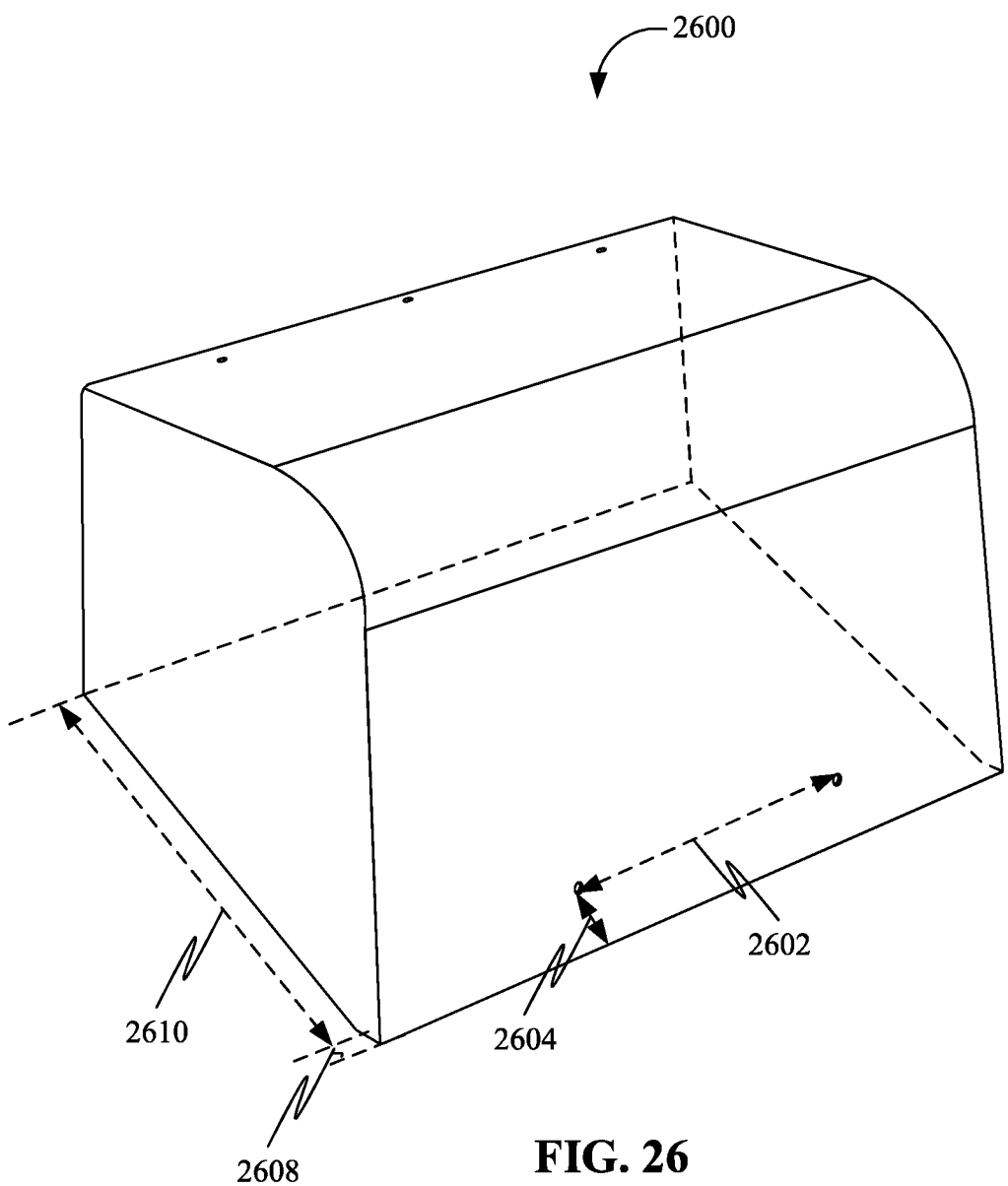
FIG. 26 is a perspective view of a hood closure, in accordance with some embodiments.

FIG. 26 is a perspective view of a hood closure 2600, in accordance with some embodiments. Further, a length 2602 associated with the hood closure 2600 may be 100 millimeters. Further, a width 2604 associated with the hood closure 2600 may be 19.81 millimeters. Further, a width 2608 associated with the hood closure 2600 may be 7.01 millimeters. Further, a width 2610 associated with the hood closure 2600 may be 122.24 millimeters.

Figure 27:
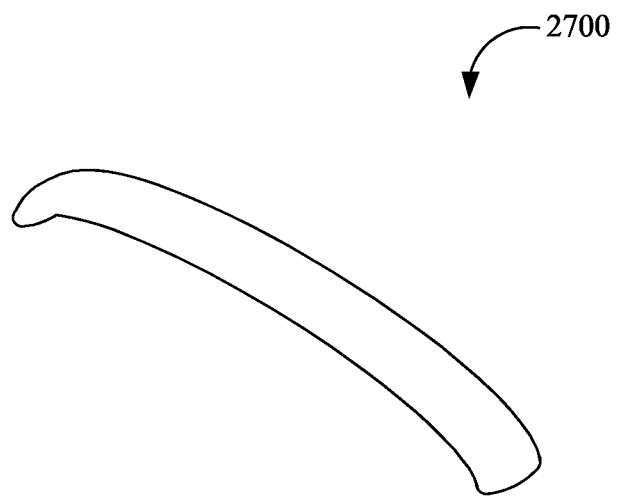
FIG. 27 is a perspective view of a handle, in accordance with some embodiments.

FIG. 27 is a perspective view of a handle 2700, in accordance with some embodiments.

Figure 28:
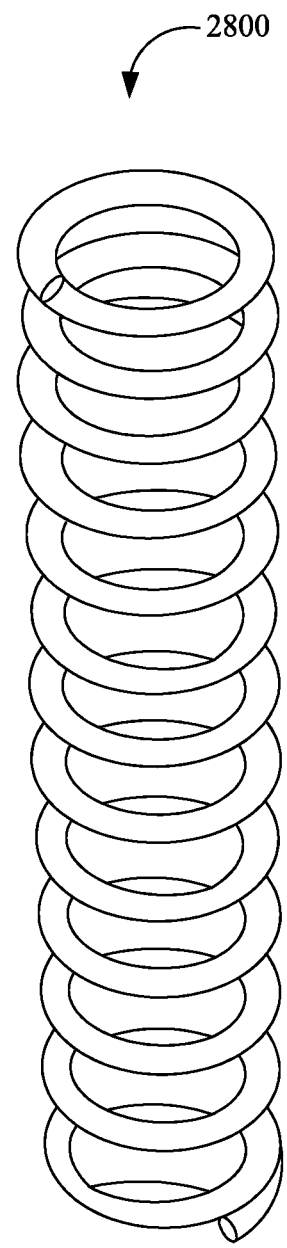
FIG. 28 is a perspective view of a spring, in accordance with some embodiments.

FIG. 28 is a perspective view of a spring 2800, in accordance with some embodiments.

Figure 29:
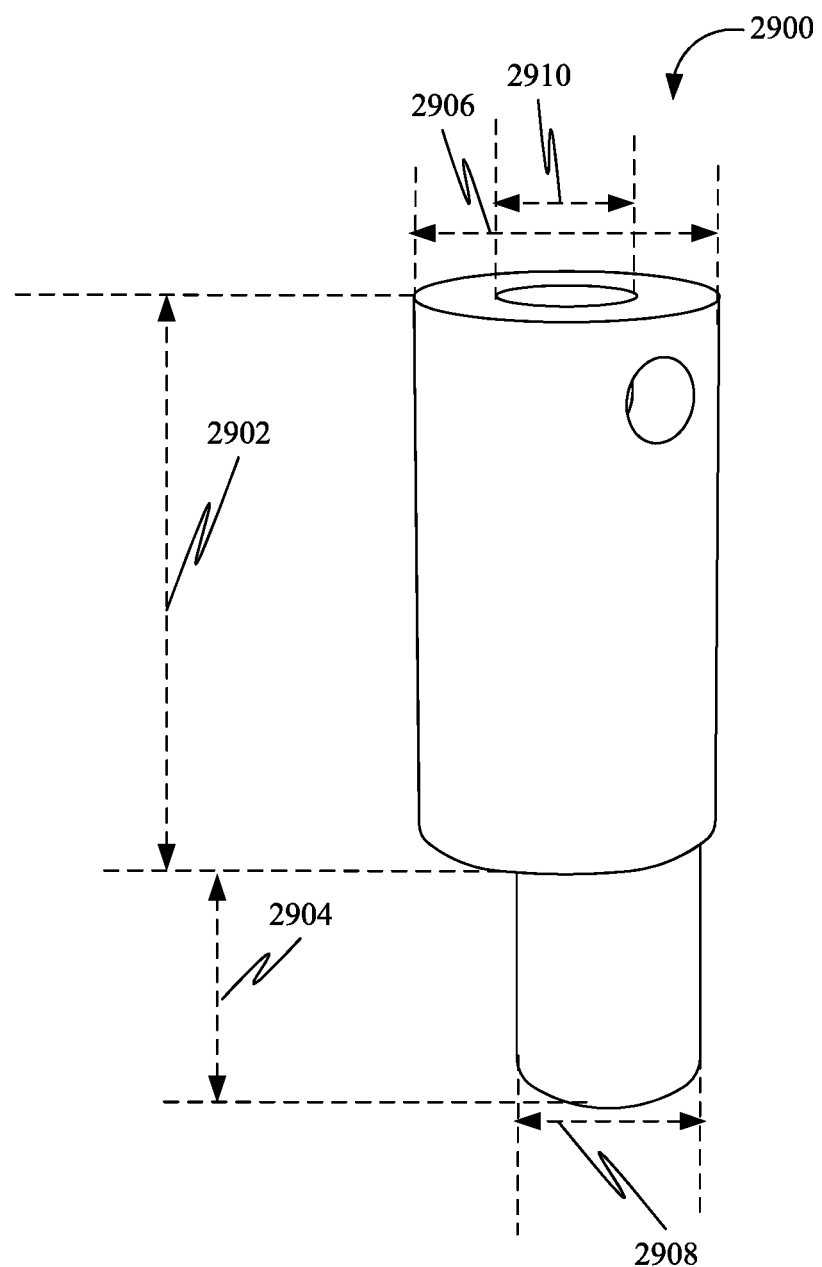
FIG. 29 is a perspective view of a biaxial element, in accordance with some embodiments.

FIG. 29 is a perspective view of a biaxial element 2900, in accordance with some embodiments.

Further, in an exemplary embodiment, a length 2902 associated with the biaxial element 2900 may be 20 millimeters. Further, in an exemplary embodiment, a length 2904 associated with the biaxial element 2900 may be 10 millimeters. Further, in an exemplary embodiment, a diameter 2906 associated with the biaxial element 2900 may be 11 millimeters. Further, in an exemplary embodiment, a diameter 2908 associated with the biaxial element 2900 may be 7 millimeters. Further, in an exemplary embodiment, a diameter 2910 associated with the biaxial element 2900 may be 5 millimeters. However, these dimensions may be adjusted after industrial production.

Figure 30:
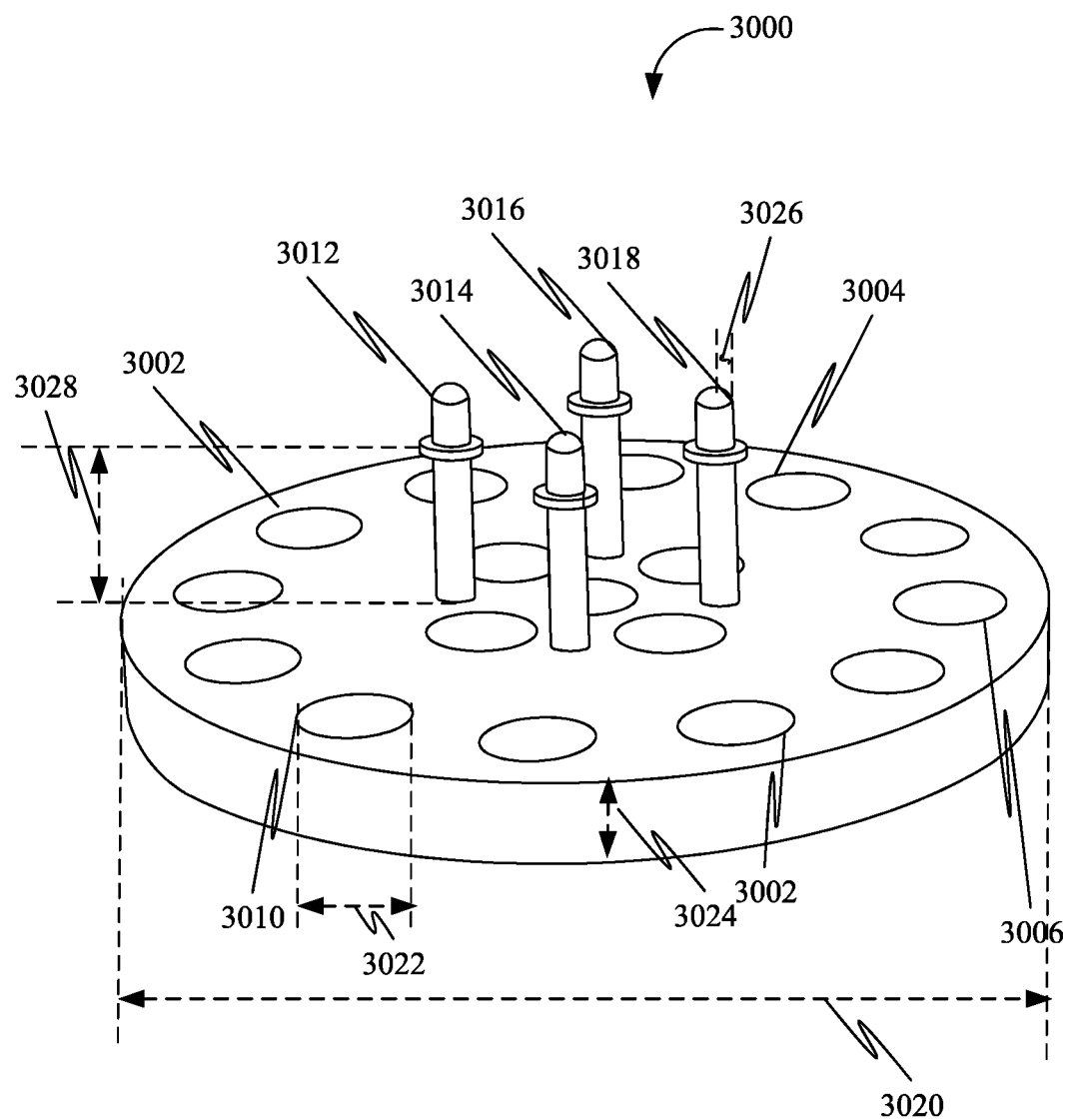
FIG. 30 is a perspective view of a resting plate, in accordance with some embodiments.

FIG. 30 is a perspective view of a resting plate 3000, in accordance with some embodiments. Accordingly, the resting plate may 3000 include a plurality of resting plate apertures 3002-3010 facilitating chemical analysis of samples contained in a plurality of extraneous vials. Further, the resting plate 3000 may be transparent material. Further, the resting plate 3000 may include a plurality of spring plate protrusions 3012-3018. Further, a spring plate protrusion of the plurality of spring plate protrusions 3012-3018 is configured for engaging with a spring of a plurality of springs that may be associated with a motion system.

Further, in an exemplary embodiment, a diameter 3020 associated with the resting plate 3000 may be 210 millimeters. Further, in an exemplary embodiment, a diameter 3022 associated with a resting plate aperture of the plurality of resting plate apertures 3002-3010 may be 27 millimeters. Further, in an exemplary embodiment, a thickness 3024 associated with the resting plate 3000 may be 20 millimeters. Further, in an exemplary embodiment, a radius 3026 associated with the spring plate protrusion may be 3 millimeters. Further, in an exemplary embodiment, a length 3028 associated with the spring plate protrusion may be 50 millimeters. Further, in an exemplary embodiment, a length 3030 associated with the spring plate protrusion may be 35 millimeters. However, these dimensions may be adjusted after industrial production.

Figure 31:
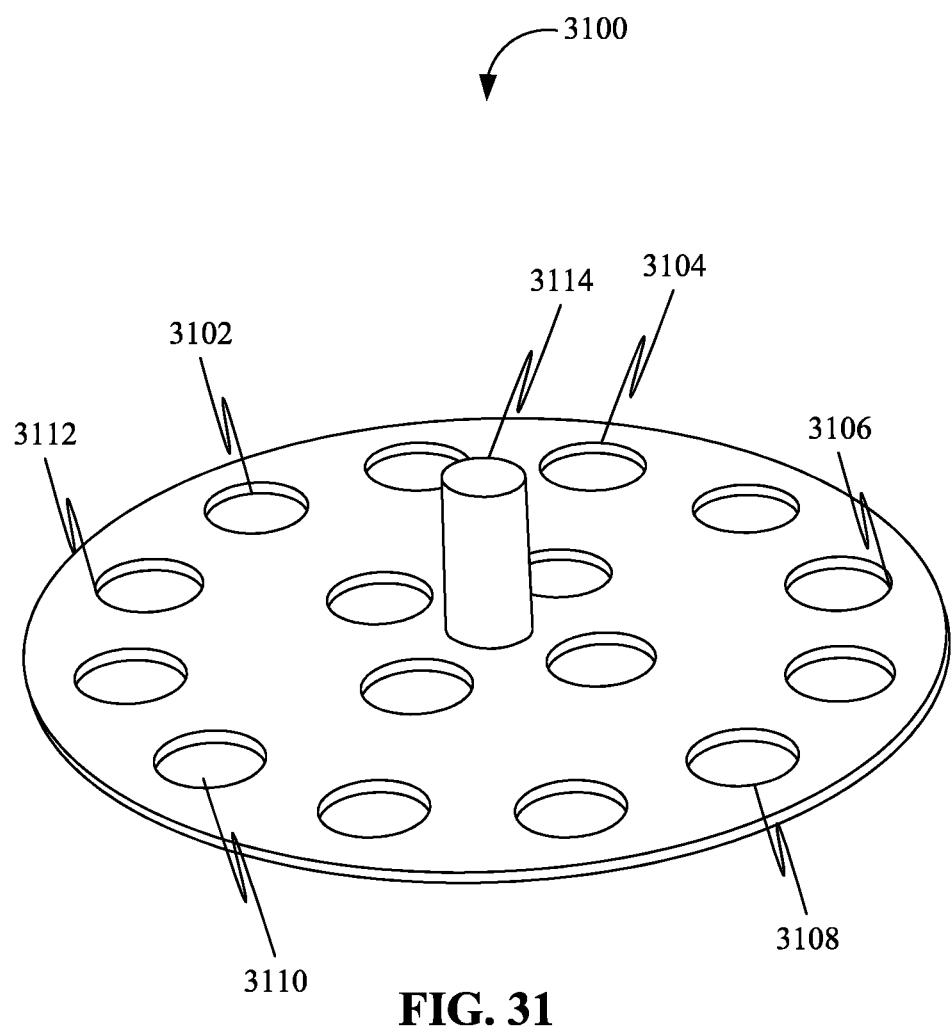
FIG. 31 is a perspective view of a vial plate, in accordance with some embodiments.

FIG. 31 is a perspective view of a vial plate 3100, in accordance with some embodiments. Accordingly, the vial plate may 3100 include a plurality of vial apertures 3102-3112 configured for containing a plurality of extraneous vials. Further, the vial plate may include a cylindrical bridge 3114. Further, the vial plate 3100 may be curvilinear in geometry to permit the passage and securing of the plurality of extraneous vials of non-descript size.

Figure 32:
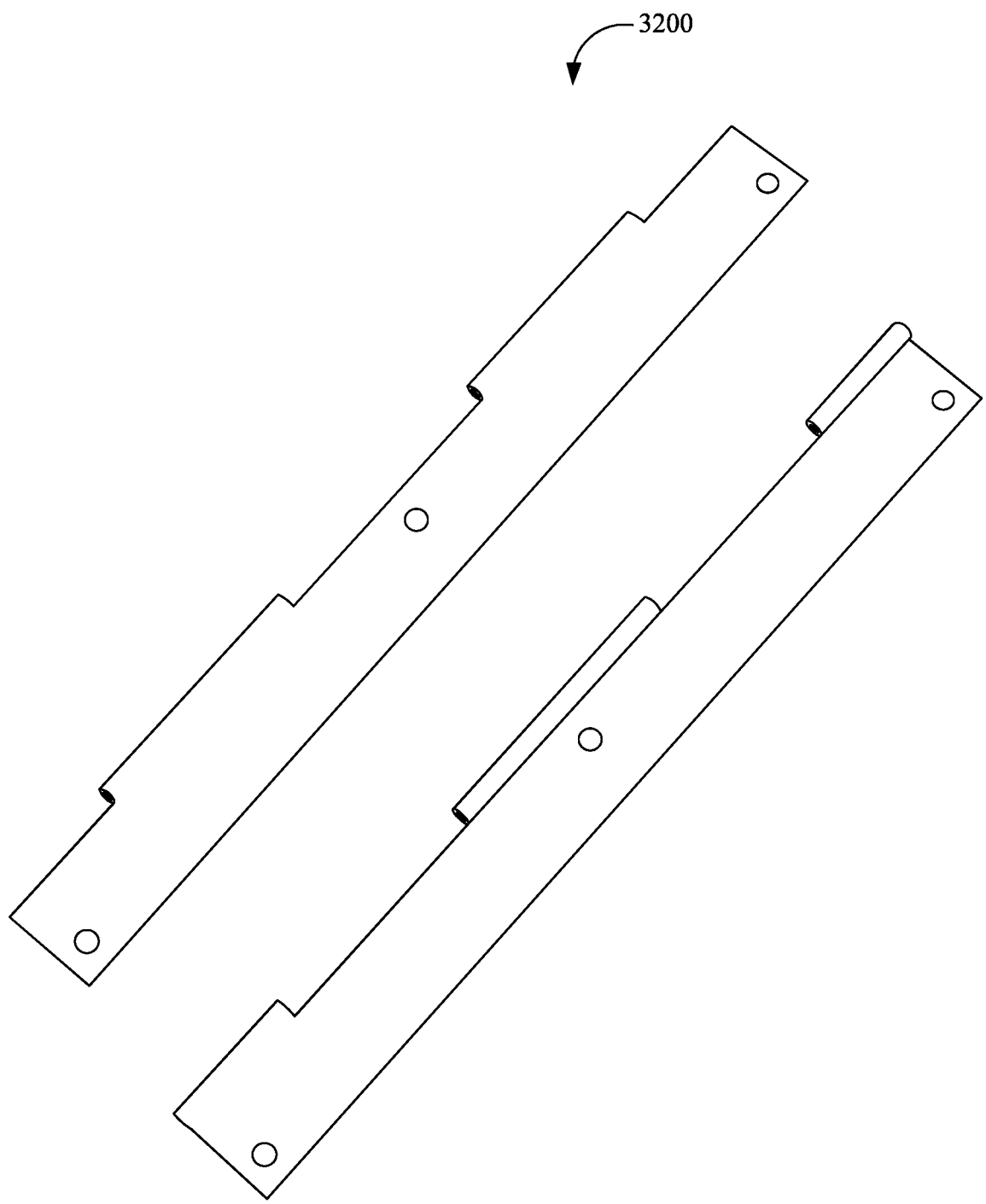
FIG. 32 is an exploded view of a hood hinge, in accordance with some embodiments.

FIG. 32 is an exploded view of a hood hinge 3200, in accordance with some embodiments. Accordingly, the hood hinge 3200 may include a first part and a second part. Further, the hood hinge 3200 may be configured for securing a hood closure to a hood. Further, the first part may be attachable to the hood closure. Further, the second part may be attachable to the hood.

Figure 33:
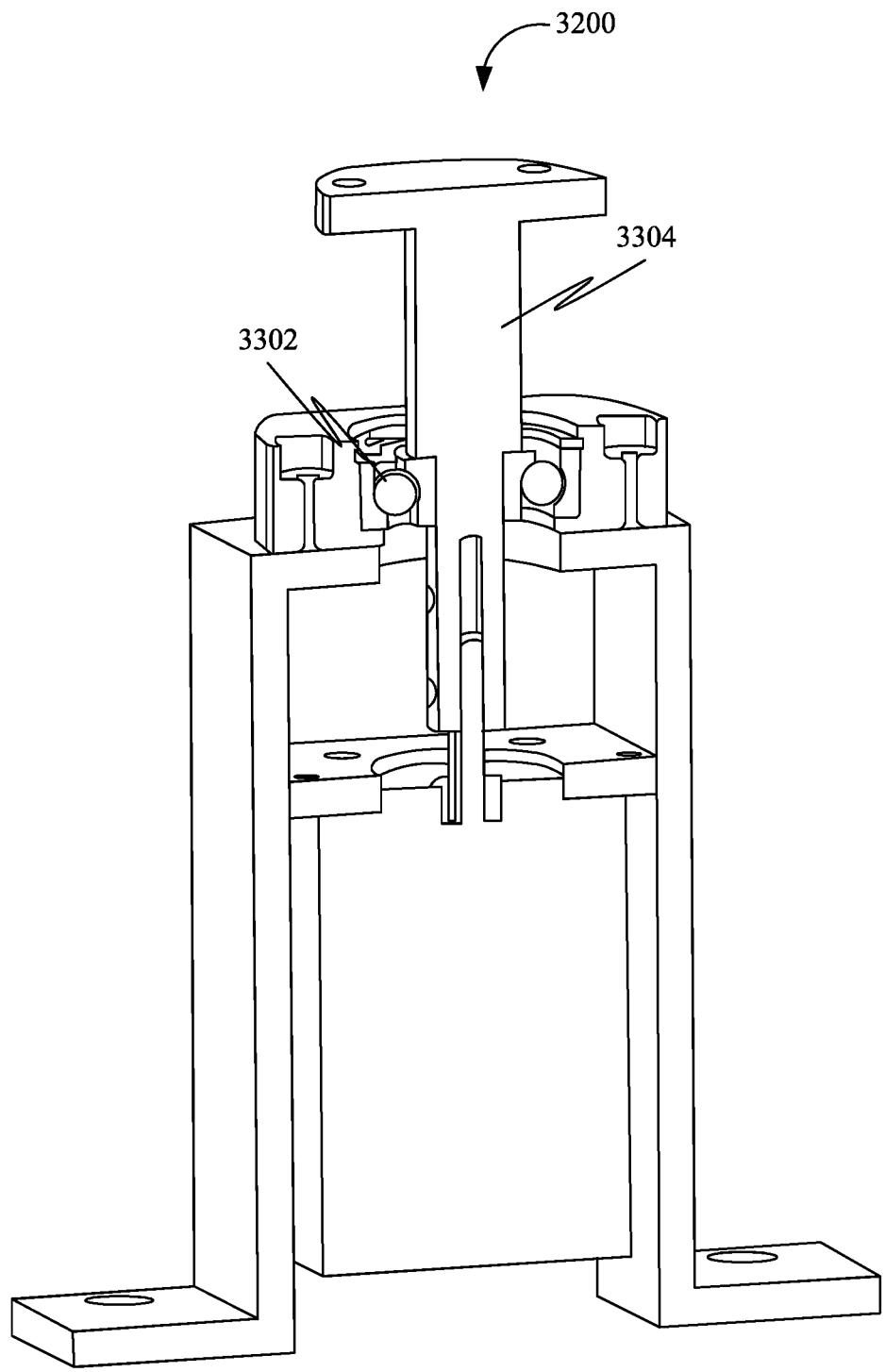
FIG. 33 is a cross sectional view of a motor cut along a vertical plane of the motor, in accordance with some embodiments.

FIG. 33 is a cross sectional view of a motor 3300 cut along a vertical plane of the motor 3300, in accordance with some embodiments. Accordingly, the motor 3300 may include a bearing assembly 3302 on a shaft 3304. Further, the shaft 3304 may be configured for bearing load of an apparatus for chemical analysis of samples contained in the plurality of extraneous vials. Further, the bearing assembly 3302 may include ball bearing made up of Chrome Steel-SAE 52100 associated with specifications. Further, the specifications may be ISO 15 ABB-036-6,SI,NC,6_68.

Figure 34:
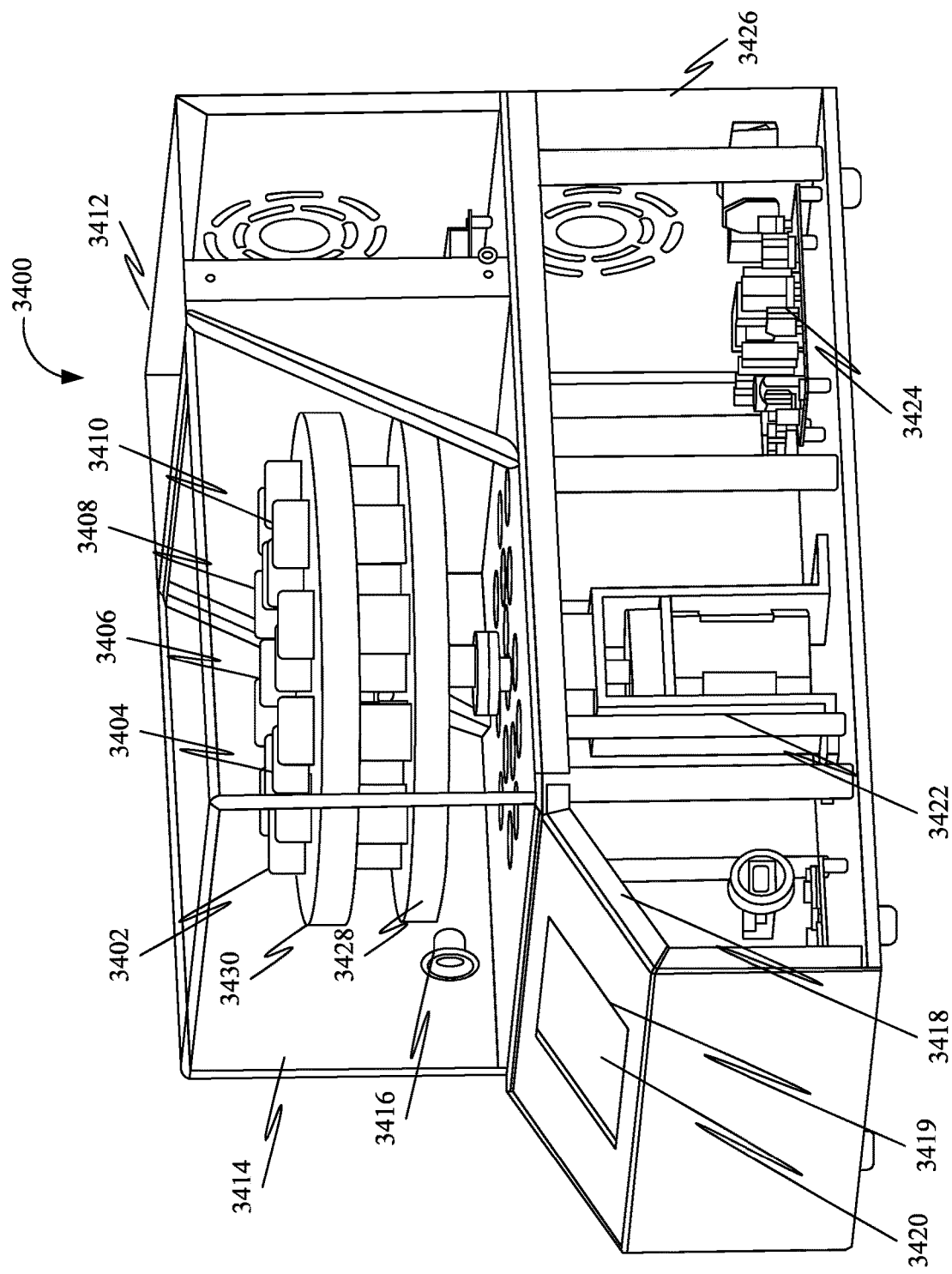
FIG. 34 is a perspective view of an apparatus for facilitating chemical analysis based on color principle, in accordance with some embodiments.

FIG. 34 is a perspective view of an apparatus 3400 for facilitating chemical analysis based on color principle, in accordance with some embodiments. Accordingly, the apparatus 3400 may be configured for facilitating chemical analysis of a sample contained in an extraneous vial of a plurality of extraneous vials 3402-3410. Further, the apparatus 3400 may include a vial plate 3430 configured for securing the plurality of extraneous vials 3402-3410. Further, the apparatus 3400 may include a hood 3412. Further, the apparatus 3400 may include a hood closure 3414 that may be attachable to the hood 3412 using a hood hinge (not shown). Further, the hood closure 3414 may include a hood handle 3416. Further, the apparatus 3400 may include an intermediate plate 3418. Further, the intermediate plate 3418 may include an LCD aperture 3419. Further, the apparatus 3400 may include an LCD screen 3420. Further, the apparatus 3400 may include a motion system 3422. Further, the apparatus 3400 may include an analysis system 3424. Further, the apparatus 3400 may include a base 3426 configured for housing at least one of the analysis system 3424 and the motion system 3422. Further, the apparatus 3400 may include a resting plate 3428.

Figure 35:
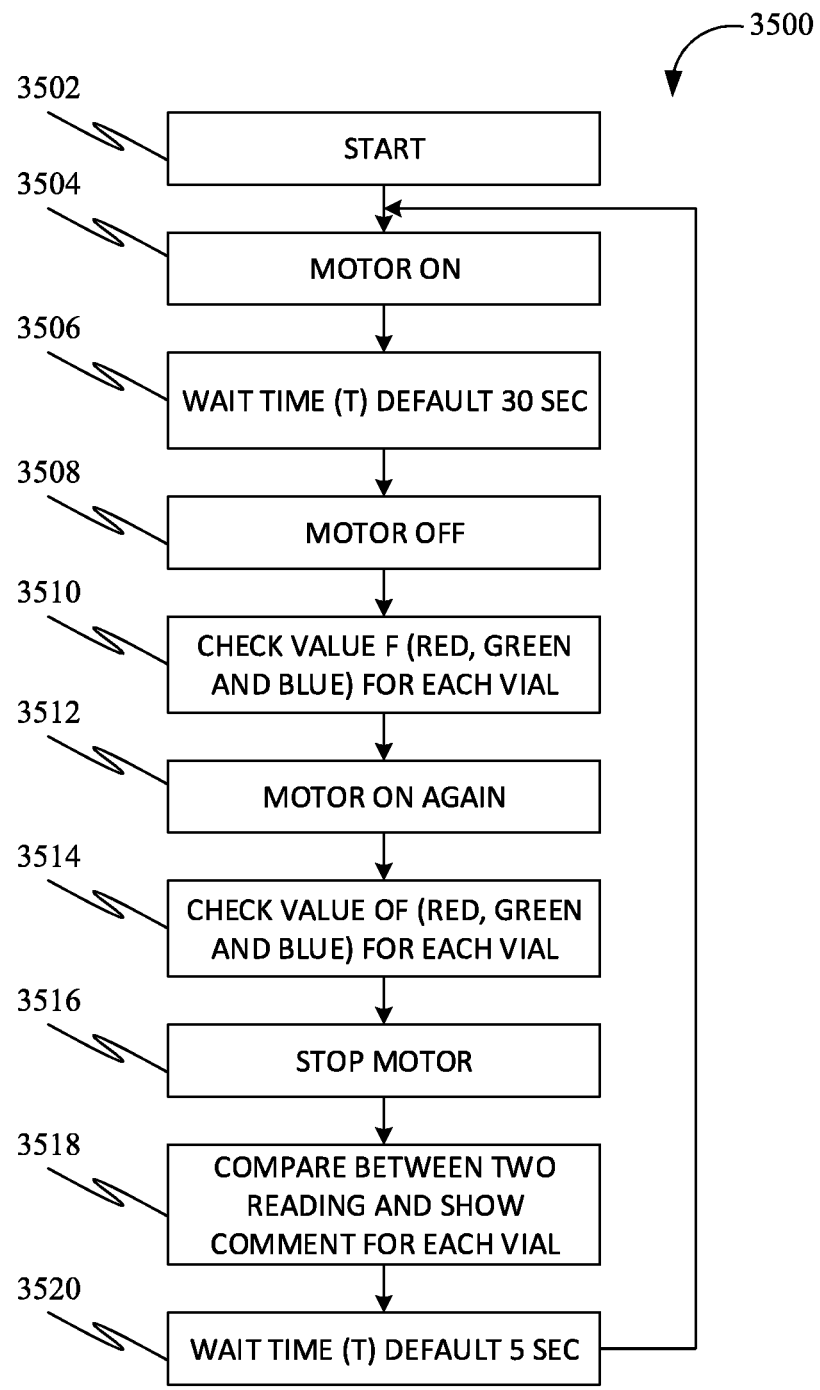
FIG. 35 is a flow diagram of a method for facilitating chemical analysis based on color principle, in accordance with some embodiments.

FIG. 35 is a flow diagram of a method 3500 for facilitating chemical analysis based on color principle, in accordance with some embodiments. Accordingly, the method 3500 may facilitate the chemical analysis of samples contained in a plurality of extraneous vials using an apparatus. Further, at 3502, the method 3500 may include a starting step. Further, at 3504, the method 3500 may include a step of turning a motor associated with the apparatus on. Further, at 3506, the method 3500 may include waiting for a default time. Further, the default time may be 30 seconds. Further, at 3508, the method 3500 may include a step of turning the motor off. Further, at 3510, the method 3500 may include a step of checking first values for each extraneous vial of the plurality of extraneous vials. Further, the first values may include a value corresponding to each one of red, green and blue color. Further, at 3512, the method 3500 may include a step of turning the motor on. Further, at 3514, the method 3500 may include a step of checking second values for each extraneous vial of the plurality of extraneous vials. Further, the second values may include a value corresponding to each one of red, green and blue color. Further, at 3516, the method 3500 may include a step of stopping the motor. Further, at 3518, the method 3500 may include a step of comparing between two readings. Further, the two readings may include a first reading and a second reading. Further, the first reading may include the first values. Further, the second reading may include the second values. Further, at 3520, the method 3500 may include a step of waiting for the default time. Further, after 3520, the method 3500 may proceed to 3504. Further, a temperature sensor associated with the apparatus may check temperature associated with the apparatus after each instruction. Further, a user may change time between loop and time before first reading or temperature max. Further, a color sensor associated with the apparatus may need calibration to work correctly. Further, lights will effect on color sensor reading. Further, the user may change program for modification. Further, the user may see a result and full control anywhere in the world using a password, an IP address and a verification from Master device associated with the apparatus. Further, a board of the apparatus may send control of the motor. Further, the board need a power supply of 15 Watt (or 5 Volt with 3 Ampere).

Figure 36:
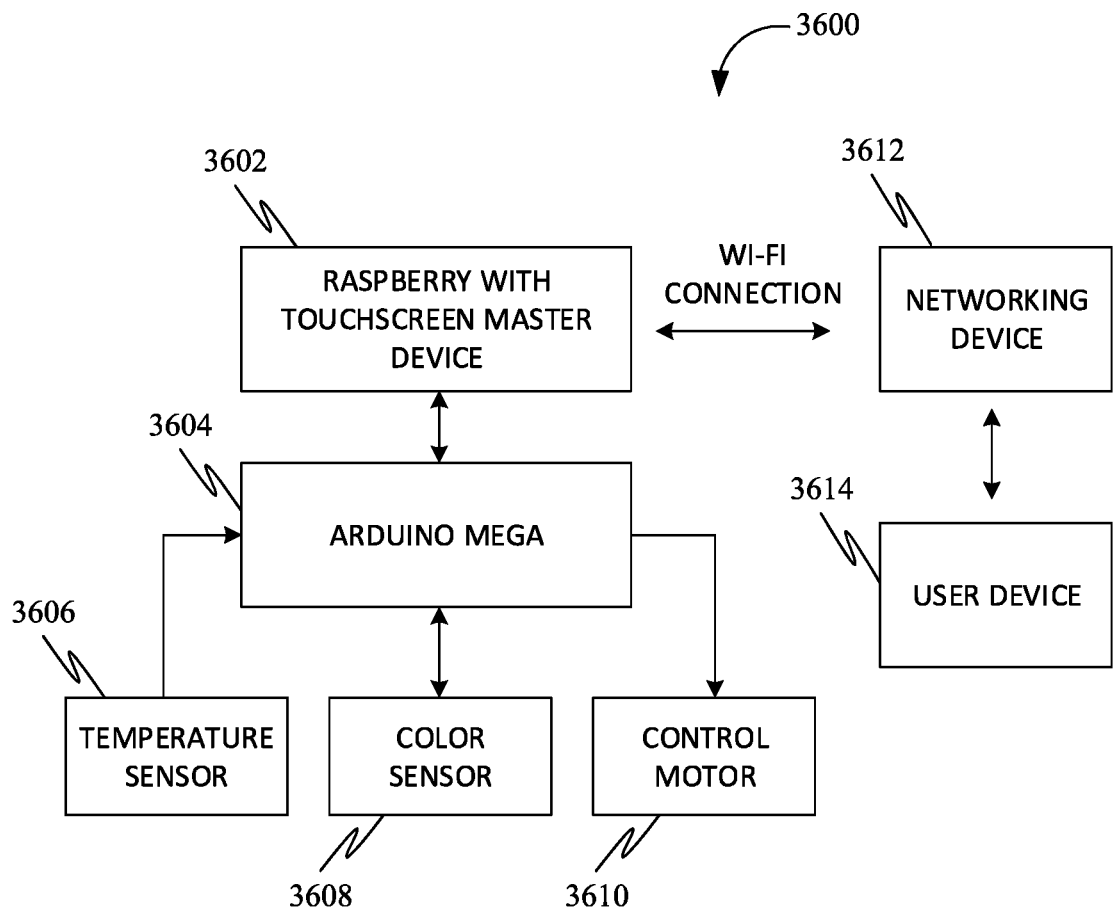
FIG. 36 is a block diagram of a system for facilitating data transmission associated with an apparatus for facilitating chemical analysis of a plurality of extraneous vials, in accordance with some embodiments.

FIG. 36 is a block diagram of a system 3600 for facilitating data transmission associated with an apparatus for facilitating chemical analysis of a plurality of extraneous vials, in accordance with some embodiments. Further, the system 3600 may include a Raspberry™ with a touchscreen master device 3602. Further, the system 3600 may include an Arduino mega 3604 communicatively coupled to the Raspberry™ with a touchscreen device 3602. Further, the system 3600 may include a temperature sensor 3606 communicatively coupled to the Arduino mega 3604. Further, the system 3600 may include a color sensor 3608 communicatively coupled to the Arduino mega 3604. Further, the system 3600 may include a control motor 3610 communicatively coupled to the Arduino mega 3604. Further, the Raspberry™ with touchscreen master device 3602 may be communicatively coupled to a networking device 3612. Further, the networking device 3612 may include a modem, a router, etc. Further, the system may include a user device 3614. Further, the user device 3614 may include a smartphone, a tablet, a desktop, a tablet, a mobile, etc.

Figure 37:
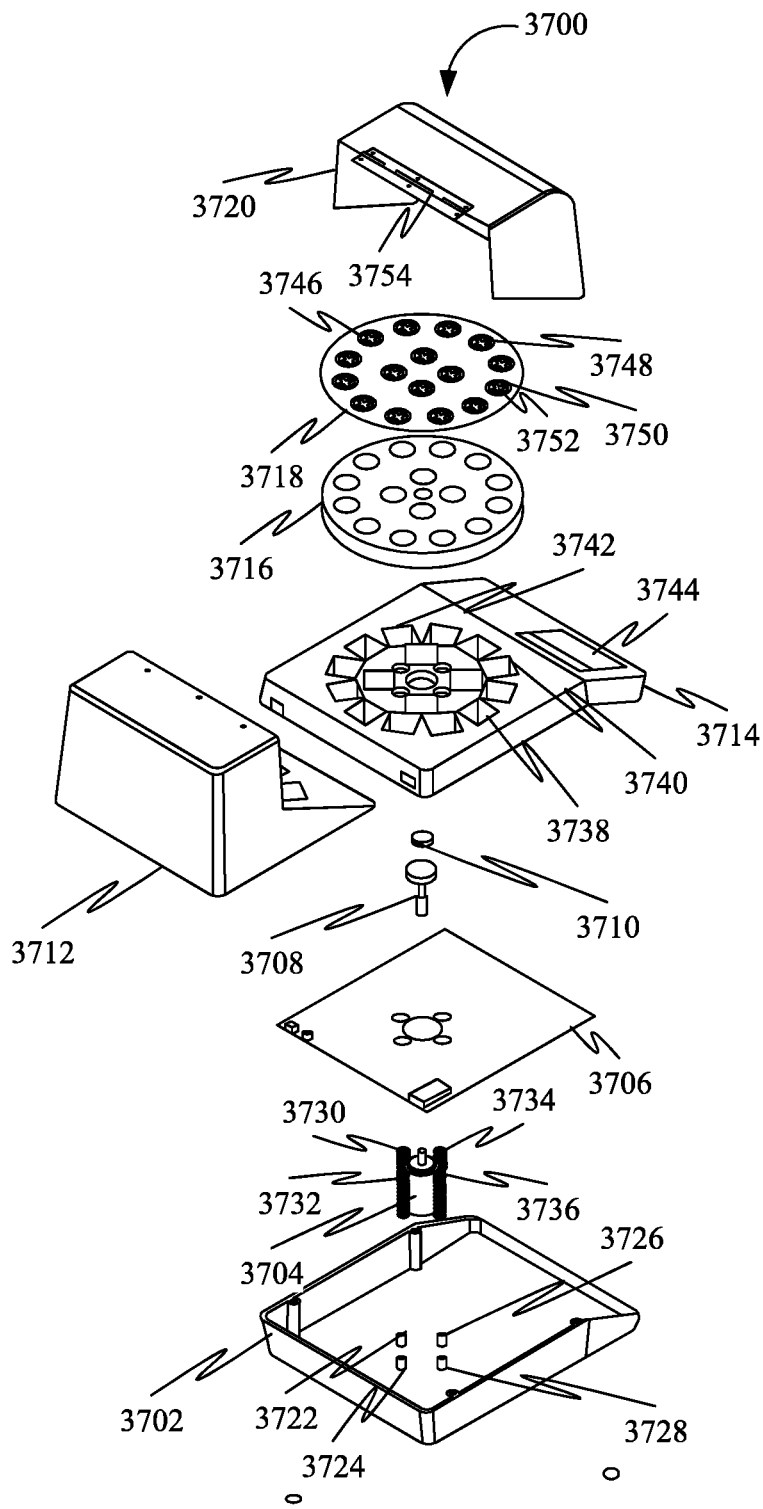
FIG. 37 is an exploded view of an apparatus for facilitating chemical analysis based on color principle, in accordance with some embodiments.

FIG. 37 is an exploded view of an apparatus 3700 for facilitating chemical analysis based on color principle, in accordance with some embodiments. Accordingly, the apparatus 3700 may include a base 3702, a motion system 3704, a PCB board 3706, a biaxial element 3708, a washer 3710, a hood 3712, an intermediate plate 3714, a roundtable 3716, a vial plate 3718, and a hood closure 3720. Further, the base 3702 may include a plurality of base spring protrusions 3722-3728. Further, the motion system 3704 may include a plurality of springs 3730-3736. Further, the intermediate plate 3714 may include an LCD screen 3744. Further, the intermediate plate 3714 may include a plurality of intermediate sensor apertures 3738-3742. Further, the vial plate 3718 may include a plurality of vial apertures 3746-3750. Further, a vial aperture of the plurality of vial apertures 3746-3750 may include a keeper 3752. Further, the hood closure 3720 may include a hood hinge 3754.

Figure 38:
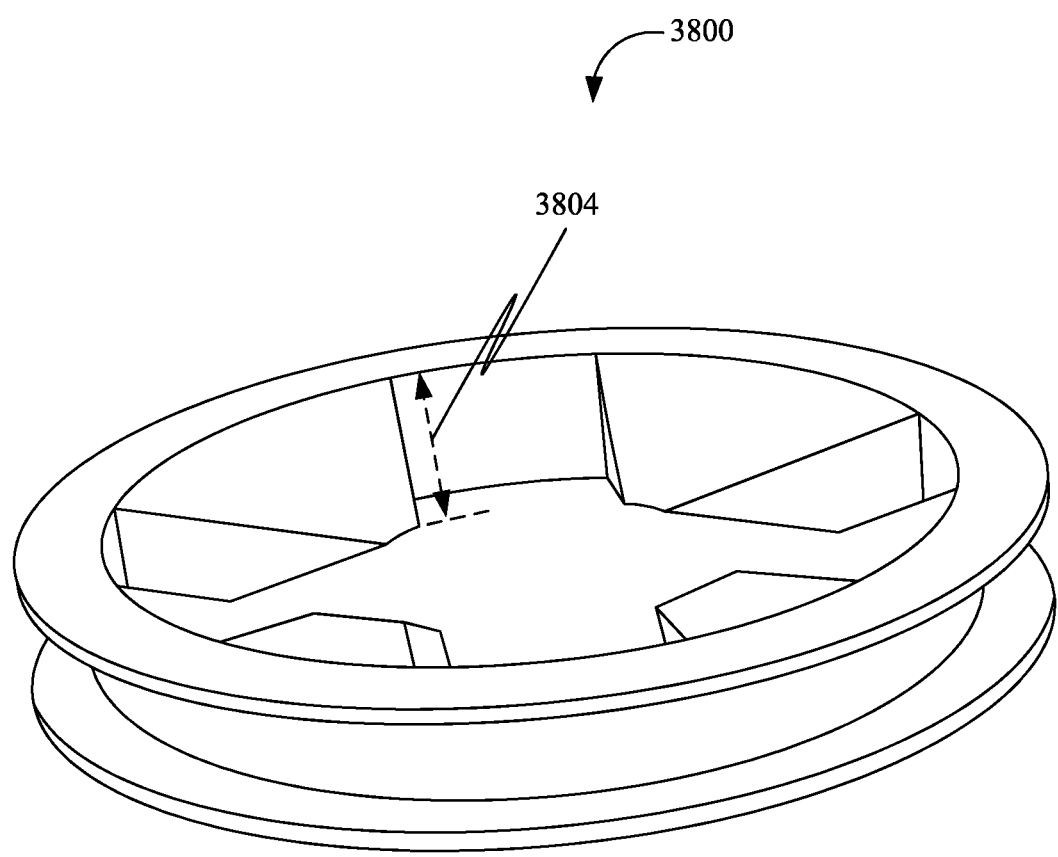
FIG. 38 is a front top perspective view of a keeper associated with a plurality of vial apertures, in accordance with some embodiments.

FIG. 38 is a front top perspective view of a keeper 3800 associated with a plurality of vial apertures, in accordance with some embodiments. Accordingly, the keeper 3800 may be coupled with a vial aperture of the plurality of vial apertures over a top of the vial aperture. Further, the keeper 3800 may be configured for securing a plurality of extraneous vials in the plurality of vial apertures. Further, the keeper 3800 may be made up of rubber. Further, in an exemplary embodiment, a radius associated with the keeper 3800 may be 5 millimeters. Further, in an exemplary embodiment, a length 3804 associated with the keeper 3800 may be 7.57 millimeters. However, these dimensions may be adjusted after industrial production.

Figure 39:
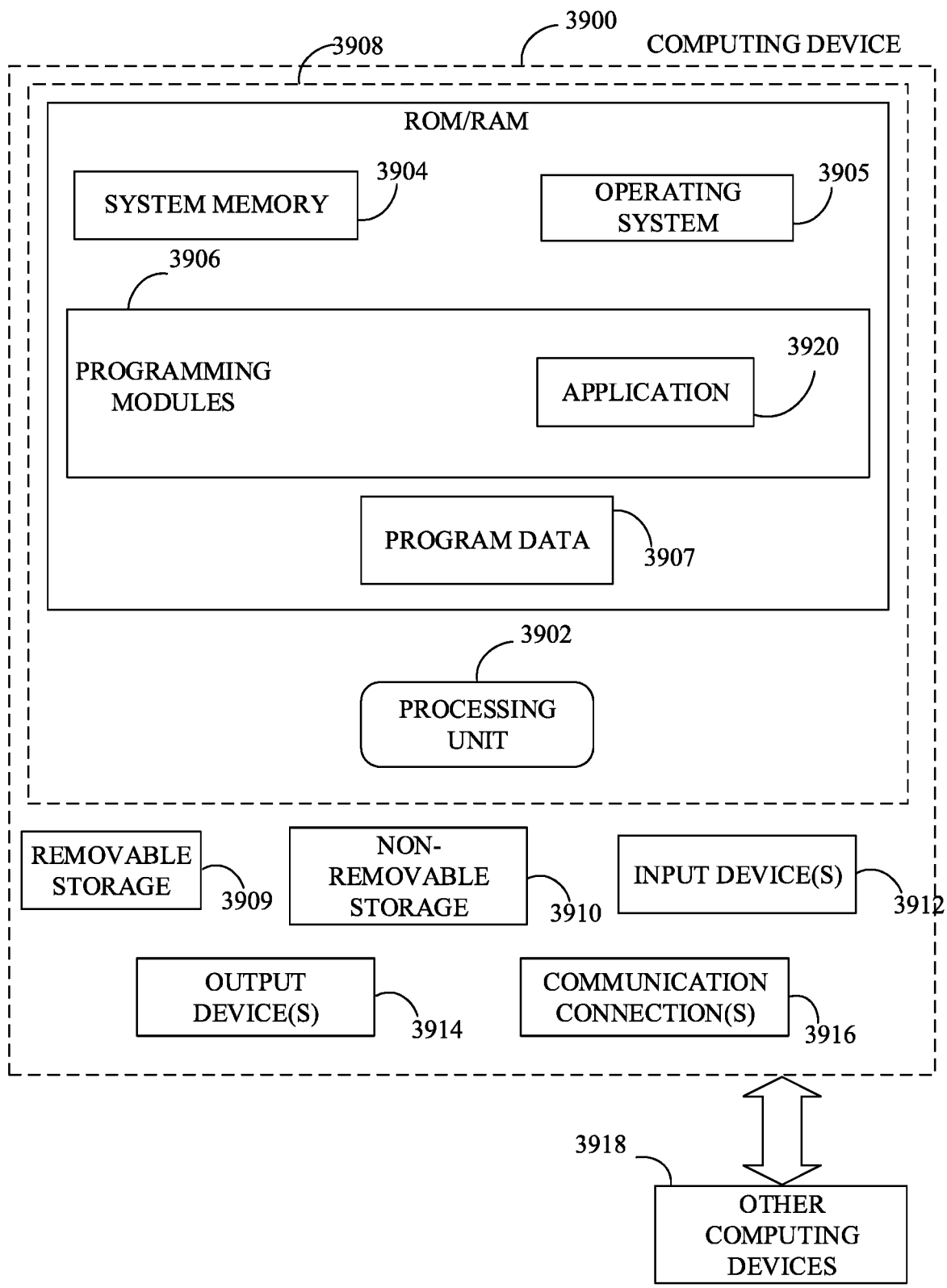
FIG. 39 is a block diagram of a computing device for implementing the methods disclosed herein, in accordance with some embodiments.

With reference to FIG. 39, a system consistent with an embodiment of the disclosure may include a computing device or cloud service, such as computing device 3900. In a basic configuration, computing device 3900 may include at least one processing unit 3902 and a system memory 3904. Depending on the configuration and type of computing device, system memory 3904 may comprise, but is not limited to, volatile (e.g. random-access memory (RAM)), non-volatile (e.g. read-only memory (ROM)), flash memory, or any combination. System memory 3904 may include operating system 3905, one or more programming modules 3906, and may include a program data 3907. Operating system 3905, for example, may be suitable for controlling computing device 3900's operation. In one embodiment, programming modules 3906 may include image-processing module, machine learning module. Furthermore, embodiments of the disclosure may be practiced in conjunction with a graphics library, other operating systems, or any other application program and is not limited to any particular application or system. This basic configuration is illustrated in FIG. 39 by those components within a dashed line 3908.

Computing device 3900 may have additional features or functionality. For example, computing device 3900 may also include additional data storage devices (removable and/or non-removable) such as, for example, magnetic disks, optical disks, or tape. Such additional storage is illustrated in FIG. 39 by a removable storage 3909 and a non-removable storage 3910. Computer storage media may include volatile and non-volatile, removable and non-removable media implemented in any method or technology for storage of information, such as computer-readable instructions, data structures, program modules, or other data. System memory 3904, removable storage 3909, and non-removable storage 3910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3900. Any such computer storage media may be part of device 3900. Computing device 3900 may also have input device(s) 3912 such as a keyboard, a mouse, a pen, a sound input device, a touch input device, a location sensor, a camera, a biometric sensor, etc. Output device(s) 3914 such as a display, speakers, a printer, etc. may also be included. The aforementioned devices are examples and others may be used.

Computing device 3900 may also contain a communication connection 3916 that may allow device 3900 to communicate with other computing devices 3918, such as over a network in a distributed computing environment, for example, an intranet or the Internet. Communication connection 3916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3904, including operating system 3905. While executing on processing unit 3902, programming modules 3906 (e.g., application 3920 such as a media player) may perform processes including, for example, one or more stages of methods, algorithms, systems, applications, servers, databases as described above. The aforementioned process is an example, and processing unit 3902 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. An apparatus for facilitating chemical analysis based on color principle, the apparatus comprising:
a base located at the bottom of the apparatus, wherein the base is composed of a rectilinear receptacle;
an intermediate plate located above the base, wherein the intermediate plate is characterized by an intermediate plate perimeter, wherein the intermediate plate perimeter is congruent and complementing to a perimeter of the base;

a hood located atop the intermediate plate, wherein the hood comprises a hood rectilinear receptacle, wherein the hood rectilinear receptacle is secured to the intermediate plate using a fastening mechanism;

a roundtable housed within the hood, wherein the roundtable comprises a curvilinear structure optimized and weighted to reduce a strain of a high rotational velocity;

a motion system passing through and engaging with the roundtable and the hood, wherein the motion system is driven by a motor arranged in a bearing assembly conducive to minimal frictional resistance to optimize power consumption of the apparatus; and an analysis system embedded into at least one board suspended within the base, wherein the analysis system facilitates automated chemical analysis of a plurality of extraneous vials, wherein the at least one board comprises a processing device and a plurality of sensor units, wherein each sensor unit of the plurality of sensor units comprises a plurality of LEDs and a sensor, wherein the sensor is communicatively coupled with the processing device, wherein the each sensor unit is configured for generating a sensor data, wherein the processing device is configured for analyzing the sensor data to generate a result notification associated with the chemical analysis of the plurality of extraneous vials.

2. The apparatus of claim 1, wherein the base comprises an interior cavity housing functional system of the analysis system and holstering the motor, wherein the base comprising:

a plurality of port apertures located along lateral edges and on the rear of the base, wherein the plurality of port apertures suits a plurality of ports comprised in the analysis system, wherein the plurality of port apertures is rectilinear in geometry, wherein a port aperture of the plurality of port apertures is configured for fastening the plurality of ports using a port fastening mechanism;

a plurality of base fastening apertures bored in a vertical orientation and located in interior of the base along the perimeter of the base, wherein the plurality of base fastening apertures engages with a plurality of intermediate apertures comprised in the intermediate plate for securing the intermediate plate to the base through a plate fastening mechanism;

a plurality of base spring protrusions located on a bottom interior surface of the base and protruding upwards, wherein the plurality of base spring protrusions engages with bottom of a plurality of springs comprised in the motion system, wherein the plurality of base spring protrusions is composed of at least four base spring protrusions arranged cardinally at a center relative to a rectilinear planar surface comprised in the intermediate plate.

3. The apparatus of claim 1, wherein the base is produced of a rigid material from a group comprising at least one of plastic, metals, and composites.

4. The apparatus of claim 1, wherein the intermediate plate provides an angled plane ahead of the hood, wherein the angled plane is configured for providing a cover of the analysis system, wherein the intermediate plate comprising:

a motor aperture located along a center of a rear rectilinear planar surface of the intermediate plate, wherein the motor aperture is configured for permitting passage of the motor, wherein the motor aperture comprises a motor fastening mechanism, wherein the motor aperture is concentrically aligned with a vial biaxial aperture and an adjustment-biaxial aperture comprised in the roundtable;

an LCD aperture located along a slanted surface of the intermediate plate proximal to left side of the intermediate plate, wherein the LCD aperture is configured for housing and suit an LCD screen, wherein the LCD aperture comprises an LCD aperture fastening mechanism configured for securing an LCD into the intermediate plate;

a plurality of button apertures located horizontally adjacent to the LCD aperture, wherein a button aperture of the plurality of button apertures is configured for housing a button associated with the apparatus, wherein the button aperture comprises a button aperture fastening mechanism configured for securing the button into the intermediate plate and permitting the button to be depressed;

a plurality of sensor apertures arranged along a topmost planar surface of the intermediate plate and disparate the slanted surface, wherein the plurality of sensor apertures is arranged to coincide a planar location of the sensor of the plurality of sensor units on the at least one board, wherein the plurality of sensor apertures comprises a rectilinear geometry arranged radially between a first radial arrangement and a second radial arrangement circumscribed by the first radial arrangement where both are concentrically arranged around the motor aperture;

a plurality of intermediate spring apertures radially arranged around the motor aperture, wherein the plurality of intermediate spring apertures is circumscribed by the first radial arrangement and second radial arrangement, wherein the plurality of intermediate spring apertures is configured for coinciding with a planar orientation of a plurality of base spring protrusions comprised in the base, wherein the plurality of intermediate spring apertures is configured for permitting passage of a plurality of springs comprised in the motion system, wherein a quantity of the plurality of intermediate-spring apertures is equal to a quantity of the plurality of springs; and a plurality of intermediate apertures located at points coincident with a plurality of base fastening apertures comprised in the base and engage therewith using an intermediate aperture fastening mechanism.

5. The apparatus of claim 1, wherein the intermediate plate is produced of a rigid material comprising at least one of plastics, metals, and composites.

6. The apparatus of claim 1, wherein the hood is configured for housing the roundtable, samples and the plurality of extraneous vials during the chemical analysis, wherein the hood comprising:

a plurality of complimenting intermediate apertures bored through the bottom surface, wherein the plurality of complimenting intermediate apertures is congruent in geometry, location, and orientation to one of a motor aperture, a plurality of sensor apertures and a plurality of intermediate spring apertures, wherein the motor aperture, the plurality of sensor apertures, and the plurality of intermediate spring apertures is comprised in the intermediate plate; and a hood closure pivotally affixed to the hood, wherein the hood closure comprises a transparent material to allow immediate observation of interior of the hood, wherein the hood closure is secured to the hood through a hood hinge, wherein the hood hinge is configured for bridging between the hood closure and the hood, wherein the bridging produces a state of isolation for the plurality of extraneous vials contained therein, conducive to incubation of samples in the plurality of extraneous vials, wherein the hood closure comprises a locking mechanism to restrict access to contents within the hood, wherein the locking mechanism comprises at least one of a manual locking mechanism and electronically actuated and verified, wherein the hood closure comprising:
  the hood hinge located atop the hood and the hood closure along top most front edge, wherein the hood hinge permits the hood closure to pivot up and down, wherein the hood hinge comprises a means of retention to affix opened state of the hood closure prior to engaging to a closed state;
  a handle secured to a front surface of the hood closure near a bottom edge of the hood closure, wherein the handle is affixed at two points to facilitate lifting the hood closure upward; and
  a hood fastening mechanism is configured for mitigating disturbance to the samples, wherein the hood fastening mechanism is configured for securing a bottom planar surface of the hood to a top rectilinear planar surface of the intermediate plate.

7. The apparatus of claim 1, wherein the roundtable is coupled to the motion system, wherein the roundtable is accessible through a hood closure comprised in the hood, wherein the roundtable comprising:
  a resting plate comprises a curvilinear planar disk allowing examination of the plurality of extraneous vials by the analysis system, wherein the resting plate comprises a frictionless top side surface to permit a bottom of the plurality of extraneous vials to slide effortlessly and offering least resistance to a motor, a first bearing, and a second bearing comprised in the motion system, wherein the resting plate provides a barrier between the plurality of extraneous vials and the analysis system, wherein the resting plate comprises a plurality of spring plate protrusions projecting from underside of the resting plate in planar orientation congruent to a plurality of base spring protrusions comprised in the base, wherein the plurality of spring plate protrusions is composed of a count equal to a plurality of springs comprised in the motion system, wherein the plurality of spring plate protrusions is configured for engaging with the plurality of springs to restrict a radial motion of the resting plate;
  a plurality of vial plates secured to a biaxial element comprised in the motion system through a first bearing and the second bearing concentrically arranged, wherein the first bearing and the second bearing are comprised in the motion system, wherein the plurality of vial plates comprises a first vial plate and a second vial plate, wherein the first vial plate and the second vial plate are connected through a concentric and vertical cylindrical bridge, wherein the plurality of vial plates comprising:
    a plurality of vial apertures bored through the plurality of vial plates with center points individually coincident to centers of a plurality of sensor apertures comprised in the intermediate plate, wherein the plurality of vial apertures is curvilinear in geometry to permit a passage and securing of the plurality of extraneous vials;
    a vial biaxial aperture located at a center of the plurality of vial plates and secured by a cylindrical bridge therebetween, wherein the vial biaxial aperture permits passage and securement to the biaxial element, wherein the vial biaxial aperture is configured for permitting rotation of the plurality of vial plates; and
    an adjustment slot located on a top individual vial plate of the plurality of the vial plates; and
  a vial aperture adjustment plate located interstitially between the plurality of vial plates, wherein the vial aperture adjustment plate comprising:
    an adjustment biaxial aperture located at the center of the vial aperture adjustment plate, wherein the adjustment biaxial aperture is concentric to the biaxial element and the vial biaxial aperture, wherein a diameter of the adjustment biaxial aperture may be equal to a diameter of the vial biaxial aperture, wherein the adjustment biaxial aperture is preferably encased around a cylindrical bridge formed between the vial biaxial aperture associated with each vial plate of the plurality of vial plates and free to rotate therearound;
    an adjustment protrusion protruding from the vial aperture adjustment plate at a point radially coincident to the adjustment slot of the top individual vial plate, wherein the adjustment protrusion is configured for engaging with an adjustment fastener to secure an orientation associated with the vial aperture adjustment plate, wherein the adjustment fastener is configured for securing and releasing the vial aperture adjustment plate to rotate and adjust relative size of the plurality of vial apertures, wherein the adjustment slot is curvilinearly inclined to allow modular alteration of the vial aperture adjustment plate in relation to the plurality of vial plates, wherein the adjustment slot is configured for permitting passage of the adjustment protrusion;
    a plurality of adjustment apertures coincident and congruent to the plurality of vial apertures permitted to alter location by rotation and securement through the adjustment slot and the adjustment protrusion; and
    an alteration protrusion produced radially outward from a tangent cylindrical surface of the vial aperture adjustment plate, wherein the alteration protrusion is configured for homogenizing a distributed weight of the roundtable.

8. The apparatus of claim 1, wherein the motion system is centered in relation to a top rectilinear planar surface of the intermediate plate, wherein the motion system is attachable to the base, wherein the motion system is passing through and engaging with at least one of the roundtable, the at least one board, and the hood, wherein the motion system comprising:
  a plurality of springs engaged between a plurality of base spring protrusions comprised in the base and a plurality of spring plate protrusions comprised in the roundtable, wherein the plurality of springs is configured for engaging and passing through at least one of the at least one board, the intermediate plate, and the hood, wherein the plurality of springs is configured for permitting a resting plate to stabilize and yield to unexpected perturbations of the plurality of extraneous vials associated with the high rotational velocity to prevent the degradation of the plurality of extraneous vials, wherein the preventing of the degradation of the plurality of extraneous vials facilitates mitigating jostling of samples in the plurality of extraneous vials, wherein the resting plate is comprised in the roundtable;

the motor secured to the intermediate plate, wherein the motor is oriented with a motor shaft facing upward and coincident to the round table, wherein the motor is located at a center of the plurality of springs, wherein the motor shaft is configured for protruding from a center of the motor, wherein the motor comprises a key configured for engage the biaxial to mechanically transfer all rotational motion thereto;

a biaxial element connected to at least one of the motor shaft and a first bearing, wherein the biaxial element is configured for producing an oscillatory motion, wherein the oscillatory motion agitates the plurality of extraneous vials, wherein the oscillatory motion is compensated by yielding the plurality of springs and the resting plate, wherein the biaxial element comprises a biaxial aperture and a biaxial fastener, wherein the biaxial aperture is located at top of the biaxial element, wherein the biaxial aperture engages the biaxial fastener and secures the biaxial element to a plurality of vial plates comprised in the roundtable, wherein the biaxial fastener engages with the biaxial aperture and the first bearing and a second bearing in connection to the plurality of vial plates using a biaxial element fastening mechanism, wherein the biaxial element fastening mechanism facilitates arresting a vertical motion of the plurality of vial plates to mitigate a nutation associated with the plurality of vial plates;

the first bearing connected to at least one of the second bearing and the biaxial element, wherein the first bearing is concentrically arranged, wherein the first bearing is configured for producing a first near-frictionless state for the plurality of vial plates, wherein the first bearing is fitted to the motor using a tolerance fitting; and the second bearing concentrically arranged with the roundtable and the biaxial element, wherein the second bearing is secured interstitially between exterior surfaces of the first bearing and a vial biaxial aperture of the plurality of vial plates, wherein the second bearing is configured for introducing a second measure of near frictionless to reduce sustained power use requisite of the motor during the high rotational velocity conducted during the chemical analysis.

9. The apparatus of claim 1, wherein at least one of the processing device and the plurality of sensor units is communicatively coupled to at least one of an ancillary systems and a display device associated with the apparatus, wherein the at least one board is secured in concert with the plurality of base apertures comprised in the base to expose the motor associated with a vertical inclination exposed to a fan unit, wherein the at least one board comprising:

at least one button secured within the one or more button apertures comprised in the intermediate plate, wherein the at least one button is coupled with the apparatus, wherein the at least one button is configured for operating as a hard-stop measure to shut down the apparatus in an event of malfunction, wherein the at least one button is configured for turning the apparatus on from a shut off state, wherein the at least one button comprises a two state switch from a group comprising a depressible switch, toggles, and sliders;

an LCD screen rectilinear in geometry, wherein the LCD screen comprises a non-descript resolution capacity, wherein the LCD screen is secured within the LCD aperture comprised in the intermediate plate, wherein the LCD screen is configured for permitting on site manipulation of parameters associated with the apparatus, wherein the LCD screen is configured for operating as a trouble shooting measure;

the plurality of sensor units arranged congruent and coincident to planar centers of a plurality of sensor apertures comprised in the intermediate plate, wherein the plurality of LEDs is arranged around the sensor near four corners of the each sensor unit, wherein the plurality of LEDs is configured for emitting a light associated with a range of colors, wherein the sensor of the each sensor unit is located centrally between the plurality of LEDs, wherein the sensor is configured for receiving the light, wherein the sensor is configured for capturing data associated with a sample contained in each extraneous vial of the plurality of extraneous vials at the high rotational velocity;

a plurality of electric ports coupled with a plurality of port apertures comprised in the base, wherein the plurality of electric ports is coupled to the processing device, wherein the plurality of electric ports comprises at least four USB ports and at least one network port, wherein the plurality of electric ports facilitates connecting the apparatus to at least one external device; and the processing device communicatively coupled with at least one of the motor, the at least one button, the LCD screen, and the plurality of electric ports within the at least one board, wherein the processing device facilitates the apparatus to autonomously engage in the processes of the chemical analysis, wherein the processing device is configured for producing the rotational motion in the motor conferring agitation.

10. The apparatus of claim 1 further comprising a fan disposed between interior bottom surface of the base and underside of the at least one board, wherein the fan is configured for venting and providing a convective flow of air for the motor, wherein the fan is configured for reducing a heat buildup with in the base and the intermediate plate.

11. The apparatus of claim 1 further comprising a heating array attachable to interior of the hood, wherein the heating array is configured for modifying a temperature associated with the hood, wherein the heating array comprises a heating sensor communicatively coupled to the processing device, wherein the heating sensor is configured for detecting the temperature, wherein the heating sensor is configured for generating a heating sensor data, wherein the processing device is configured for analyzing the heating sensor data to generate a heating notification.

12. The apparatus of claim 1 further comprising a cooling plate disposed in interior of the hood, wherein the cooling plate is configured for producing a cooling effect within the hood and the base, wherein the cooling plate comprises a cooling sensor communicatively coupled to the processing device, wherein the cooling sensor is configured for detecting temperature associated with the hood, wherein the cooling sensor is configured for generating a cooling sensor data, wherein the processing device is configured for analyzing the cooling sensor data to generate a cooling notification.

13. The apparatus of claim 1 further comprising at least one aperture adjustment actuator configured for circumventing an adjustment protrusion comprised in the roundtable, wherein the aperture adjustment actuator is configured for altering aperture size of a plurality of vial apertures comprised in the roundtable by rotating and locking orientation of a vial aperture adjustment plate relative to a plurality of vial plates, wherein the plurality of vial plates and the vial aperture adjustment plate are comprised in the roundtable.

14. An apparatus for facilitating chemical analysis based on color principle, the apparatus comprising:
- a base located at the bottom of the apparatus, wherein the base is composed of a rectilinear receptacle, wherein the base comprises an interior cavity housing functional system of the analysis system and holstering the motor, wherein the base comprising:
  - a plurality of port apertures located along lateral edges and on the rear of the base, wherein the plurality of port apertures suits a plurality of ports comprised in an analysis system, wherein the plurality of port apertures is rectilinear in geometry, wherein a port aperture of the plurality of port apertures is configured for fastening the plurality of ports using a port fastening mechanism;
  - a plurality of base fastening apertures bored in a vertical orientation and located in interior of the base along the perimeter of the base, wherein the plurality of base fastening apertures engages with a plurality of intermediate apertures comprised in an intermediate plate for securing the intermediate plate to the base through a plate fastening mechanism; and
  - a plurality of base spring protrusions located on a bottom interior surface of the base and protruding upwards, wherein the plurality of base spring protrusions engages with bottom of a plurality of springs comprised in an motion system, wherein the plurality of base spring protrusions is composed of at least four base spring protrusions arranged cardinally at a center relative to a rectilinear planar surface comprised in the intermediate plate;
- the intermediate plate located above the base, wherein the intermediate plate is characterized by an intermediate plate perimeter, wherein the intermediate plate perimeter is congruent and complementing to a perimeter of the base;
- a hood located atop the intermediate plate, wherein the hood comprises a hood rectilinear receptacle, wherein the hood rectilinear receptacle is secured to the intermediate plate using a fastening mechanism;
- a roundtable housed within the hood, wherein the roundtable comprises a curvilinear structure optimized and weighted to reduce a strain of a high rotational velocity;
- the motion system passing through and engaging with the roundtable and the hood, wherein the motion system is driven by a motor arranged in a bearing assembly conducive to minimal frictional resistance to optimize power consumption of the apparatus; and
- the analysis system embedded into at least one board suspended within the base, wherein the analysis system facilitates automated chemical analysis of a plurality of extraneous vials, wherein the at least one board comprises a processing device and a plurality of sensor units, wherein each sensor unit of the plurality of sensor units comprises a plurality of LEDs and a sensor, wherein the sensor is communicatively coupled with the processing device, wherein the each sensor unit is configured for generating a sensor data, wherein the processing device is configured for analyzing the sensor data to generate a result notification associated with the chemical analysis of the plurality of extraneous vials.

15. The apparatus of claim 14, wherein the intermediate plate provides an angled plane ahead of the hood, wherein the angled plane is configured for providing a cover of the analysis system, wherein the intermediate plate comprising:
- a motor aperture located along a center of a rear rectilinear planar surface of the intermediate plate, wherein the motor aperture is configured for permitting passage of the motor, wherein the motor aperture comprises a motor fastening mechanism, wherein the motor aperture is concentrically aligned with a vial biaxial aperture and an adjustment-biaxial aperture comprised in the roundtable;
- an LCD aperture located along a slanted surface of the intermediate plate proximal to left side of the intermediate plate, wherein the LCD aperture is configured for housing and suit an LCD screen, wherein the LCD aperture comprises an LCD aperture fastening mechanism configured for securing an LCD into the intermediate plate;
- a plurality of button apertures located horizontally adjacent to the LCD aperture, wherein a button aperture of the plurality of button apertures is configured for housing a button associated with the apparatus, wherein the button aperture comprises a button aperture fastening mechanism configured for securing the button into the intermediate plate and permitting the button to be depressed;
- a plurality of sensor apertures arranged along a topmost planar surface of the intermediate plate and disparate the slanted surface, wherein the plurality of sensor apertures is arranged to coincide a planar location of the sensor of the plurality of sensor units on the at least one board, wherein the plurality of sensor apertures comprises a rectilinear geometry arranged radially between a first radial arrangement and a second radial arrangement circumscribed by the first radial arrangement where both are concentrically arranged around the motor aperture;
- a plurality of intermediate spring apertures radially arranged around the motor aperture, wherein the plurality of intermediate spring apertures is circumscribed by the first radial arrangement and second radial arrangement, wherein the plurality of intermediate spring apertures is configured for coinciding with a planar orientation of a plurality of base spring protrusions comprised in the base, wherein the plurality of intermediate spring apertures is configured for permitting passage of a plurality of springs comprised in the motion system, wherein a quantity of the plurality of intermediate-spring apertures is equal to a quantity of the plurality of springs; and
- a plurality of intermediate apertures located at points coincident with a plurality of base fastening apertures comprised in the base and engage therewith using an intermediate aperture fastening mechanism.

16. The apparatus of claim 14, wherein the hood is configured for housing the roundtable, samples and the plurality of extraneous vials during the chemical analysis, wherein the hood comprising:
- a plurality of complimenting intermediate apertures bored through the bottom surface, wherein the plurality of complimenting intermediate apertures is congruent in geometry, location, and orientation to one of a motor aperture, a plurality of sensor apertures and a plurality of intermediate spring apertures, wherein the motor aperture, the plurality of sensor apertures, and the plurality of intermediate spring apertures is comprised in the intermediate plate; and
- a hood closure pivotally affixed to the hood, wherein the hood closure comprises a transparent material to allow immediate observation of interior of the hood, wherein the hood closure is secured to the hood through a hood hinge, wherein the hood hinge is configured for bridging between the hood closure and the hood, wherein the bridging produces a state of isolation for the plurality of extraneous vials contained therein, conducive to incubation of samples in the plurality of extraneous vials, wherein the hood closure comprises a locking mechanism to restrict access to contents within the hood, wherein the locking mechanism comprises at least one of a manual locking mechanism and electronically actuated and verified, wherein the hood closure comprising:
- the hood hinge located atop the hood and the hood closure along top most front edge, wherein the hood hinge permits the hood closure to pivot up and down, wherein the hood hinge comprises a means of retention to affix opened state of the hood closure prior to engaging to a closed state;
- a handle secured to a front surface of the hood closure near a bottom edge of the hood closure, wherein the handle is affixed at two points to facilitate lifting the hood closure upward; and
- a hood fastening mechanism is configured for mitigating disturbance to the samples, wherein the hood fastening mechanism is configured for securing a bottom planar surface of the hood to a top rectilinear planar surface of the intermediate plate.

17. The apparatus of claim 14, wherein the roundtable is coupled to the motion system, wherein the roundtable is accessible through a hood closure comprised in the hood, wherein the roundtable comprising:
- a resting plate comprises a curvilinear planar disk allowing examination of the plurality of extraneous vials by the analysis system, wherein the resting plate comprises a frictionless top side surface to permit a bottom of the plurality of extraneous vials to slide effortlessly and offering least resistance to a motor, a first bearing, and a second bearing comprised in the motion system, wherein the resting plate provides a barrier between the plurality of extraneous vials and the analysis system, wherein the resting plate comprises a plurality of spring plate protrusions projecting from underside of the resting plate in planar orientation congruent to a plurality of base spring protrusions comprised in the base, wherein the plurality of spring plate protrusions is composed of a count equal to a plurality of springs comprised in the motion system, wherein the plurality of spring plate protrusions is configured for engaging with the plurality of springs to restrict a radial motion of the resting plate; and
- a plurality of vial plates secured to a biaxial element comprised in the motion system through a first bearing and the second bearing concentrically arranged, wherein the first bearing and the second bearing are comprised in the motion system, wherein the plurality of vial plates comprises a first vial plate and a second vial plate, wherein the first vial plate and the second vial plate are connected through a concentric and vertical cylindrical bridge, wherein the plurality of vial plates comprising:
  - a plurality of vial apertures bored through the plurality of vial plates with center points individually coincident to centers of a plurality of sensor apertures comprised in the intermediate plate, wherein the plurality of vial apertures is curvilinear in geometry to permit a passage and securing of the plurality of extraneous vials;
  - a vial biaxial aperture located at a center of the plurality of vial plates and secured by a cylindrical bridge therebetween, wherein the vial biaxial aperture permits passage and securement to the biaxial element, wherein the vial biaxial aperture is configured for permitting rotation of the plurality of vial plates; and
  - an adjustment slot located on a top individual vial plate of the plurality of the vial plates; and
- a vial aperture adjustment plate located interstitially between the plurality of vial plates, wherein the vial aperture adjustment plate comprising:
  - an adjustment biaxial aperture located at the center of the vial aperture adjustment plate, wherein the adjustment biaxial aperture is concentric to the biaxial element and the vial biaxial aperture, wherein a diameter of the adjustment biaxial aperture may be equal to a diameter of the vial biaxial aperture, wherein the adjustment biaxial aperture is preferably encased around a cylindrical bridge formed between the vial biaxial aperture associated with each vial plate of the plurality of vial plates and free to rotate therearound;
  - an adjustment protrusion protruding from the vial aperture adjustment plate at a point radially coincident to the adjustment slot of the top individual vial plate, wherein the adjustment protrusion is configured for engaging with an adjustment fastener to secure an orientation associated with the vial aperture adjustment plate, wherein the adjustment fastener is configured for securing and releasing the vial aperture adjustment plate to rotate and adjust relative size of the plurality of vial apertures, wherein the adjustment slot is curvilinearly inclined to allow modular alteration of the vial aperture adjustment plate in relation to the plurality of vial plates, wherein the adjustment slot is configured for permitting passage of the adjustment protrusion;
  - a plurality of adjustment apertures coincident and congruent to the plurality of vial apertures permitted to alter location by rotation and securement through the adjustment slot and the adjustment protrusion; and
  - an alteration protrusion produced radially outward from a tangent cylindrical surface of the vial aperture adjustment plate, wherein the alteration protrusion is configured for homogenizing a distributed weight of the roundtable.

18. The apparatus of claim 14, wherein the motion system is centered in relation to a top rectilinear planar surface of the intermediate plate, wherein the motion system is attachable to the base, wherein the motion system is passing through and engaging with at least one of the roundtable, the at least one board, and the hood, wherein the motion system comprising:
- a plurality of springs engaged between a plurality of base spring protrusions comprised in the base and a plurality of spring plate protrusions comprised in the roundtable, wherein the plurality of springs is configured for engaging and passing through at least one of the at least one board, the intermediate plate, and the hood, wherein the plurality of springs is configured for permitting a resting plate to stabilize and yield to unexpected perturbations of the plurality of extraneous vials associated with the high rotational velocity to prevent the degradation of the plurality of extraneous vials, wherein the preventing of the degradation of the plurality of extraneous vials facilitates mitigating jostling of samples in the plurality of extraneous vials, wherein the resting plate is comprised in the roundtable;

the motor secured to the intermediate plate, wherein the motor is oriented with a motor shaft facing upward and coincident to the round table, wherein the motor is located at a center of the plurality of springs, wherein the motor shaft is configured for protruding from a center of the motor, wherein the motor comprises a key configured for engage the biaxial to mechanically transfer all rotational motion thereto;

a biaxial element connected to at least one of the motor shaft and a first bearing, wherein the biaxial element is configured for producing an oscillatory motion, wherein the oscillatory motion agitates the plurality of extraneous vials, wherein the oscillatory motion is compensated by yielding the plurality of springs and the resting plate, wherein the biaxial element comprises a biaxial aperture and a biaxial fastener, wherein the biaxial aperture is located at top of the biaxial element, wherein the biaxial aperture engages the biaxial fastener and secures the biaxial element to a plurality of vial plates comprised in the roundtable, wherein the biaxial fastener engages with the biaxial aperture and the first bearing and a second bearing in connection to the plurality of vial plates using a biaxial element fastening mechanism, wherein the biaxial element fastening mechanism facilitates arresting a vertical motion of the plurality of vial plates to mitigate a nutation associated with the plurality of vial plates;

the first bearing connected to at least one of the second bearing and the biaxial element, wherein the first bearing is concentrically arranged, wherein the first bearing is configured for producing a first near-frictionless state for the plurality of vial plates, wherein the first bearing is fitted to the motor using a tolerance fitting; and the second bearing concentrically arranged with the roundtable and the biaxial element, wherein the second bearing is secured interstitially between exterior surfaces of the first bearing and a vial biaxial aperture of the plurality of vial plates, wherein the second bearing is configured for introducing a second measure of near frictionless to reduce sustained power use requisite of the motor during the high rotational velocity conducted during the chemical analysis.

19. The apparatus of claim 14, wherein at least one of the processing device and the plurality of sensor units is communicatively coupled to at least one of an ancillary systems and a display device associated with the apparatus, wherein the at least one board is secured in concert with the plurality of base apertures comprised in the base to expose the motor associated with a vertical inclination exposed to a fan unit, wherein the at least one board comprising:

at least one button secured within the one or more button apertures comprised in the intermediate plate, wherein the at least one button is coupled with the apparatus, wherein the at least one button is configured for operating as a hard-stop measure to shut down the apparatus in an event of malfunction, wherein the at least one button is configured for turning the apparatus on from a shut off state, wherein the at least one button comprises a two state switch from a group comprising a depressible switch, toggles, and sliders;

an LCD screen rectilinear in geometry, wherein the LCD screen comprises a non-descript resolution capacity, wherein the LCD screen is secured within the LCD aperture comprised in the intermediate plate, wherein the LCD screen is configured for permitting on site manipulation of parameters associated with the apparatus, wherein the LCD screen is configured for operating as a trouble shooting measure;

the plurality of sensor units arranged congruent and coincident to planar centers of a plurality of sensor apertures comprised in the intermediate plate, wherein the plurality of LEDs is arranged around the sensor near four corners of the each sensor unit, wherein the plurality of LEDs is configured for emitting a light associated with a range of colors, wherein the sensor of the each sensor unit is located centrally between the plurality of LEDs, wherein the sensor is configured for receiving the light, wherein the sensor is configured for capturing data associated with a sample contained in each extraneous vial of the plurality of extraneous vials at the high rotational velocity;

a plurality of electric ports coupled with a plurality of port apertures comprised in the base, wherein the plurality of electric ports is coupled to the processing device, wherein the plurality of electric ports comprises at least four USB ports and at least one network port, wherein the plurality of electric ports facilitates connecting the apparatus to at least one external device; and the processing device communicatively coupled with at least one of the motor, the at least one button, the LCD screen, and the plurality of electric ports within the at least one board, wherein the processing device facilitates the apparatus to autonomously engage in the processes of the chemical analysis, wherein the processing device is configured for producing the rotational motion in the motor conferring agitation.

20. The apparatus of claim 14 further comprising a fan disposed between interior bottom surface of the base and underside of the at least one board, wherein the fan is configured for venting and providing a convective flow of air for the motor, wherein the fan is configured for reducing a heat buildup with in the base and the intermediate plate.

* * * * *